(12) United States Patent
Hermitage et al.

(10) Patent No.: US 9,853,930 B2
(45) Date of Patent: Dec. 26, 2017

(54) SYSTEM AND METHOD FOR DIGITAL EVIDENCE ANALYSIS AND AUTHENTICATION

(71) Applicant: United States Postal Service, Washington, DC (US)

(72) Inventors: Suzanne Hermitage, Falls Church, VA (US); Steve D. Nguyen, Waldorf, MD (US); Jeffrey A. Steadman, Chantilly, VA (US); Kennon F. Privette, Alexandria, VA (US); Gerry Picciano, New Bern, NC (US); Jill Padres, McLean, VA (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 0 days.

(21) Appl. No.: 14/868,338

(22) Filed: Sep. 28, 2015

(65) Prior Publication Data

US 2016/0021044 A1    Jan. 21, 2016

Related U.S. Application Data

(63) Continuation of application No. 12/913,623, filed on Oct. 27, 2010, now Pat. No. 9,147,003.
(Continued)

(51) Int. Cl.
*G06F 17/30* (2006.01)
*H04L 12/58* (2006.01)
(Continued)

(52) U.S. Cl.
CPC ............ *H04L 51/16* (2013.01); *G06F 17/212* (2013.01); *G06F 17/3089* (2013.01); *G06Q 10/107* (2013.01); *H04L 63/302* (2013.01); *H04L 63/308* (2013.01); *H04L 67/06* (2013.01); *H04L 67/42* (2013.01)

(58) Field of Classification Search
None
See application file for complete search history.

(56) References Cited

U.S. PATENT DOCUMENTS 7,386,595 B1 *   6/2008   Bloomer, Jr. ........ G06Q 10/107
                                                        709/203
7,792,789 B2     9/2010   Prahlad et al.
(Continued)

OTHER PUBLICATIONS

U.S. Appl. No. 12/913,623 Final Office Action dated Nov. 25, 2014.
(Continued)

*Primary Examiner* — Hung Le
(74) *Attorney, Agent, or Firm* — Lewis Roca Rothgerber Christie LLP

(57) ABSTRACT

The system disclosed provides an efficient mechanism for acquiring email and other data from remote systems in a forensically sound manner. Email for users can be requested by investigators from email servers across the country. It is then be automatically acquired and made available to the examiner, subject to approval, and any others he deems have a need-to-know on a web based system. The data can be searched and bookmarked, and the bookmarks shared. Data can also be uploaded manually and combined with email data in the searching, bookmarking, and sharing.

18 Claims, 58 Drawing Sheets

Related U.S. Application Data

(60) Provisional application No. 61/342,976, filed on Apr. 22, 2010.

(51) Int. Cl.
  *G06Q 10/10* (2012.01)
  *G06F 17/21* (2006.01)
  *H04L 29/06* (2006.01)
  *H04L 29/08* (2006.01)

(56) References Cited

U.S. PATENT DOCUMENTS

| | | | |
|---|---|---|---|
| 8,224,924 B2 * | 7/2012 | Andersen | G06Q 10/10 707/661 |
| 8,266,117 B2 | 9/2012 | Hatakeyama et al. | |
| 8,364,681 B2 | 1/2013 | Richards et al. | |
| 9,147,003 B2 | 9/2015 | Hermitage | |
| 2004/0177319 A1 * | 9/2004 | Horn | G06F 17/3002 715/205 |
| 2005/0257261 A1 * | 11/2005 | Shraim | G06Q 10/107 726/22 |
| 2006/0200530 A1 * | 9/2006 | Tokuda | H04L 12/5855 709/206 |
| 2006/0270421 A1 * | 11/2006 | Phillips | G08B 21/0236 455/457 |
| 2007/0005713 A1 * | 1/2007 | LeVasseur | H04L 51/14 709/206 |
| 2007/0011303 A1 | 1/2007 | Hatakeyama et al. | |
| 2007/0233688 A1 | 10/2007 | Smolen et al. | |
| 2008/0046260 A1 | 2/2008 | Ghieletti et al. | |
| 2008/0294730 A1 * | 11/2008 | Oral | G06Q 10/107 709/206 |
| 2009/0164522 A1 | 6/2009 | Fahey | |
| 2009/0165026 A1 | 6/2009 | Paknad et al. | |
| 2009/0222363 A1 * | 9/2009 | Arnold | G06Q 30/06 705/30 |
| 2009/0292775 A1 | 11/2009 | Flenniken | |
| 2010/0030798 A1 * | 2/2010 | Kumar | G06F 17/30873 707/737 |
| 2010/0199184 A1 * | 8/2010 | Horowitz | G06Q 50/01 715/733 |
| 2010/0205020 A1 | 8/2010 | Losey | |
| 2010/0250498 A1 | 9/2010 | Andersen et al. | |
| 2010/0250531 A1 | 9/2010 | Andersen et al. | |
| 2010/0250538 A1 | 9/2010 | Richards et al. | |
| 2010/0250624 A1 * | 9/2010 | Mayer | G06Q 10/10 707/809 |
| 2010/0250931 A1 | 9/2010 | Andersen et al. | |
| 2011/0093471 A1 | 4/2011 | Brockway et al. | |
| 2011/0107397 A1 * | 5/2011 | Niv | G06F 21/64 726/3 |
| 2011/0153752 A1 * | 6/2011 | Seaman | G06Q 10/107 709/206 |
| 2011/0184935 A1 | 7/2011 | Marlin | |
| 2011/0191145 A1 | 8/2011 | Ford et al. | |
| 2011/0264677 A1 | 10/2011 | Hermitage | |

OTHER PUBLICATIONS

U.S. Appl. No. 12/913,623 Office Action dated Aug. 8, 2014.
U.S. Appl. No. 12/913,623 Final Office Action dated May 8, 2014.
U.S. Appl. No. 12/913,623 Office Action dated Jan. 24, 2014.

* cited by examiner

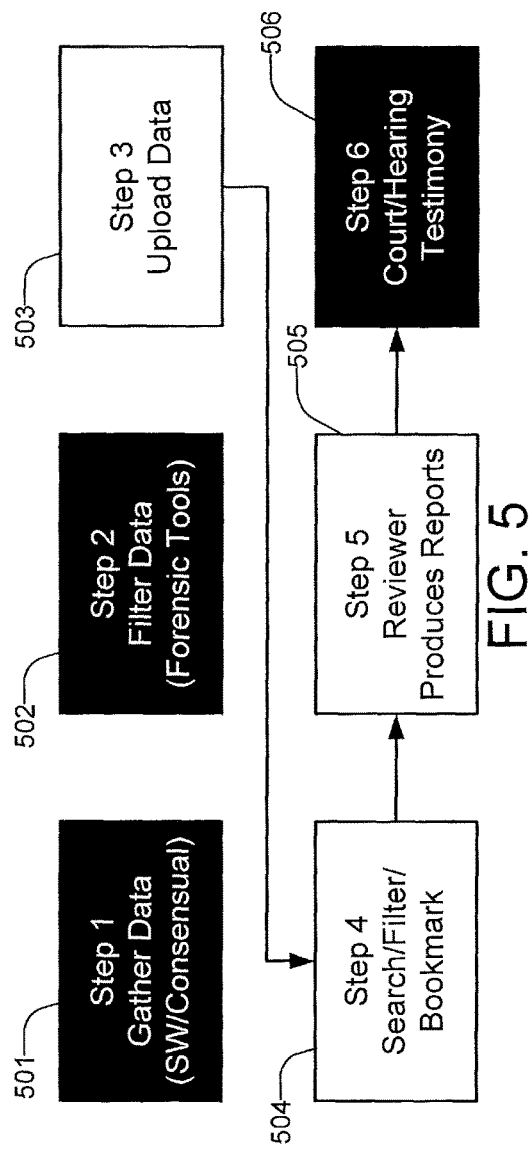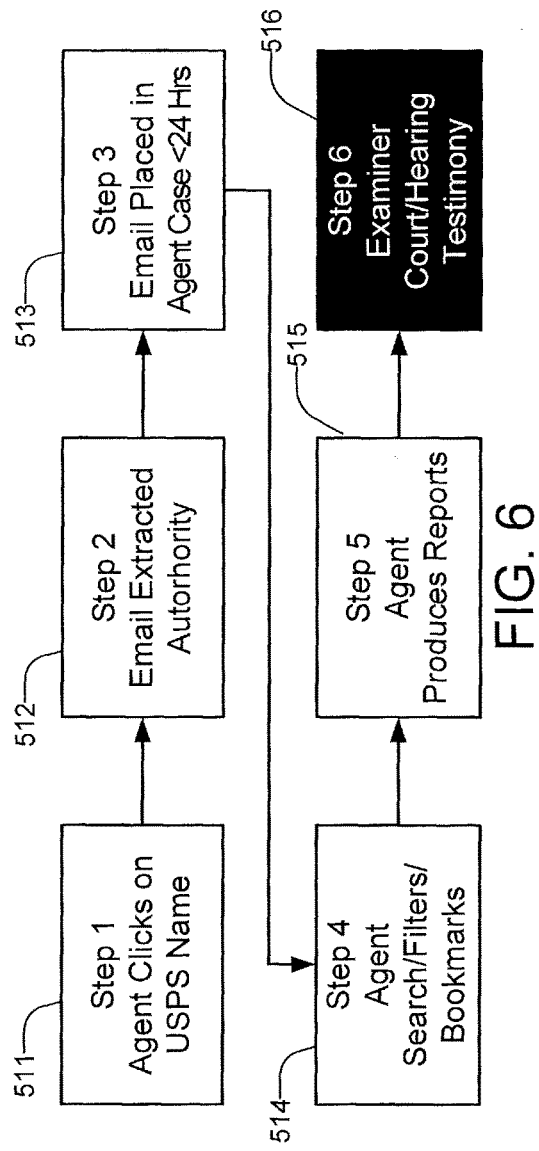

HTTP//LocalHost.......

Name: [Nguyen]   ACE ID: [   ]   [Search]

| ACEID | Full Name | Occupation | City State | Finance Number |
|---|---|---|---|---|
| Select 04101i | 0401, Implant – Portland, ME | | | |
| Select Kyushik | 1007-2690 | DC=USPS | DC=USA DC=DCE | DC=gov |
| Select 100FLATSI | 100FLATSINFO | | | |
| Select 200NEC | 2000NEC | | | |
| Select VVYWH0 | 2009 Area & District Organization Changes | | | |
| Select 22122v | 2122 Newington, VA – Merifield, VA | | | |
| Select Fred | 2209-2020 | DC=USPS | DC=USA DC=DCE | DC=gov |
| Select Lawrence | 2209-2020 | DC=USPS | DC=USA DC=DCE | DC=gov |

Computer Crimes Unit eCase Information

Admin ▶ Approvers ▶ Examiner ▶ Investigator ▶ Reports ▶

Case Profile Information

*Case Number: [          ]

*Case Title: [          ]

☐ This case is restricted

*Case Agent: [          ]

*Examiner: [STEVE NGUYEN]

Note: [          ]

*Please enter case information and save; eInvestigator will provide you available selection for emails or files.*

CCU - eInvestigator 3.2
U.S. Postal Service Office of
Inspector General - 2008
snguyen - Logout
Change Password My Cases    New Case    Cheat Sheet    Suggestion
Welcome back STEVE NGUYEN!

Quick Message View

From: Sellers Emily
Sent: 10/29/2001 6:45:59 PM [GMT]
Received: 10/29/2001 2:45:59 PM [GMT]
To: Bargaher David K.; Brown William E.
CC: Fossum Drew
BCC:
Subject: Special ETS Legal Meeting Drew would like to have a short meeting tomorrow (Oct. 30) at 11:00 a.m. to bring us all up to date on Enron's current problems and to try and answer any questions we might have. The meeting shouldn't take more than 30 minutes. I have reserved 47C2 for those of us in Houston.

Ann: Drew can call Greg in Omaha to conference everyone in or if you want to get a conference room, let me know the phone number he'll need to call.

Thanks,

Emily Sellers
Enron Transportation Services Legal
1400 Smith Street, EB4771
Houston, TX 77001 (713) 853-7172
(713) 646-2738
emily.sellers@enron.com

*************
EDRM Enron Email Data Set has been produced in EML, PST and NSF format by ZL Technologies, Inc. This Data Set is licensed under a Creative Commons Attribution 3.0 United States License . To provide attribution, please cite to "ZL Technologies, Inc. (http://www.zlti.com)."
*************

Attachments:

Trace This Message
☑ Include all messages related to this conversation thread

Add to Bookmark: INAPPROPRIATE GILF ▼    New Bookmark Name: [          ]

FIG. 26

Computer Crimes Unit

Admin ▸ Approvers ▸ Examiner ▸ Investigator ▸ Reports ▸

Case Number: 10USHQ0020GC05GC - Case Title: 2010-DES RESEARCH & DEVELOPMENT

- ⊞ benjaminrogers001
- ⊞ billrapp000
- ⊞ billwilliamsiii000
- ⊞ bradmckay000
- ⊞ carasemperger000
- ⊞ carolstclair000
- ⊟ charlesvweldon000
- ⊟ My Bookmarks
  - CFO
  - CREDIT MEETING
  - GAME

Emails

| | Subject | Folder Location | CreationTime | LastModification | MD5HashVAlue |
|---|---|---|---|---|---|
| | game | carasemperger000\semperger-c\ExMerge-Semperger, Cara\Inbox | 5/11/2009 1:48:54 AM | 5/11/2009 1:48:54 AM | E8F0A1A59D18A420F34084E457DF9B4C |
| | Enron in Action 10.22.01 | billrapp000\rapp-b\BRAPP (Non-Privileged)\Rapp, Bill\Inbox | 5/8/2009 9:08:39 PM | 5/8/2009 9:08:39 PM | 0E9F9BBD30ADA2A62C255D4B3279FB8A |

Computer Crimes Unit eSearch

Admin ▶ Approvers ▶ Examirer ▶ Investigator ▶ Reports ▶

Case Number: 10USHQ0020GC05GC - Case Title: 2010-DES RESEARCH & DEVELOPMENT

Search Request: [_____]

Search Type: [All of the words ▼]    Help  [Search]  [Reset]

☑ Stemming ☐ Phonic Search    Fuzzy Search: [Disabled ▼]
☐ Search Only Email Messages  Advance Options  ☐ Exclude Bookmarked Items
⦿ All Items ◯ Selected Items ※ To Search for emails sent by "Johnxxx": change search type to BOOLEAN, type in Sender contains Johnxxx in the text box. This will returns all message that has the word "Johnxxx" in the sender field.
※ To Search for emails sent to "Johnxxx": change search type to BOOLEAN, type in Recipient contains Johnxxx in the text box. This will returns all message that has the word "Johnxxx" in the sent to field.
※ To Search for emails that have the word "CHILD" in the subject line: change search type to BOOLEAN, type in Subject contains Child in the text box. This will returns all message that has the word "Child" in the subject line.
※ To Search for data that has email address beginning with "J" from @yahoo.com: type in email(j*@yahoo.com) in the text box. This will returns all data that has email address beginning with letter "J" and domain @yahoo.com.
※ To Search for data that has email address beginning with "J" from @yahoo.com and sent date is between Jan 1, 2001 to Aug 1 2001: type in (email(j*@yahoo.com) and ("sent date" contains date(Jul 1 2001 to Aug 1 2001)) in the text box. This will returns all data that has email address beginning with letter "J" and domain @yahoo.com and was sert between given date range.

CCU - eInvestigator 3.2    My Cases  New Case  Browse Content  Horizontal View  Vertical View  Browse Images  Search
U.S. Postal Service Office of                    Cheat Sheet  Suggestion
Inspector General - 2008                         Welcome back STEvE NGUYEN!
snguyen - Logout
Change Password

FIG. 47

Computer Crimes Unit eSearch

Admin | Approvers | Examiner | Investigator | Reports
Case Number: 1DUSHQ00206C056C - Case Title: 2010-DES RESEARCH & DEVELOPMENT Search Request: gift All of the Words
☑ Stemming ☐ Phonic Search                         Help
☐ Search Only Email Messages             Fuzzy Search: Disabled
○ All Items ◉ Selected Items:            ☐ Exclude Bookmarked Items

| Email Folder | Other Folder |
|---|---|
| ☑ benjaminrogers001 | |
| ☐ billrapp000 | |
| ☑ billwilliamsiii000 | |
| ☐ bradmckay000 | |
| ☑ carasemperger000 | |
| ☐ carolstclair000 | |
| ☐ charlesweldon000 | |

Bookmark
☐ INAPPROPRIATE GIF

[ Search ]

My Cases   New Case   Browse Content   Horizontal View   Vertical View   Browse Images
                     Search   Cheat Sheet   Suggestion
                     Welcome back STEVE NGUYEN!

CCU - eInvestigator 3.2
U.S. Postal Service Office of
Inspector General - 2008
snguyen - Logout
Change Password

| Score | Document |
|---|---|
| 100 | Gift<br>...Sender: Semperger Subject: Gift Recipient: 'craigv@cmicro.com' Sent Date: 2002/02/06 18:59...<br>...way that you do, I feel like you are a gift that the universe has given to me. You are such...<br>14 k 1/23/2010 1:44:14 AM , 3 hit(s) |
| 67 | GO BUY A GIFT CERTIFICATE FOR RED LOBSTER FOR DONNA<br>...Sender: Semperger Subject: GO BUY A GIFT CERTIFICATE FOR RED LOBSTER FOR DONNA Sent Date: 2001/10...<br>...OU=NA/CN=RECIPIENTS/CN=CSEMPER> subject: GO BUY A GIFT CERTIFICATE FOR RED LOBSTER FOR DONNA filename: cara semperger 6 ...<br>11 k 1/23/2010 1:45:51 AM , 2 hit(s) |
| 65 | RE: Enron Elves<br>...generosity this holiday season, especially during this difficult time. Your gifts and donations will help bring holiday cheer into the lives...<br>...of our three adopted families. If you have chosen a gift tag from the tree: Please make sure your gift is...<br>19 k 1/23/2010 1:43:54 AM , 7 hit(s) |
| 61 | Enron Elves Update<br>...We were able to provide each family a number of gifts for the children as well as a gift certificate to Fred Meyer. We will be holding the drawing...<br>16 k 1/23/2010 2:38:47 AM , 3 hit(s) |
| 42 | Enron Elves Update<br>...We were able to provide each family a number of gifts for the children as well as a gift certificate to Fred Meyer. We will be holding the drawing...<br>15 k 1/23/2010 1:44:45 AM , 3 hit(s) |
| | RE: Enron Elves<br>...generosity this holiday season, especially during this difficult time. Your gifts and donations will help bring holiday cheer into the lives... |

FIG. 48

Computer Crimes Unit

Admin ▸   Approvers ▸   Examiner ▸   Investigator ▸   Reports ▸

Case Number: 10USHQ002GG055C - Case Title: 2010-DES RESEARCH & DEVELOPMENT

Search Request: [fraud]

[All of the words ▾]

☑ Stemming ☐ Phonic Search

☐ Search Only Email Messages

⦿ All Items ◯ Selected Items

Help

Fuzzy Search: [Disabled ▾]

☐ Exclude Bookmarked Items

[ Search ]

| Score | Document |
|---|---|
| 📄 100 | Re: Legal risk factors for Dash <br> ...coverage for up to one year if there is a fraud or material misrepresentation or omission by ENA in obtaining coverage... <br> ...policy also provides for revocation if the insurer subsequently discovers fraud on the part of the swap counterparty. However, we intend... <br> 22 < 1/23/2010 2:02:41 AM , 3 hit(s) |
| 📄 100 | Re: Legal risk factors for Dash <br> ...coverage for up to one year if there is a fraud or material misrepresentation or omission by ENA in obtaining coverage... <br> ...policy also provides for revocation if the insurer subsequently discovers fraud on the part of the swap counterparty. However, we intend... <br> 22 < 1/23/2010 2:07:51 AM , 3 hit(s) |
| 📄 100 | Re: Legal risk factors for Dash <br> ...coverage for up to one year if there is a fraud or material misrepresentation or omission by ENA in obtaining coverage... <br> ...policy also provides for revocation if the insurer subsequently discovers fraud on the part of the swap counterparty. However, we intend... <br> 22 < 1/23/2010 2:13:27 AM , 3 hit(s) |
| 📄 100 | Re: Legal risk factors for Dash <br> ...coverage for up to one year if there is a fraud or material misrepresentation or omission by ENA in obtaining coverage... <br> ...policy also provides for revocation if the insurer subsequently discovers fraud on the part of the swap counterparty. However, we intend... |

Computer Crimes Unit

Admin ▶ Approvers ▶ Examiner ▶ Investigator ▶ Reports ▶

Case Number: 10USHQ0020GC055C - Case Title: 2010-DES RESEARCH & DEVELOPMENT

Search Request: [          ]

☑ Stemming ☐ Phonic Search      Help

☐ Search Only Email Messages    Fuzzy Search: [Disabled ▼]

○ All Items ● Selected Items    ☐ Exclude Bookmarked Items

Folder
- ☐ benjaminrogers001
- ☐ billrapp000
- ☐ billxilliamsili000
- ☐ bradmckay000
- ☐ carasemperger000
- ☐ carolstclair000
- ☐ charlesweldon000

Bookmark
- ☐ CFO
- ☐ CREDIT MEETING
- ☐ GAME

[Search]

CCU - eInvestigator 3.2
U.S. Postal Service Office of Inspector
General - 2008
sherritage - Logout
Change Password My Cases   New Case   Browse Content   Horizontal View   Vertical View   Browse Images   Search   Cheat
                                                        Welcome back SUZANNE HERMITAGE!

FIG. 51

Computer Crimes Unit

Email Search

Admin ▸ Approvers ▸ Examiner ▸ Investigator ▸ Reports ▸

Case Number: 10USHQ0020GC05GC - Case Title: 2010-OES RESEARCH & DEVELOPMENT
Email Search Option (Enter partial key words)

| Sender: | [                    ] | ⦿ And ◯ Or |
| Recipient: | [                ] | ⦿ And ◯ Or |
| Sent Date: | [     ] to [     ] | |
| Subject: | [                 ] | ⦿ And ◯ Or |
| Other Keyword: | [              ] | ⦿ And ◯ Or |

Help

☑ Stemming ☐ Phonic Search    Fuzzy Search: [Disabled ▾]
☑ Search Only Email Messages    ☐ Exclude Bookmarked Items
⦿ All Items ◯ Selected Items

[ Search ]  [ Reset ]

My Cases   New Case   Browse Content   Horizontal View   Vertical View   Browse Images   Search
Cheat Sheet   Suggestion
Welcome back STEVE NGUYEN!

CCU - eInvestigator 3.2
U.S. Postal Service Office of
Inspector General - 2008
snguyen - Logout
Change Password

| From: | Smith Will |
|---|---|
| Sent: | 8/14/2001 3:02:26 PM[GMT] |
| Received: | 8/14/2001 11:02:26 AM[GMT] |
| To: | Semperger Cara; Martin Karen Y |
| CC: | |
| BCC: | |
| Subject: | RE: Deal Scheduling Is Ready for Testing |

Cara,

Do you have a couple of specific deal numbers we can research?

Thanks,
Will

-----Original Message-----
From: Semperger, Cara
Sent: Monday, August 13, 2001 3:19 PM
To: Martin, Karen Y
Cc: Smith, Will; Bentley, Corry
Subject: RE: Deal Scheduling Is Ready for Testing I have looked at deal Scheduling, and have tried to pull up data for a range of dates, no data will show Can you tell me a date range in Test P that has scheduling populated? I was trying to work days that cc PreSchedule workspace on. No luck Those Dates are June 16-22. I also tried looking at various days in July Thanks, Cara -----Original Message-----
From: Martin, Karen Y

SYSTEM AND METHOD FOR DIGITAL EVIDENCE ANALYSIS AND AUTHENTICATION

CROSS-REFERENCE TO RELATED APPLICATIONS

The present application is a continuation of and claims priority to U.S. patent application Ser. No. 12/913,623 filed Oct. 27, 2010 and entitled "System and Method for Digital Evidence Analysis and Authentication," set to issue as U.S. Pat. No. 9,147,003 on Sep. 29, 2015, which claims the priority benefit of U.S. provisional application No. 61/342,976 filed Apr. 22, 2010 entitled "System and Method for Digital Evidence Analysis and Authentication," the entire disclosures of which are incorporated herein by reference.

BACKGROUND

Field of Invention

The present invention relates to computer forensic systems and, more specifically, to a system for rapidly and efficiently acquiring email and other data from computers and providing a secure and productive environment for the investigation of that data.

Description of the Related Art

The forensic community has examined a variety of ways to share forensic data so that it can be reviewed by customers or in the case of this invention, investigators. One solution that is in common usage is the burning of data to CD's, DVD's, or hard drives and then shipping these to the investigators to review. Unfortunately, this does not allow for much collaboration. Also, it is hard to see what the investigator was seeing or follow along with his review.

Some other alternatives are traditional forensic software programs such as EnCase® from Guidance Software and the Forensic Tool Kit (FTK) from AccessData. Neither allows for automated extraction of email from email servers. Neither provides the ability for different personnel to review the data simultaneously via a graphical user interface web environment.

Clearwell's e-Discovery software provides some desired functionality. Again, though, that solution has no automated component for extracting and managing email from email servers. It is also hard to learn. The entire model around Clearwell is centered on electronic discovery. It is in particular oriented towards a company having a small number of cases that would support a civil defense. It is not directed towards those who have many (often small) cases being reviewed at the same time to support criminal prosecutions. Indeed, this orientation for the Clearwell technology makes it hard to use in the context of criminal investigations.

It would be advantageous to provide a system that addresses the needs of law enforcement agencies that would use such a system to prepare numerous smaller cases for prosecution and trial.

SUMMARY OF THE CLAIMED INVENTION

The system disclosed provides an efficient mechanism for acquiring email and other data from remote systems in a forensically sound manner. Email for users can be requested by investigators from email servers across the country. It can then be automatically acquired and made available to the examiner, subject to approval, and any others he deems have a need-to-know on a web based system. The data can be searched and bookmarked, and the bookmarks shared. Data can also be uploaded manually and combined with email data in the searching, bookmarking, and sharing.

A method is provided for acquiring email and other data from computers and providing a secure and productive environment for the investigation of that data. A request is accepted in a computer system from a requester for a set of data files containing email for a first specific person. A request is accepted in the computer system from the requester for authorization for the request for the first set of data files. The request for authorization is transmitted to a set of authorizers. An authorization is received from one of the set of authorizers for the request for the first set of data files in response to the request for authorization, thereby creating a first authorization request. The first authorization request is transmitted over a data communications network to a first server system containing the first set of data files. The first set of data files is received over the data communications network from the first server system at the computer system in response to transmitting the first authorization request. The first set of data files from the first server system are made available in the computer system to the requester as one of a set of authorized reviewers of the first set of data files.

BRIEF DESCRIPTION OF THE DRAWINGS

FIG. 5 is a block diagram illustrating the Evidence Review process in the prior art;

FIG. 6 is a block diagram illustrating the Evidence Review process in accordance with one embodiment of the present invention;

FIG. 11 shows a menu that results from selecting "Request PST File" in FIG. 11;

FIG. 12 shows an "adding item" window that appears after the "Save Case" button has been clicked, in accordance with one embodiment of the present invention;

FIG. 13 shows an address book screen that appears when "Add Selected User to This Request" button is clicked on the "Adding Item" window shown in FIG. 12;

FIG. 17 shows a window that results from the Adding Item window, in accordance with one embodiment of the present invention;

FIG. 19 shows a Redirect Pull Request window activated by the actions shown in FIG. 18;

FIG. 21 shows a Create Case Profile window activated as shown in FIG. 20;

FIG. 22 shows the Create Case Profile window from FIG. 21 that has been partially filled in;

FIGS. 24 and 25 show Case Browse and Search windows showing other Browsing Email Folders, in accordance with the embodiment shown in FIG. 23;

FIG. 26 shows a Quick Message View window that displays a Quick View of a selected email message, in accordance with the embodiments shown in FIG. 25;

FIG. 29 shows a Case Browse and Search window that displays the contents of a bookmark, in accordance with one embodiment of the present invention;

FIG. 33 shows a Case Information window that is activated when an examiner selects Edit Case Information in FIG. 31;

FIG. 34 shows a Case Browse and Search window that depicts how a user can bookmark item(s), in accordance with one embodiment of the present invention;

FIGS. 37 and 38 show a Bookmark panel in a Case Browse and Search window activated from the Bookmarks window shown in FIG. 36;

FIG. 40 shows a Bookmark window depicting the selecting of Viewing Email Attachments, in accordance with one embodiment of the present invention;

FIG. 42 shows an Email Attachment window as shown in FIG. 41, with the attachments grouped by file extension;

FIG. 45 shows an Approver window, in accordance with one embodiment of the present invention;

FIG. 46 shows an Email Search page, in accordance with one embodiment of the present invention;

FIG. 47 shows a Search Window, in accordance with one embodiment of the present invention w;

FIG. 48 shows a results window from searching performed in FIG. 47;

FIGS. 49, 50, and 51 show Search Windows displaying results from a "stemming" search, in accordance with one embodiment of the present invention;

FIG. 52 is an Advanced (Search) Options window, activated by the search in FIG. 48;

FIGS. 53 and 54 show windows displaying emails, in accordance with one embodiment of the present invention;

FIG. 55 shows a window displaying an email in PDF format, in accordance with one embodiment of the present invention;

FIG. 58 shows an Upload File window as launched in FIG. 57; and

DETAILED DESCRIPTION

Figure 1:
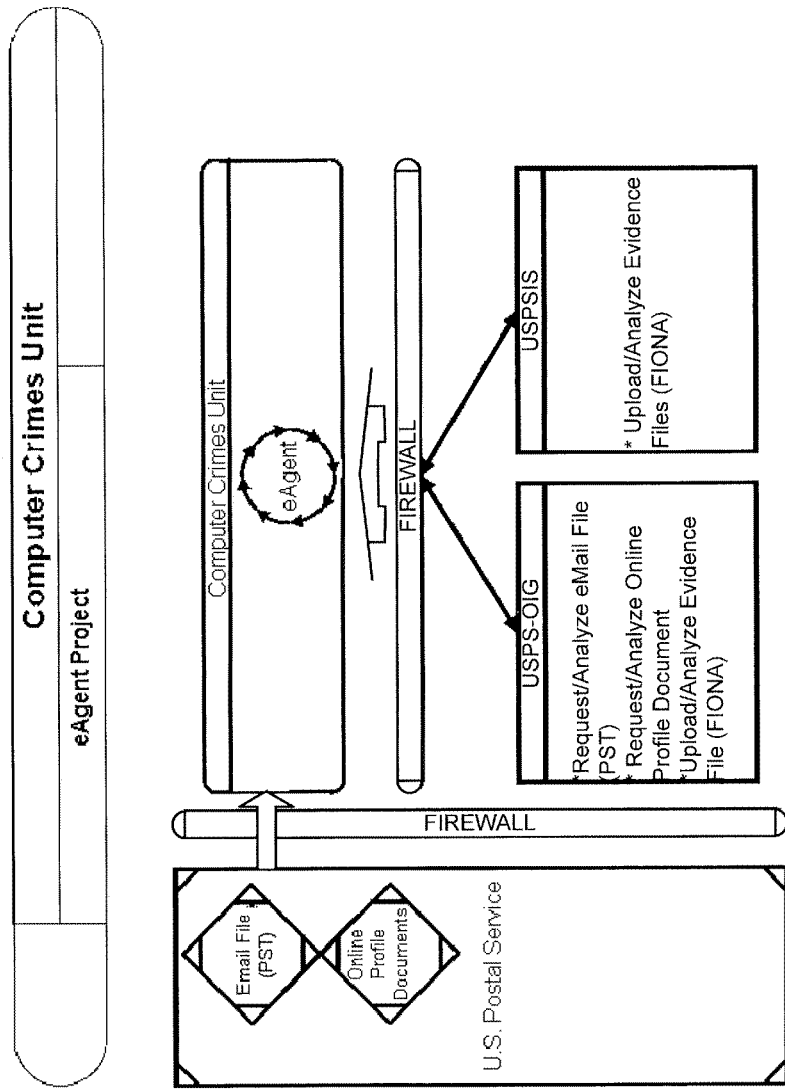
FIG. 1 is a block diagram illustrating Inter-Agencies Integration and Communication, in accordance with one embodiment of the present invention.

The current implementation of the present invention disclosed in the preferred embodiment in this disclosure is the "eInvestigator" system deployed by the Computer Crimes Unit (CCU) of the United States Postal Service (USPS). The CCU primarily provides support for investigating computer crimes to the USPS. The CCU is both a technical computer crimes investigations team and a technical forensic examination team that provides support to special agents conducting criminal and administrative investigations. The CCU has an applications development capability that currently helps support digital evidence analysis supporting more than 500 special agents. The primary clients of the CCU are special agents from the United States Postal Inspection Service (USPIS) and the Office of Inspector General (USPS-OIG) for the USPS.

The current implementation of the present invention may operate in this manner. A computer forensics examiner, for example, is requested to forensically capture the data from a subject's office computer hard drive, the subject's office email file, documents from the worker's shared folders, and so forth. The examiner collects the data and then has a conversation with the requesting investigator who may say, "I want to see all this data but I just want the spreadsheets because this is a financial related case". So the spreadsheets or any other requested data are pushed into the system online storage area for that customer. The investigator then logs into the portal and is allowed to search and bookmark this data in a Google-like environment. In addition, if a user is viewing email, he or she will be offered the option of getting a graphic representation of the email relationships among the participants in an email conversation. Finally, the investigator can print out relevant bookmarked files, which will also preferably contain the origin and data integrity documentation that ensure the authenticity of this information. This is just one example of the many uses of this system.

Possibly more importantly, as the forensic examiner conducts the technical analysis of an investigation he or she is free to take a look at the related investigator's searches and bookmarks. It is envisioned that this will create a more collaborative environment between the customers and forensics personnel.

A method is provided for acquiring email and other data from computers and providing a secure and productive environment for the investigation of that data. A request is accepted in a computer system from a requester for a set of data files containing email for a first specific person. A request is accepted in the computer system from the requester for authorization for the request for the first set of data files. The request for authorization is transmitted to a set of authorizers. An authorization is received from one of the set of authorizers for the request for the first set of data files in response to the request for authorization, thereby creating a first authorization request. The first authorization request is transmitted over a data communications network to a first server system containing the first set of data files. The first set of data files is received over the data communications network from the first server system at the computer system in response to transmitting the first authorization request. The first set of data files from the first server system are made available in the computer system to the requester as one of a set of authorized reviewers of the first set of data files.

What is eInvestigator? It is a forensic data sharing web portal tool. This application allows all of the forensic examiners from around the country to share their digital evidence with one investigator or multiple investigators. How does eInvestigator work? For example, the forensics examiner may be requested to collect the data from the hard drive of a subject's work computer, work e-mail file, shared folders, or other files. The examiner collects the data and then has a conversation with the investigator who may say "I want to see all this data, but I just want the Excel spreadsheets from the hard drive because this is a financial related case." So the spreadsheets and other requested data are pushed into the eInvestigator portal storage area. The investigator then logs into the portal and is allowed to search and bookmark this data in a Google-like environment. In addition, if a particular email is significant, the investigator can generate a picture depicting how the email traveled to and from recipients. Finally, the investigator can print out relevant bookmarked files, which will also contain the origin and data integrity documentation that ensure the authenticity of this information. This is just one example of the many uses of eInvestigator. More importantly, as the forensic examiner conducts the technical analysis of an investigation, the examiner is free to look at the investigator's searches and bookmarks. This creates a collaborative learning process between the two.

There are currently two ways that data can get into the eInvestigator system.

First, data can be uploaded into the system by an Examiner. When an examiner uploads files into eInvestigator via the FIONA module, FIONA performs MD5 and SHA1 hashes of each individual file that the examiner selects. A comprehensive hashing report is produced for the examiner for record keeping and visual verification. FIONA will compare the hash results and alert the examiner of any mismatch if the original hash reported is provided by the examiner.

Once the files are received by eInvestigator, the parsing and indexing engine will perform MD5 and SHA1 hashes of each individual file. The hash values of each file is tracked along with other file information such as file name, folder location, and MAC (file system metadata) in a database. eInvestigator displays the file hash value along with other meta information when user reviews the file or prints a report.

The second alternative is for the required data to be extracted and pulled into the eInvestigator system by an automated processes.

a. ShreKA module: When a user requests email data via eInvestigator, eInvestigator sends the request to the ShreKA module. ShreKA extracts emails from the USPS messaging system into a PST file. Once the extraction is completed, ShreKA performs MD5 and SHA1 hashing on the resulting PST file. ShreKA then encrypts the PST file using 3DES algorithm. The encrypted PST file is then sent back to eInvestigator along with other information such as the workstation name, IP address, service account, date and time of the extraction, and Operating System version where the extraction took place.

When eInvestigator receives the encrypted PST file, it will try to decrypt the file. If the file can be decrypted, it will perform MD5 and SHA1 hashing of the decrypted file. If the MD5 and SHA1 hashes matches the original MD5 and SHA1 hashes, eInvestigator will pass the file to the parsing/indexing engine. If the MD5 and SHA1 do not match the original hashes, the file will be rejected and ShreKA will be requested to send the file again and again until the MD5 and SHA1 hashes can be validated.

During the parsing and indexing process, individual items in the PST file are extracted and MD5 and SHA1 hashed. The MD5 hash value is tracked along with other items' attributes in the database. These values are displayed when a user chooses to view or print the item.

b. PSTTracker Module: When a user requests RISS email data (HP's email archiving system at USPS) via eInvestigator, eInvestigator sends the request to the USPS Information Catalog Team. The team extracts emails manually from the RISS system and exports them to a PST file. Once the extraction is completed, MD5 and SHA1 hashes are performed on the resulting PST file. The hash results report and PST file are placed on a restricted share folder for the USPS-OIG Computer Crimes Unit (CCU) to pickup.

PSTTracker picks up the PST file and the hash report from the restricted share folder. It performs MD5 and SHA1 hashes on the PST file. The hash results are compared with the original hash values in the hash report of the file. PSTTracker tracks the MD5 and SHA1 hashes in a database, and then the PST file is sent to eInvestigator for parsing and indexing.

During the parsing and indexing process, individual items in the PST file are extracted and MD5 and SHA1 hashed. The hash values are tracked along with other item's attributes in the database. These values are displayed when a user chooses to view the item.

The second alternative is to Download PST files from eInvestigator

There will be occasions in which a CCU examiner will wish to download a PST file from eInvestigator into his/her forensic workstation for analysis. During the downloading process, eInvestigator will log date/time, examiner workstation name, IP address, log on ID, and selected download destination folder. Once the download is completed, eInvestigator will attempt to decrypt the PST file. If the file can be decrypted, it will perform MD5 and SHA1 hashes of the decrypted file, and then compare the hash results with the original hashes (tracked in the database). If the hashes are matched, the system will inform the examiner that the PST file was downloaded and verified successfully. Otherwise, eInvestigator will delete the PST file from the selected download folder, alert the examiner of the mismatch, and ask the examiner to try to download the file again or contact the CCU system administrator.

The system provides a number of benefits to forensic examiners, especially when dealing with larger numbers of cases on an ongoing basis. One advantage is that chain of custody is automatically maintained throughout, from before email is extracted until the analysis is complete. Such a chain-of-custody is necessary for utilizing evidence in court. Since the system provides the automated chain-of-custody verification, it is far more robust than if there were manual steps required. Another advantage is that evidence, often containing substantial personal information, is only available on a need-to-know basis. Such access can be easily controlled by the agent in charge. Collaboration is also enhanced. Different investigators and examiners can share access to data, as well as their bookmarks to the data. Another advantage is that data, and in particular email data, can be rapidly acquired from computer systems and email servers all across the country, and, indeed, around the world. Users of the system can expect that most of their requests for, say, the email of some employee, be fulfilled within 24 hours, instead of within the next month, as is common in the prior art.

FIG. 1 is a block diagram illustrating Inter-Agencies Integration and Communication, in accordance with one embodiment of the present invention. It shows the organization structure of a portion of the United States Postal Service. The USPS-OIG agents can request/analyze email (PST) files. They can request/analyze online profile documents. And they can utilize the current system to upload forensics evidence utilizing the USPS FIONA system. The USPSIS agents can upload and analyze evidence files utilizing the USPS FIONA system. Both the USPS-OIG and the USPSIS communicate with the Computer Crimes Unit (CCU) via a firewall utilizing a web browser based system. The CCU provides eAgents to assist the USPS-OIG and USPSIS agents. The CCU communicates with the rest of the USPS to upload Email (PST) files and online profile documents across another firewall.

Figure 2:
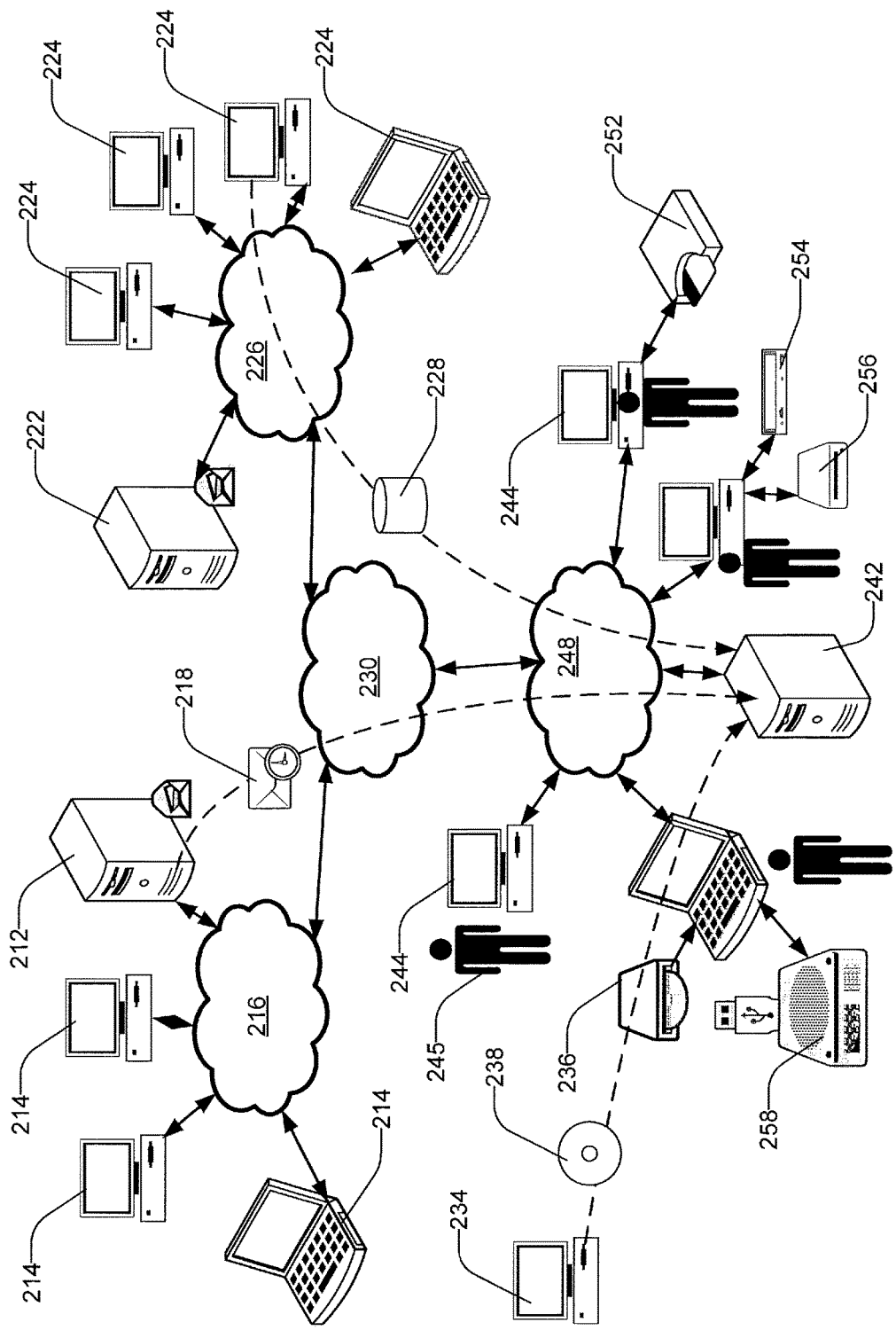
FIG. 2 is a block diagram illustrating the interaction of various components and people in executing the current invention.

FIG. 2 is a block diagram illustrating the interaction of various components and people in executing the current invention operationally. The ultimate purpose of the system is to make files available, on a need-to-know basis to users 245 such as USPS-OIG and USPSIS agents. Employees utilize computers 214 to perform work, including sending and receiving email. The email is available to USPS employees on an email server 212. This email server 212 may be running as a Microsoft Exchange Server. Upon request, a PST file containing an employee's email may be downloaded to the CCU server 242. The computers 214 are in a local network 218 having an Microsoft Exchange or email server 212. This network 218 may be connected to the CCU server 242 utilizing a local network 218 optionally via a regional, national, or international network 230.

Similarly, the second network 228 connects to the third network 242 through an intermediary network 230. A request can be made to download the contents of the hard drive of one of computers 224 of one of the users. The disk is imaged, and the image 228 is transmitted across the local network 226, the global network 230, the CCU's network 242, and thence to the CCU computers 244, where users 245 can be CCU investigators.

Similarly, a computer not connected to a network may contain data that needs to be reviewed. The email or other file is transmitted by CD/DVD 238 to a CD/DVD reader 236 connected to a computer 244 connected to the CCU network 248. At that point, the data can be uploaded to the CCU server 242.

The fourth network 242 is connected to the global network 230. That network 248 is connected to a number of desktop and laptop computers 244 as well the CCU eInvestigator server 242 via the fourth network 248. Different methods are shown above for uploading files to that server 242. Different types of devices are supported for future growth. For example, a smart card 252 is connected to the one of the computers 252 or to the server 252. Similarly, an optical drive 254, Zip drive 256, or removable hard drive 258 contents can be uploaded to the CCU server 242 for analysis by Examiners and Agents. This is illustrative and other methods and physical media are also within the scope of the present invention.

Figure 3:
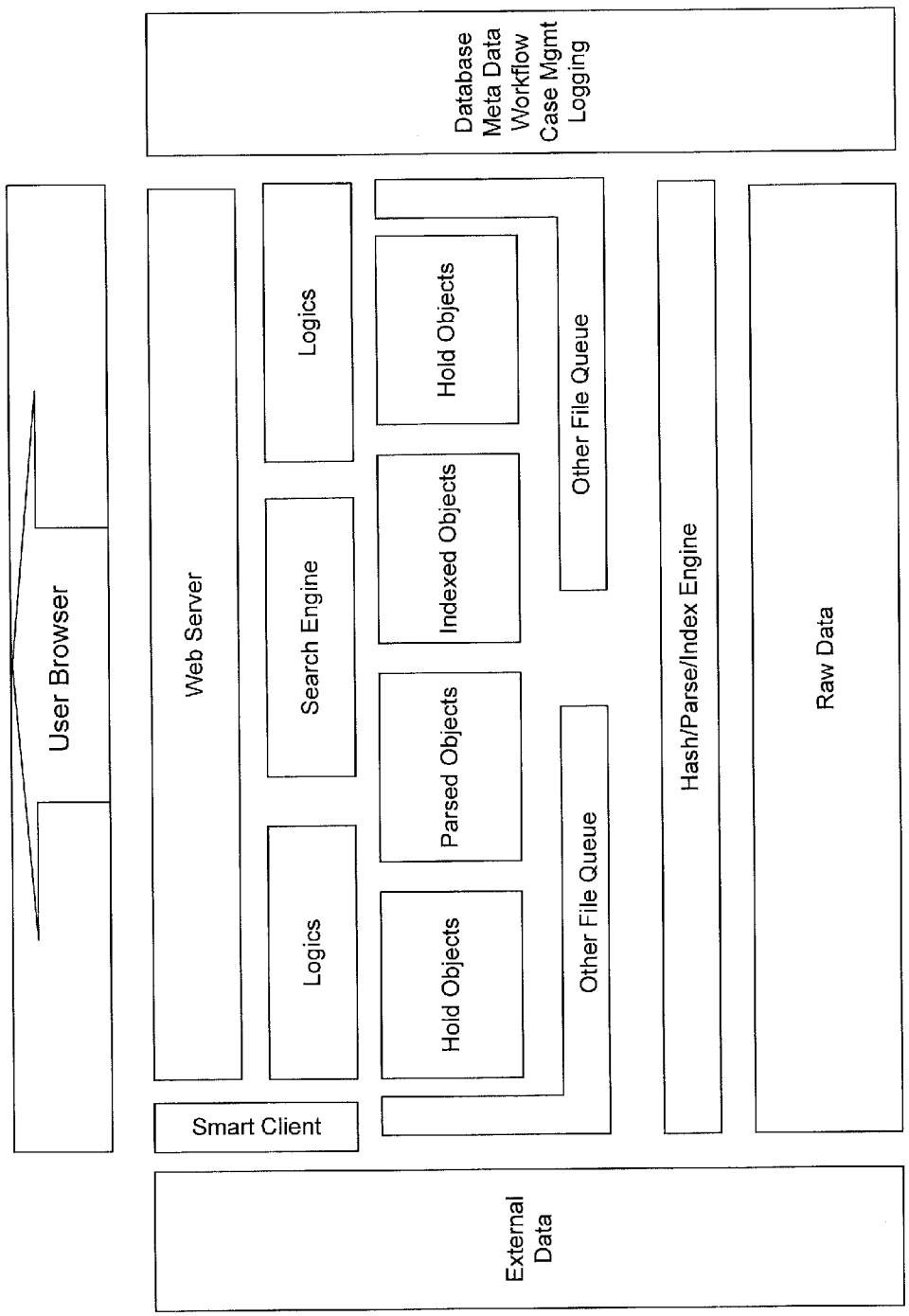
FIG. 3 is a block diagram showing a conceptual design overview of one embodiment of the current invention with distributed technologies in context.

FIG. 3 is a block diagram showing a conceptual design overview of one embodiment of the current invention with distributed technologies in context.

Figure 4:
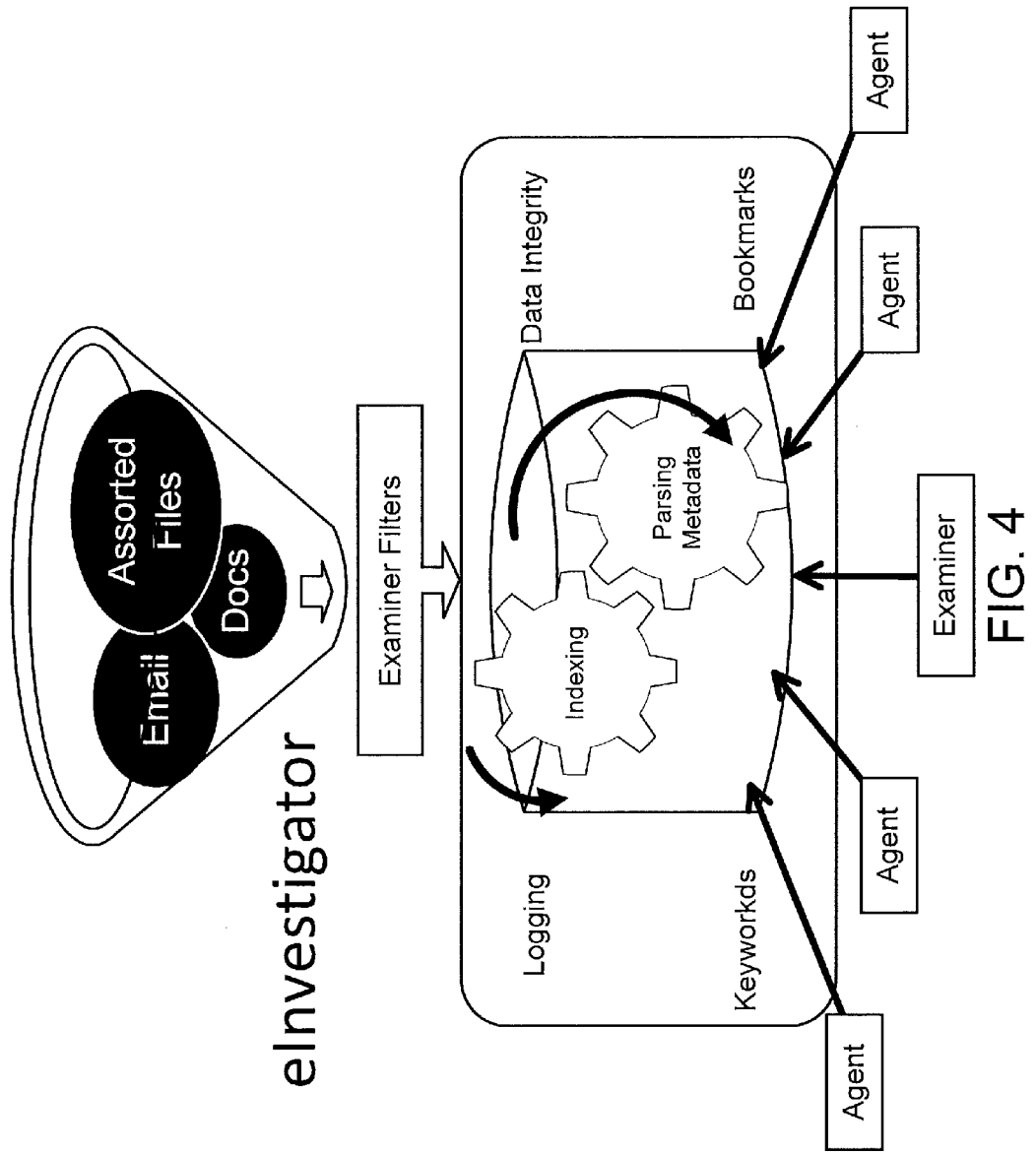
FIG. 4 is a block diagram showing a high level overview of a process in accordance with one embodiment of the present invention that extends from extracting raw data to presenting data to agents or investigators.

FIG. 4 is a block diagram showing a high level overview of a process in accordance with one embodiment of the present invention that extends from extracting raw data to presenting data to agents or investigators.

FIG. 5 is a block diagram illustrating the Evidence Review process in the prior art. Data is gathered, typically, offline in Step 1 501. The data is also filtered in Step 2 502. The data is uploaded in Step 3 503, searched and benchmarked in Step 4 504, a reviewer produces a report Step 5 505, and the information may be utilized in a court or hearing as testimony in Step 6 506.

FIG. 6 is a block diagram illustrating the Evidence Review process in accordance with one embodiment of the present invention. An agent signs onto the eInvestigator system in Step 1 511. He then requests that email be extracted in Step 2 512. The email is placed in the agent's case folder typically within 24 hours in Step 3 513. The agent then searches, filters, and bookmarks the emails in Step 4 514 and produces reports in Step 5 515. The examiner can then utilize this information in his testimony in court or at a hearing in Step 6 516.

Note some of the advantages of the present invention. Everything up until the reports are generated in Step 5 is online. And, as a result, it is significantly quicker. For example, in the prior art, it would often take up to a month to request and receive an email directory for an employee. With the current invention, it typically takes less than 24 hours.

One of the unexpected advantages of the present invention was the discovery that most email servers retain deleted emails for 30 or 45 days. Acquiring the email folder, including all such deleted messages within 24 hours instead of 30 days in the prior art significantly reduced the number of deleted email messages lost through this process. And, not surprisingly, that can be the difference between a successful case and an unsuccessful case, since the natural reaction from some people when they discover they are under investigation is to delete their potentially incriminating emails.

Figure 7:
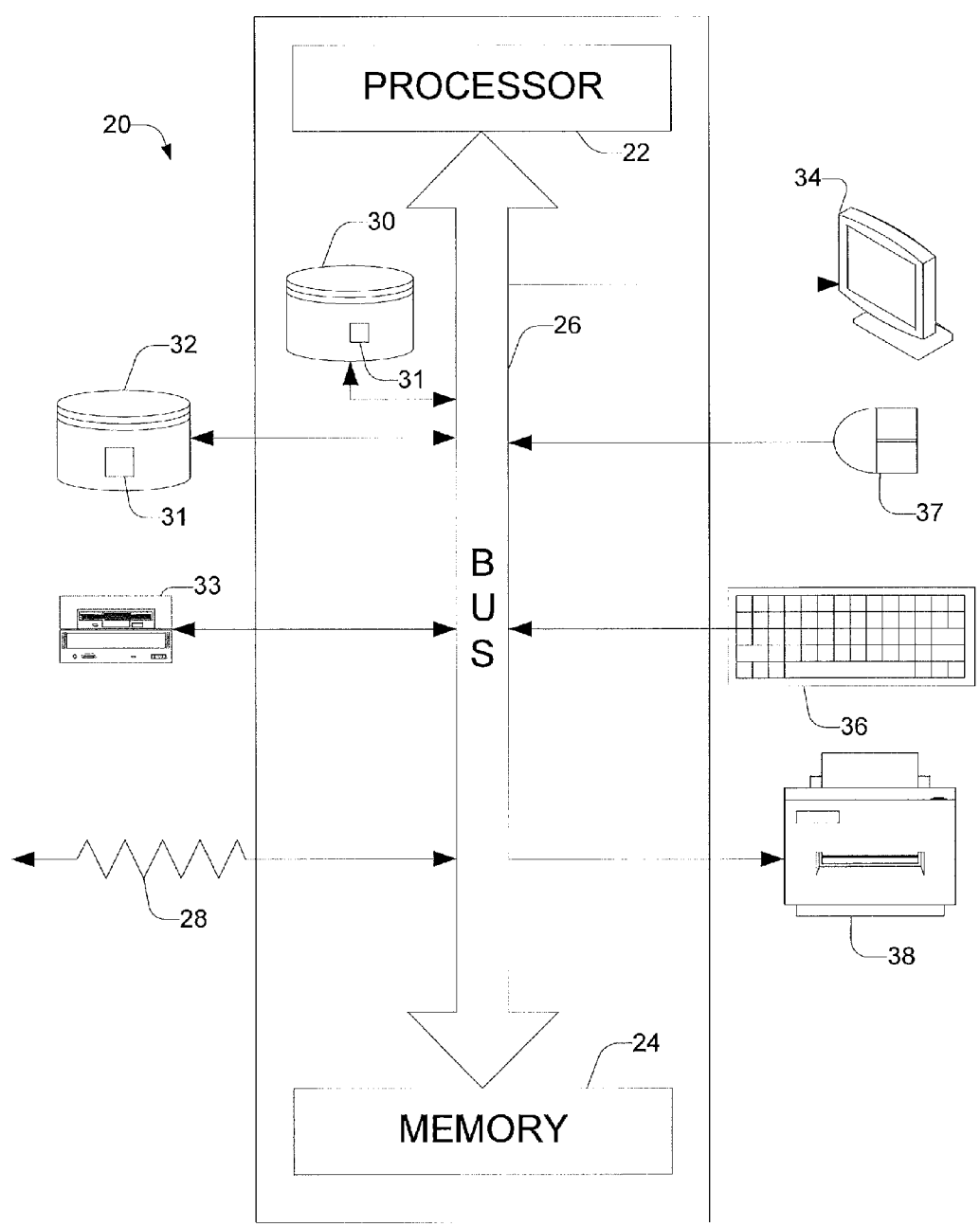
FIG. 7 is a block diagram illustrating a general purpose computer.

FIG. 7 is a block diagram illustrating a general purpose computer, as utilized as servers 212, 222, 242 and user computers 214, 224, 244 in FIG. 2. The General Purpose Computer 20 has a Computer Processor 22, and Memory 24, connected by a Bus 26. Memory 24 is a relatively high speed machine readable medium and includes Volatile Memories such as DRAM, and SRAM, and Non-Volatile Memories such as, ROM, FLASH, EPROM, EEPROM, and bubble memory. Also connected to the Bus are Secondary Storage 30, External Storage 32, output devices such as a monitor 34, input devices such as a keyboard 36 with a mouse 37, and printers 38. Secondary Storage 30 includes machine-readable media such as hard disk drives, magnetic drum, and bubble memory. External Storage 32 includes machine-readable media such as floppy disks, removable hard drives, magnetic tape, CD-ROM, and even other computers, possibly connected via a communications line 28. The distinction drawn here between Secondary Storage 30 and External Storage 32 is primarily for convenience in describing the invention. As such, it should be appreciated that there is substantial functional overlap between these elements. Computer software such test programs, operating systems, and user programs can be stored in a Computer Software Storage Medium, such as memory 24, Secondary Storage 30, and External Storage 32. Executable versions of computer software 33, such as the eInvestigator system can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution. It should be noted that this description is exemplary, and other system architectures are also within the scope of the present invention.

Figure 8:
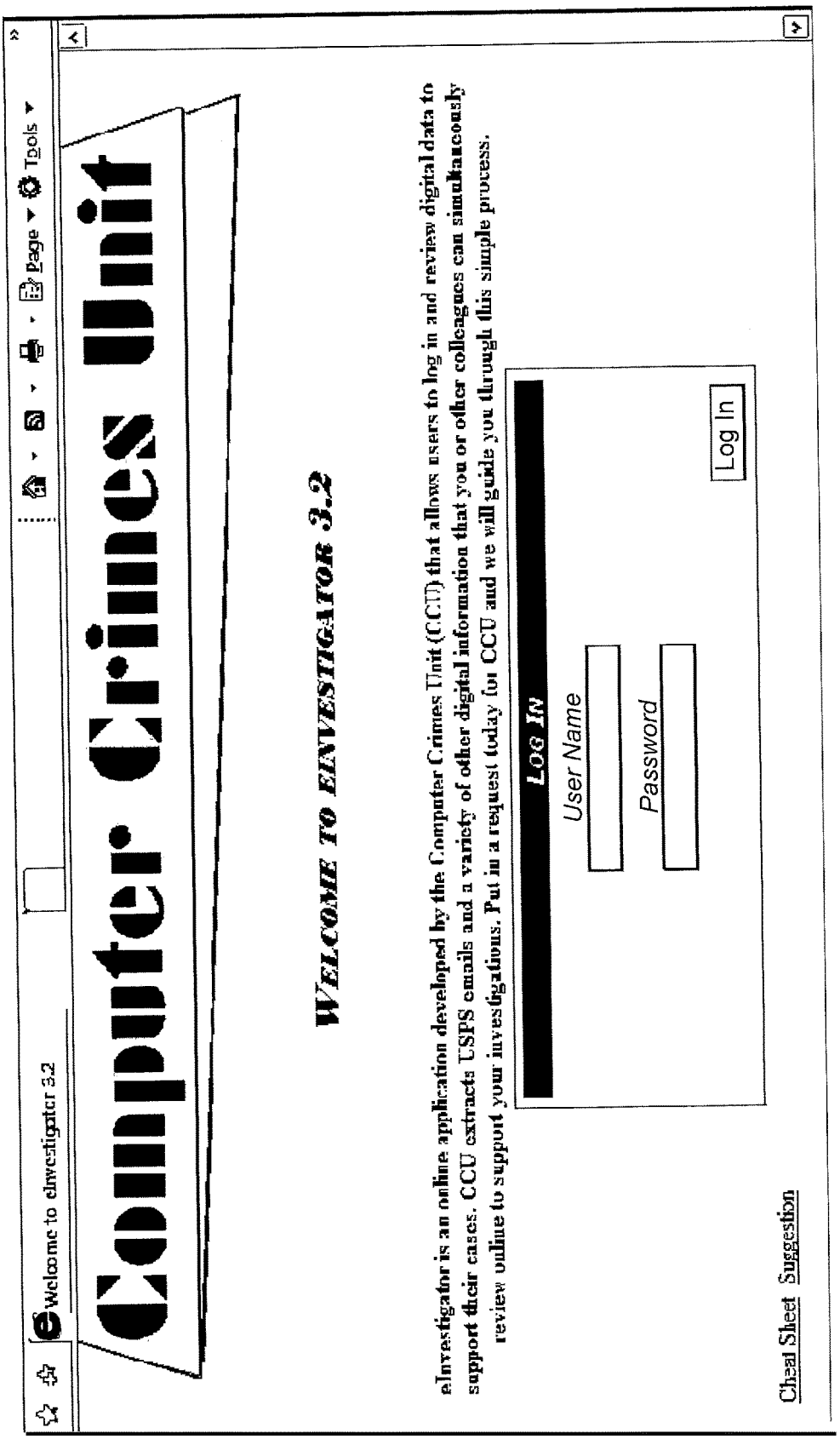
FIG. 8 shows the entry screen for the eInvestigator system, the current implementation of one embodiment of the present invention.

FIG. 8 shows the entry screen for the eInvestigator system, the current implementation of one embodiment of the present invention. In the current embodiment, there are different URL addresses to access this system, depending on whether the person using the system is currently using a forensics computer and is logged onto the forensics network, or whether he is using an OIG (Office of Inspector General) computer and signed onto the OIG network. The user signing into the system is required to provide his user name and password.

Figure 9:
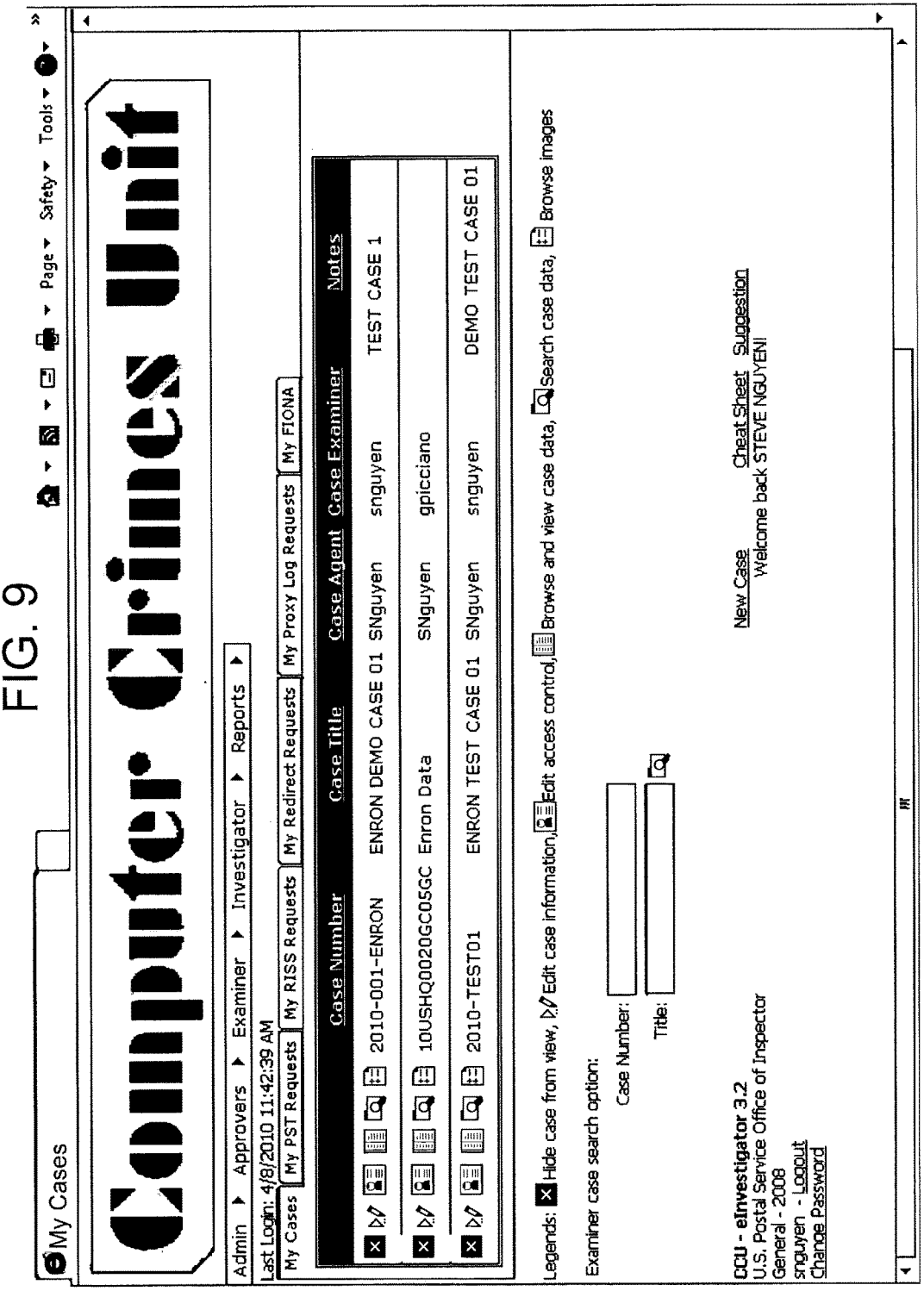
FIG. 9 shows an initial window provided a user after signing on to the system, in accordance with one embodiment of the present invention.

FIG. 9 shows an initial window provided a user after signing on to the system. In this FIG., six tabs are shown: "My Cases", "My PST Requests", "My RISS Requests", "My Redirect Requests", "My Proxy Log Requests", and "My FIONA" requests. These tabs will be discussed below. Once logged on, the system will automatically display a list of the user's existing cases on his "My Cases" tab. Each case listed will show icons for different actions, if relevant to that case:

☒ Hide: hide case from listing

✎ Edit: edit case information; add/remove items from case.

▣ Permission: change case permission

▤ Select: select to work on the case

🔍 Search: jump directly to search of the given case

▤ Browse Image: jump directly to browse images of the case

There is also available on this window an Examiner Case Search Option, which provides text boxes for "Case Number" and for case "Title". There are also links to "New Case", "Cheat Sheet" and "Suggestion".

At the top of each screen are menu identifiers for: "Admin", "Approvers", "Examiner", "Investigator", and "Reports". Except for the last, these menu identifiers designate different roles that a person might have. For example, a person might be both an Approver and an Examiner. When operating in the "Approver" role, the "Approvers" menus would be utilized, and when operating in the "Examiner" role, the "Examiner" menus would be utilized. Which menus are enabled is typically dependent upon the Userid of the user who signed in. In this embodiment, menus not authorized for a user are not active, and may, for example, be grayed out. In another embodiment, the unauthorized menus are not displayed. This is controlled by access rights for each system users detailing what users have access to and can control what information. As will be seen in subsequent FIGS., selecting one of these menus will result in a drop down first level menu, from which the user can select actions or activate second level menus for a given topic or action.

In this embodiment, the CCU (Computer Crimes Unit) has a mix of agents and non-agents. Agents may be viewed as the people who are authorized to carry a gun. They are essentially law enforcement officers. An Investigator is the case agent, and is typically the person with the most knowledge of a case. It is his or her case. He may carve out files and upload them to this system. He may also request different types of files, such as email hives, be uploaded. An examiner is someone who works for the CCU. In many case, the Investigator is the person in the field investigating a crime or potential crime, and the Examiner is back in the CCU providing assistance, as needed.

Uploading or acquiring files internally, and that includes internal email hives for one or more email users, requires formal approval, and that is provided by an "Approver". In many cases, this is required legally. But even when it is not legally required, it is typically advantageous requiring that these sorts of requests for confidential and/or private information are subject to external approval. The present invention provides an efficient mechanism for approval of such requests. Finally, "Admin" personnel provide Administrative support for the system. For example, they may reset passwords and disable or enable user ids.

Figure 10:
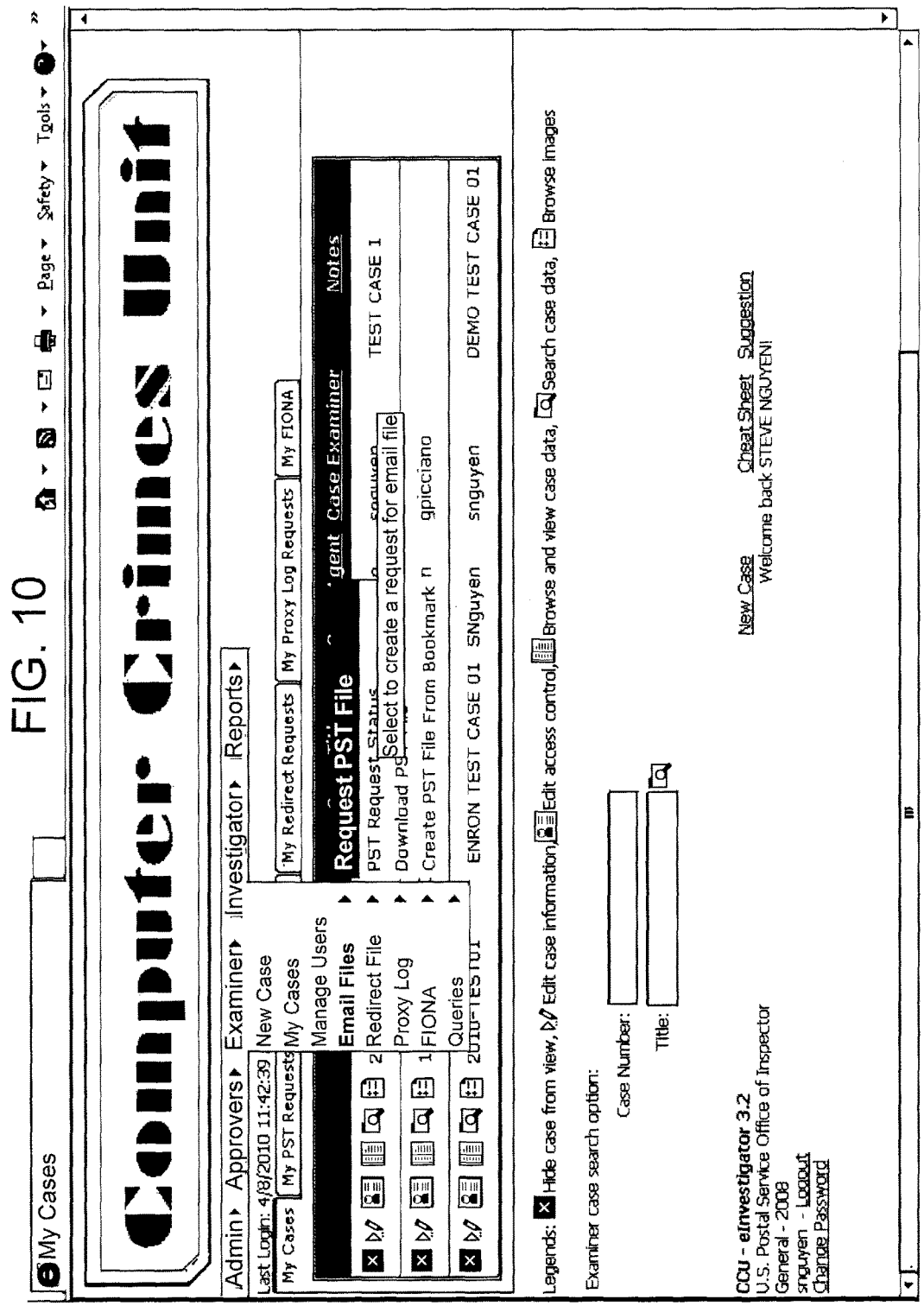
FIG. 10 shows a Create New Email Request window, in accordance with one embodiment of the present invention.

FIG. 10 shows a Create New Email Request window. This window can be launched by selecting "Examiner" from the main menu, "Email Files" from the first level of pull-down menus, and then select "Request PST File" from the second level of pull-down menus. In this FIG., an associated context sensitive balloon appears stating "Select to create a request for USPS email file".

Figure 11:
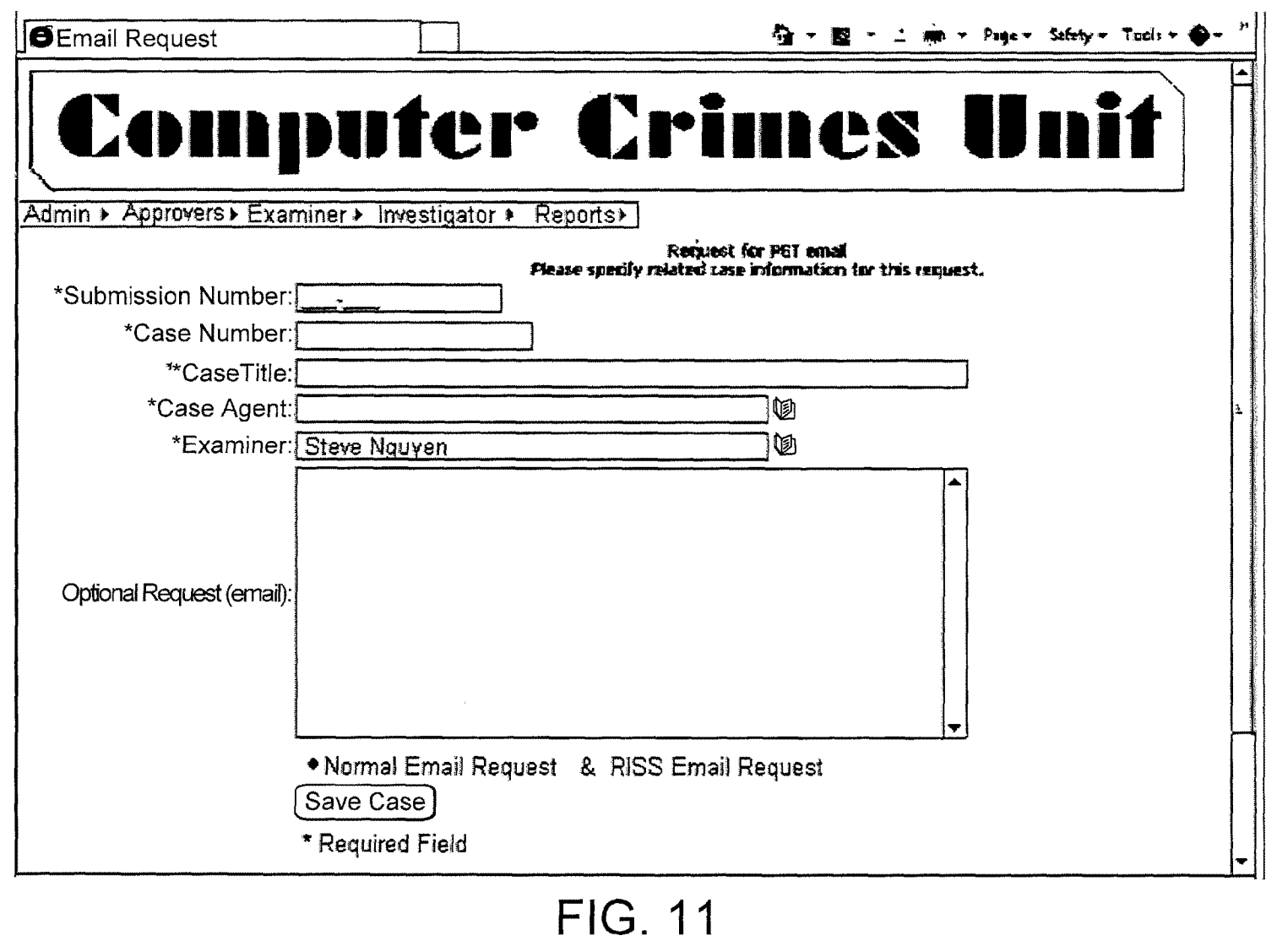

FIG. 11 shows a menu that results from selecting "Request PST File" in FIG. 11. The Examiner is instructed to fill out case information for the related request. The name of the Examiner is automatically inserted in the Examiner text box on the window.

A "PST" File" is effectively a hive of data for a specified user containing, among other things, his email. The name comes from Microsoft Outlook, which stores its information for individual users in .pst files. While primarily directed towards email, PST files may also include calendar, contact, task, notes, and journal information as well. The present invention also provides the ability of remotely acquiring an employee's user data, typically stored as "My Data" under the Microsoft Windows operating systems. The present invention is primarily directed towards acquiring such information from an email server, such as a Microsoft Exchange server, which do not typically store their actual data in actual .pst files. Nevertheless, this usage is maintained, and, indeed, the files uploaded may be formatted as Microsoft .pst files. It should also be noted that while Microsoft Outlook and Exchange Servers are utilized and disclosed in this preferred embodiment, this is exemplary, and other types of systems providing similar functionality are also within the scope of the present invention.

If the examiner types in the first three letters of the case number, eInvestigator will try to populate case information using existing case if found. The examiner must designate whether this is a normal email request or email extract from RISS system. The examiner can then click on Save Case button (ACEID will only show after the case information is saved).

Figure 12:
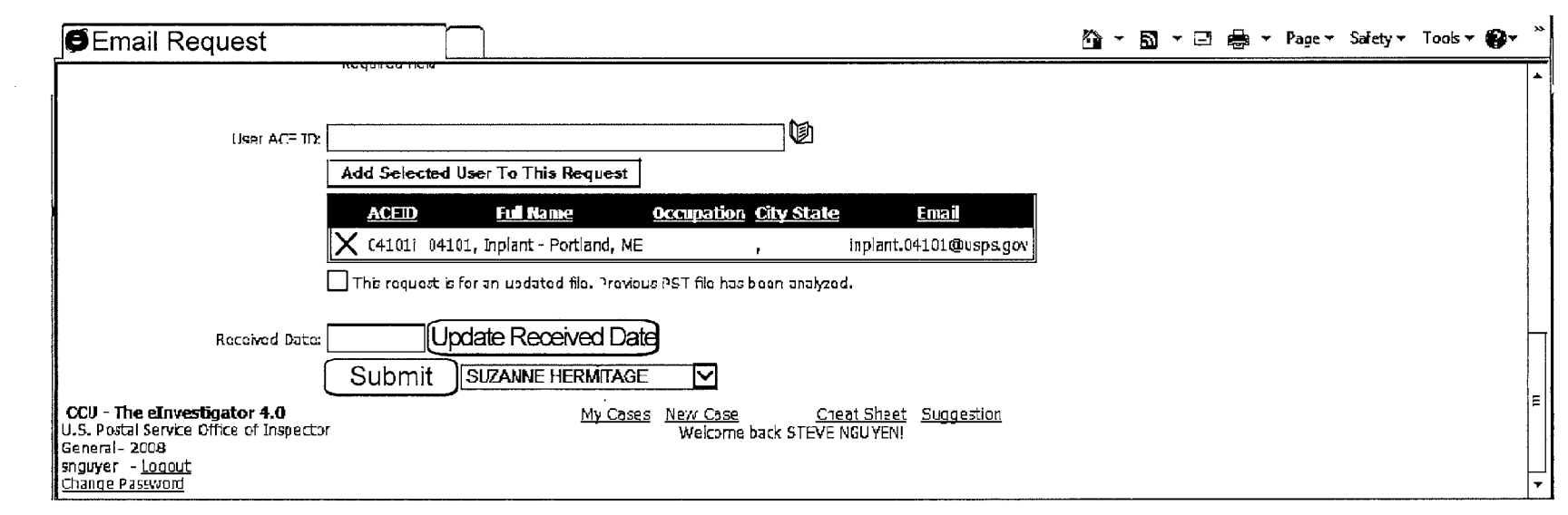

FIG. 12 shows an "adding item" window that appears after the "Save Case" button has been clicked. Once the adding item appears, the Examiner can click on the address book icon to search and select an ACEID for an employee.

FIG. 13 shows an address book screen that appears when "Add Selected User to This Request" button is clicked on the "Adding Item" window shown in FIG. 12.

Figure 14:
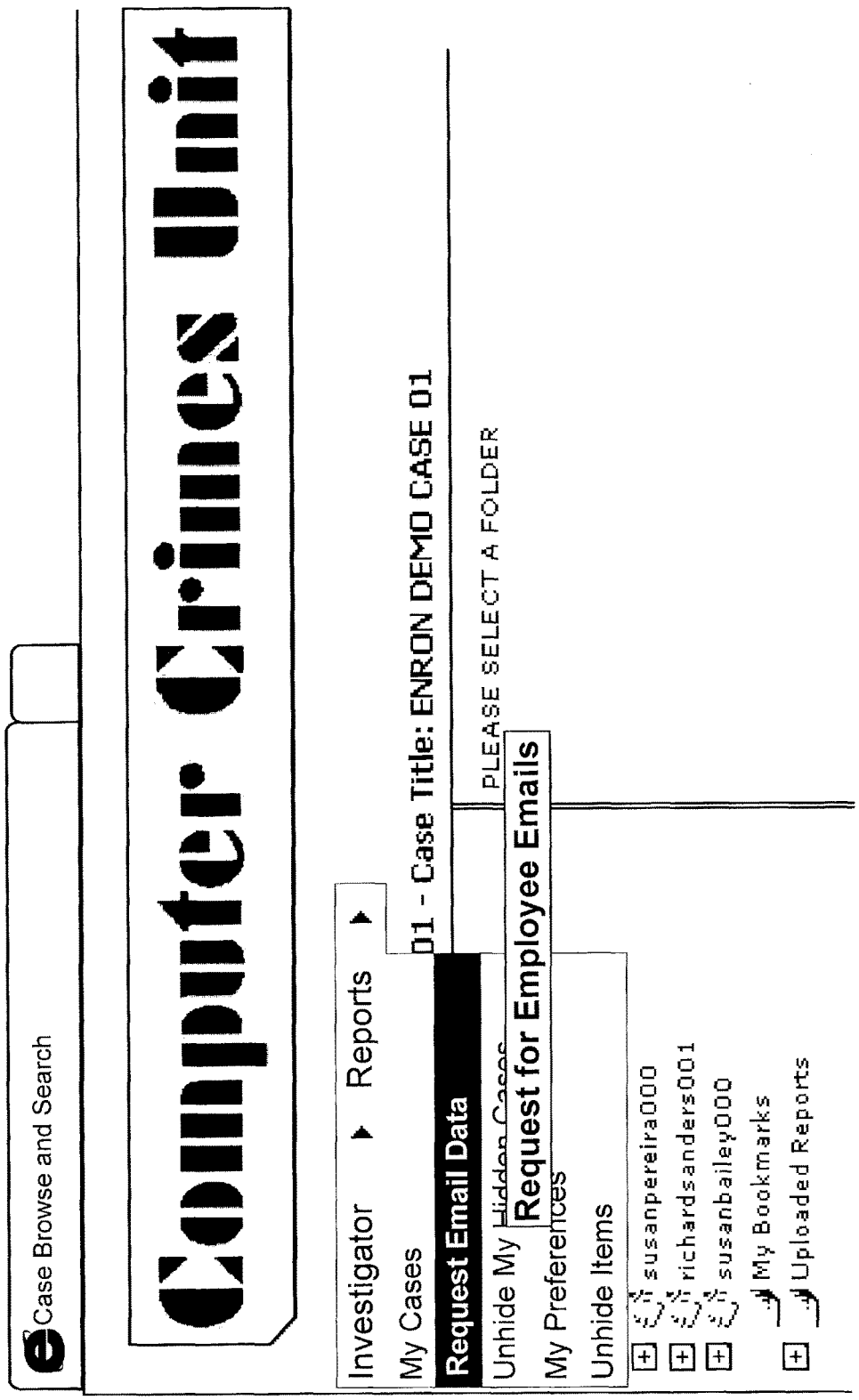
FIG. 14 shows a My Cases window illustrating how an investigator can request employee emails, in accordance with one embodiment of the present invention.

FIG. 14 shows a My Cases window illustrating how an investigator can request employee emails. This is similar to the request by an examiner for requesting employee emails shown in FIG. 10. An investigator can request email data by selecting "Request Email Data" from the Investigator menu. Special Agents can make requests for USPS email data directly for their cases. Once submitted, a request will go through CCU ASAC for approval, and then ShreKA automation will process it. The "My Email Requests" tab will show all USPS email requests made by the Agent or Examiner for their case.

Figure 15:
FIG. 15 shows an eAgent window showing a Request for Email Data, as is launched by the menus shown in FIG. 15.

FIG. 15 shows an eAgent window showing a Request for Email Data, as is launched by the menus shown in FIG. 15. The first step in requesting email data is to enter case information. As with FIG. 11 above, the user can enter a few beginning letters of the case number, and the present implementation will present a drop-down pick list of available cases. The Case Title and Case Agent will preferably be filled automatically once a case number is selected. Agents also have the option to search for a case using the case title. In order to search by title, the user can click on "Search By Case Title" to search using case title. Entering a few letters of the case title then produces a list of potential cases, and the user can then click on the desired case name in the list to select it.

Figure 16:
FIG. 16 shows an eAgent window showing the Request for Email Data displayed in FIG. 15.

FIG. 16 shows an eAgent window showing the Request for Email Data displayed in FIG. 15 with the case number selected and corresponding case information filled in. In order to complete the request, the investigator must identify the employee whose email is being requested. This can be done either by specifying his employee (ACE) Id, or the employee's last name, and then clicking a "Search" button. If either field is incomplete, or the results ambiguous, the system will generate a list of potential employees from which the investigator would select the correct one. A user can select multiple employees per request. Note that a "Submit Request" button is disabled in the present embodiment until at least one employee is selected. It will be enabled once an employee is selected.

Once the Submit Request button has been clicked, CCU ASAC approvers will receive an email with details on the request for email data. Once CCU ASAC has approved the request, ShreKA will process the request and place the data into the case designated above automatically. Typically the data will be available after 24 hours with the current implementation of the present invention.

The My Email Requests tab lists all email requests made by an Agent or Examiner for the Agent. If the request has not been submitted—denoted by a pencil icon (✎), it can be edited and changed. Clicking on the pencil icon will take the user to the original request form. If the request has been processed—denoted by the star icon, it cannot be edited. Clicking on the star icon will produce a detail information report of the request.

Figure 17:
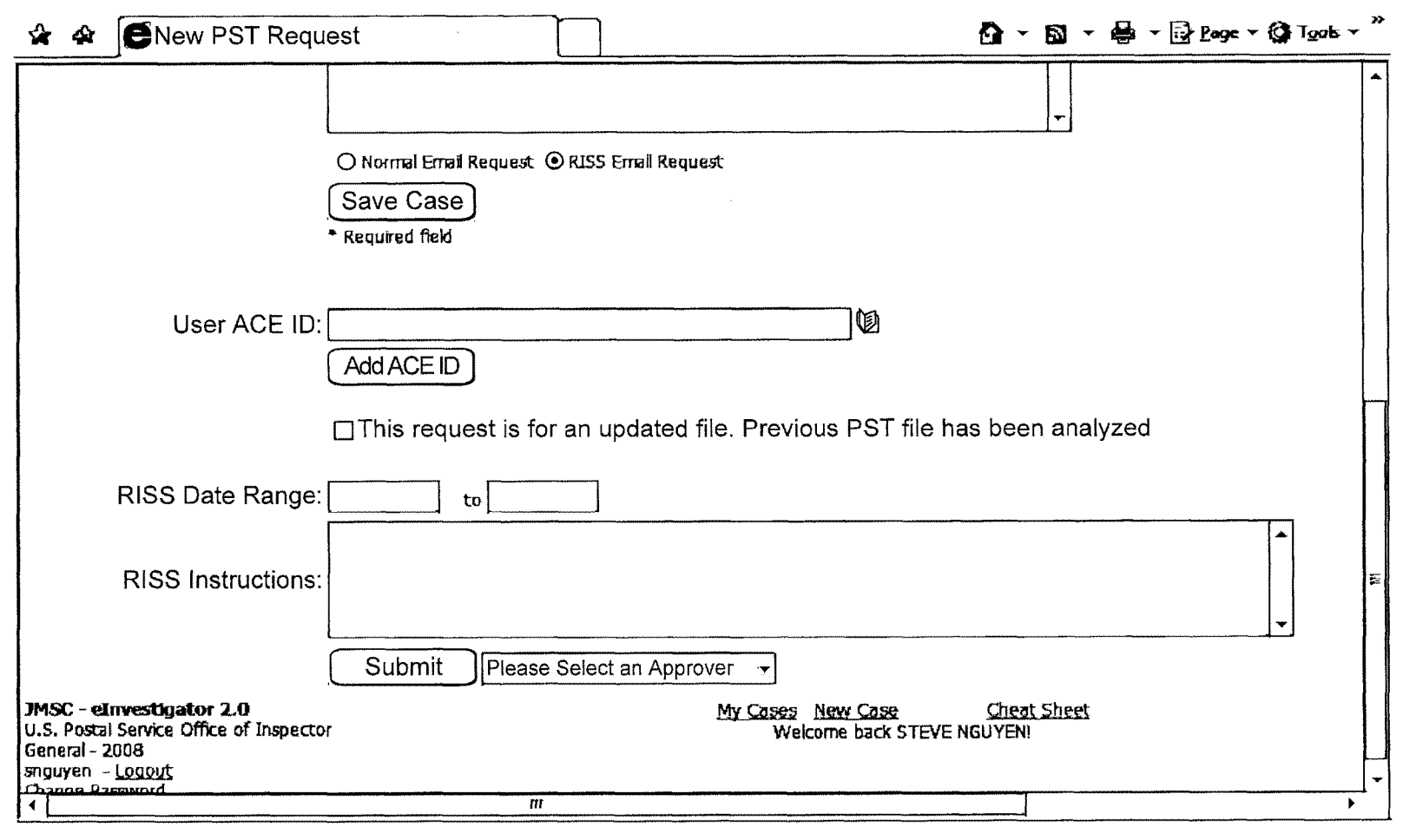

FIG. 17 shows a window that results from the Adding Item window. The examiner would typically click on "Add ACE ID" to add the selected ACE ID into the request. "ACE ID" stands for "Advanced Computing Environment ID", which is a user id for a system user in this embodiment.

The examiner can submit more than one PST file per request. He can do so by selecting an approval person, then by clicking on a Submit button. An email will be sent automatically to that approval person, with a CC of the message to the examiner. When the approver approves the request, an email will be sent to the examiner notifying him that his request has been approved. Also another email will be sent to USPS making an official request for the email file.

If this is a RISS request being made, the examiner will be required to provide a date range and any specific instructions on how RISS should extract the emails requested (keyword based or From and To). The RISS system is the email archive system for the USPS. For example; if he wants to acquire all emails from and to John Doe with "Money" keyword in the emails, he might type in the RISS Instruction Box: "All email messages sent and received by John Doe with Money keyword". Similarly, If he wants all email messages from or to John Doe, he might enter: "All email messages sent and received by John Doe" in the instructions box. The RISS email request will be routed to USPS Information Catalog Group for completion.

Figure 18:
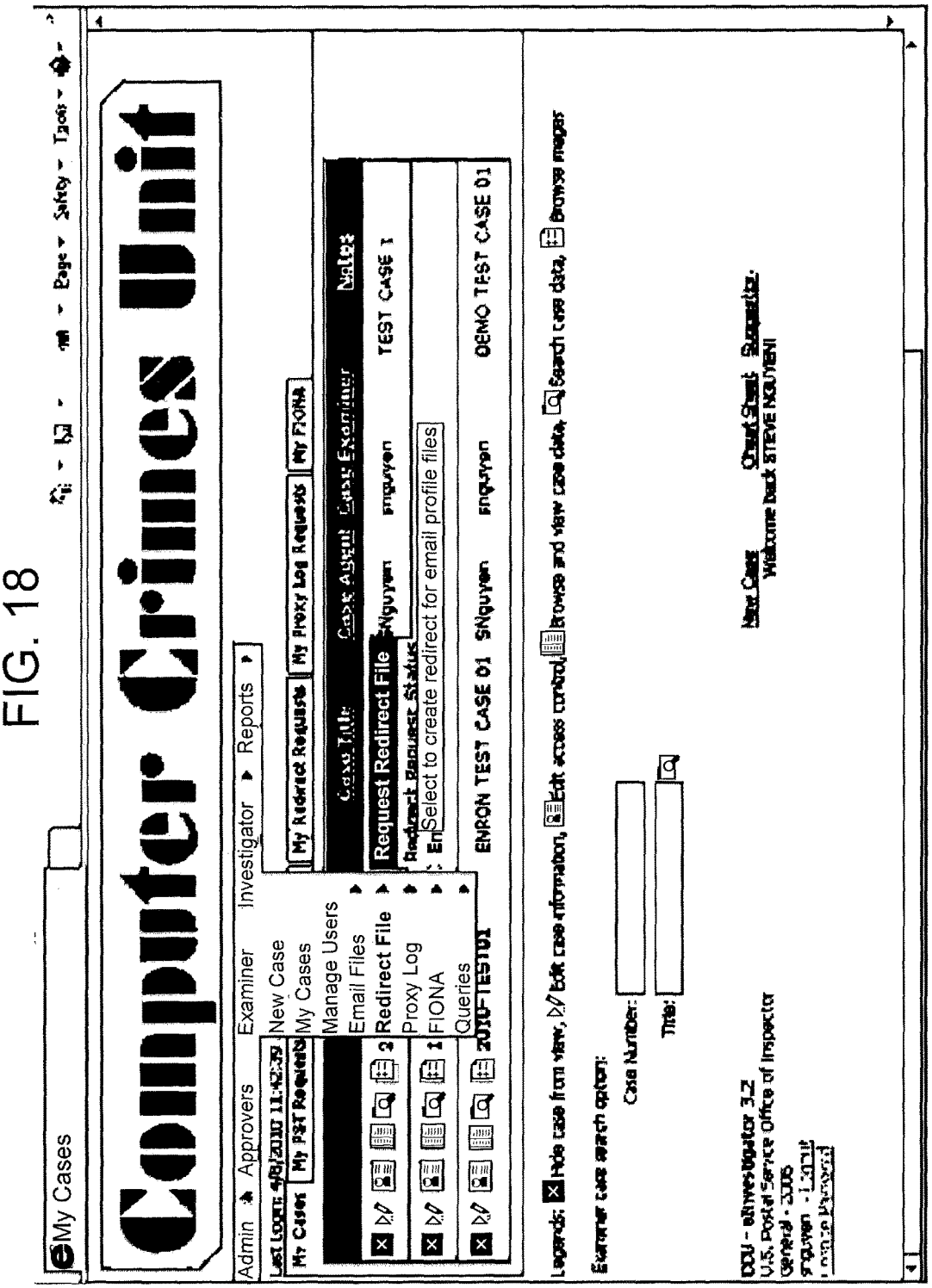
FIG. 18 shows a window depicting how to create a new Redirect File Request, in accordance with one embodiment of the present invention.

FIG. 18 shows a window depicting how to create a new Redirect File Request. This is activated by selecting the Examiner menu, then Redirect Files→Request Redirect File. This is similar to PST request, where the examiner fills out appropriate case information then selects the type of redirect pull request.

Figure 19:
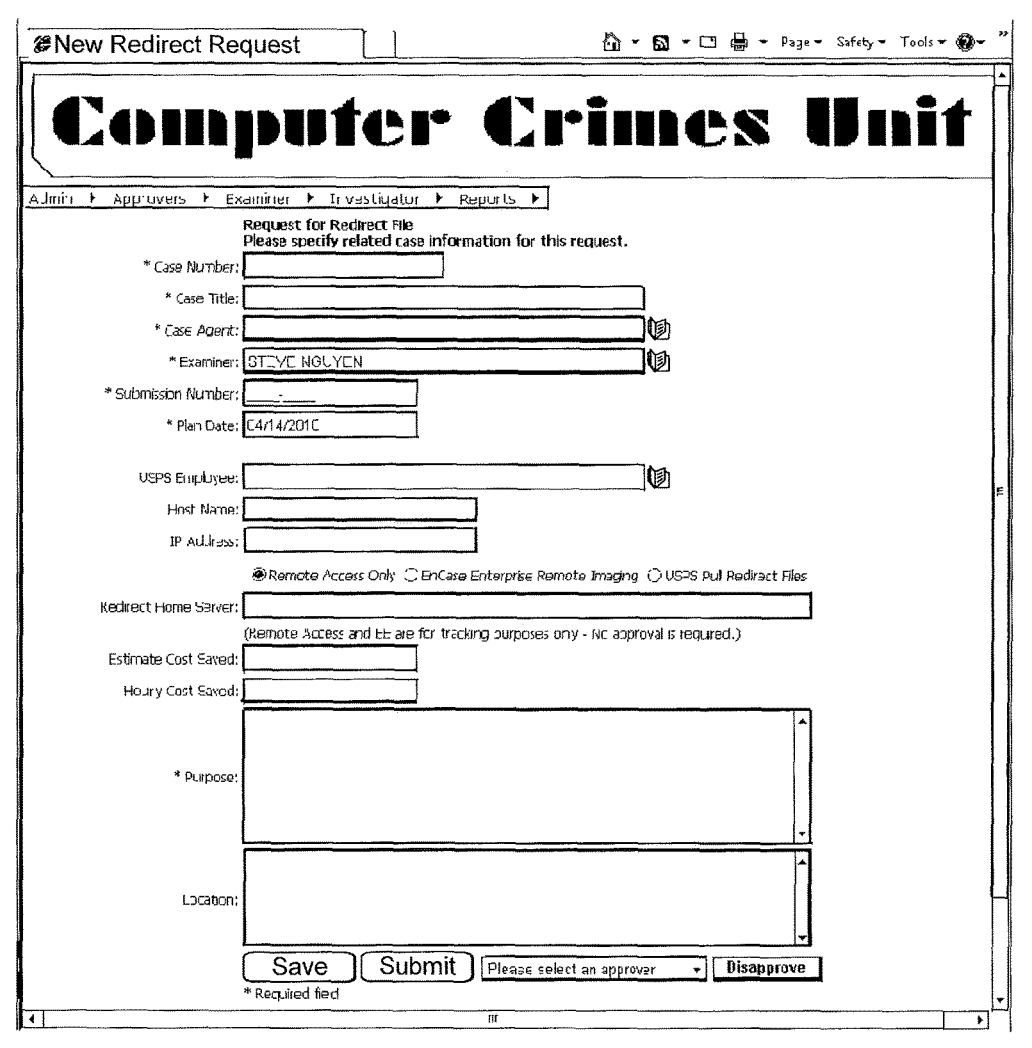

FIG. 19 shows a Redirect Pull Request window activated by the actions shown in FIG. 18. This FIG. shows option buttons for the three types of remote pull that are currently supported: Remote Access only (Map a drive to user's computer and copy user's profile information as well as documents), Remote Imaging using EnCase Enterprise, and USPS Pull redirect (required action from USPS to pull redirect files on the server.

Out of the three types, only the USPS Pull Redirect requires approval in the current implementation. The approval process sends USPS an email requesting the redirected files. If this option is selected, the present implementation will attempt to determine the home server where the user's redirected files are located. If the information cannot be found, the user will need to contact a specific special agent (SA KK) for the home server information. This information is required for USPS Pull redirect request.

Figure 20:
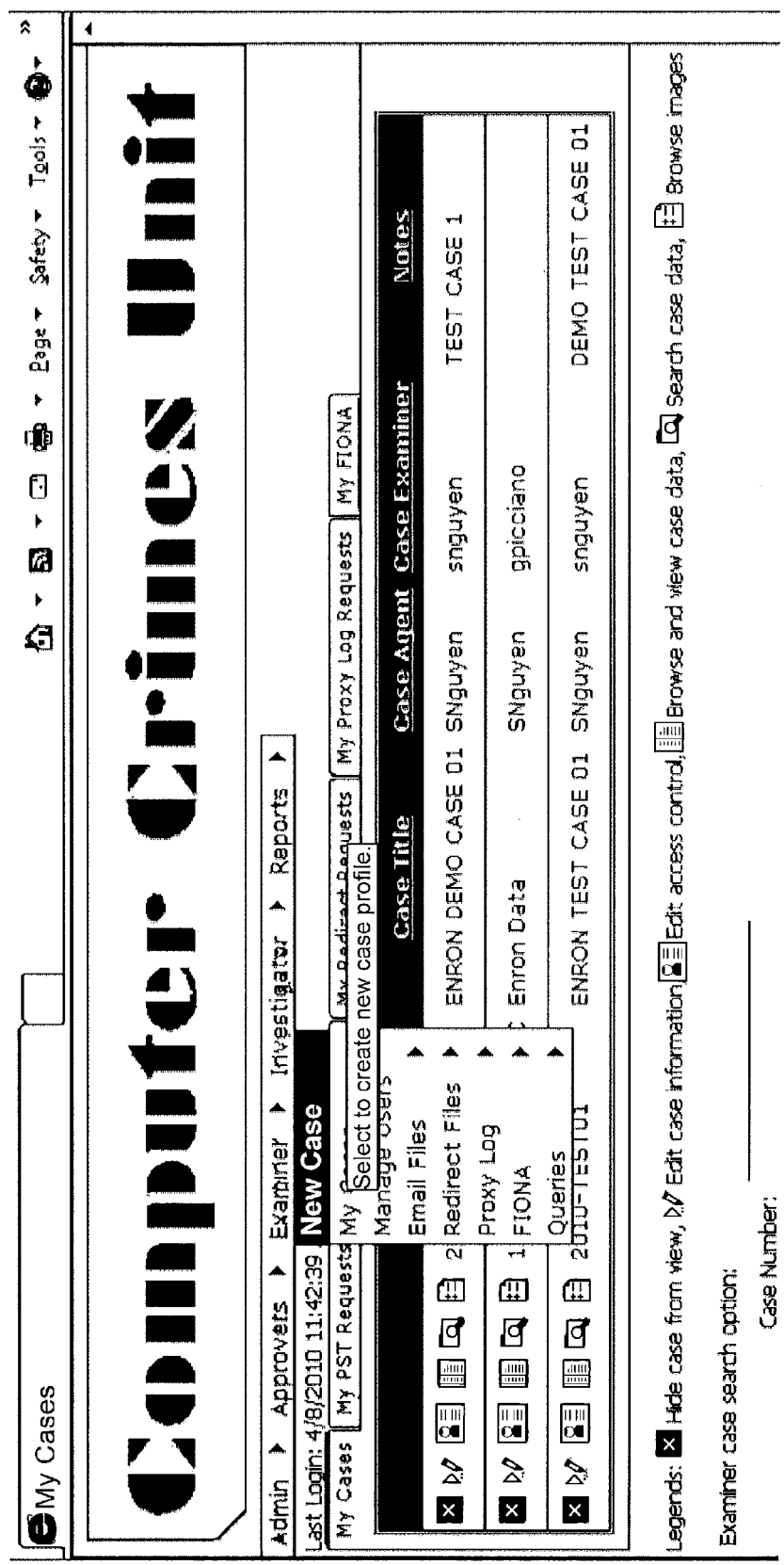
FIG. 20 shows a window depicting how to select creating a case profile, in accordance with one embodiment of the present invention.

FIG. 20 shows a window depicting how to select creating a case profile. A case profile can contain many requested items (email, uploaded files . . . ). Agents will typically access the case profile to search and perform analysis if permission is granted. Access to case profile is preferably restricted to user permission. All CCU members will preferably have full access to all case profiles. In order to create a new case profile, an examiner would: Select Examiner→New Case menu.

FIG. 21 shows a Create Case Profile window activated as shown in FIG. 20. When the window is displayed, the examiner can then enter case information. By default, the Case Agent will have access to the case profile. The examiner can grant other users to the case profile when editing a case. Once saved, he will have an option to select items for the case. If this is an Special Inquiry Division (SID) case, the case should be marked as restricted. When a case is restricted case, all evidences linked to that case will also be restricted. In another word, no other case can add this evidence file(s). Only an Administrator or the Examiner can bypass this restriction.

Figure 22:
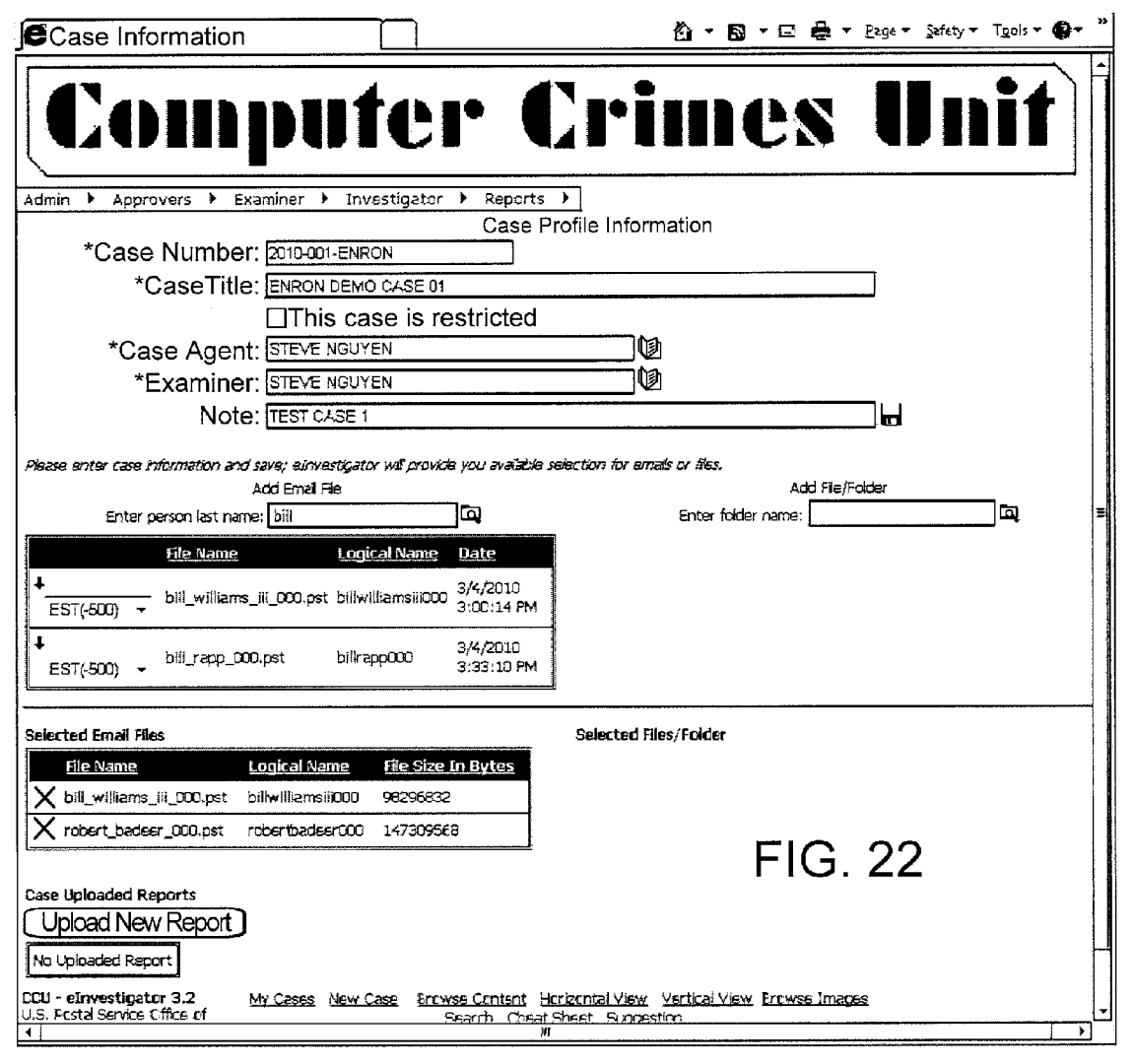

FIG. 22 shows the Create Case Profile window from FIG. 21 that has been partially filled in. The examiner can enter a few letters of the person's name, and then click on search. In the search result box, the examiner can then select the item of interest for the case. He can select multiple items He should select appropriate time zone for person of interest where emails were sent or received. Once done, the examiner can go to "My Case" to start browsing or searching for information.

Figure 23:
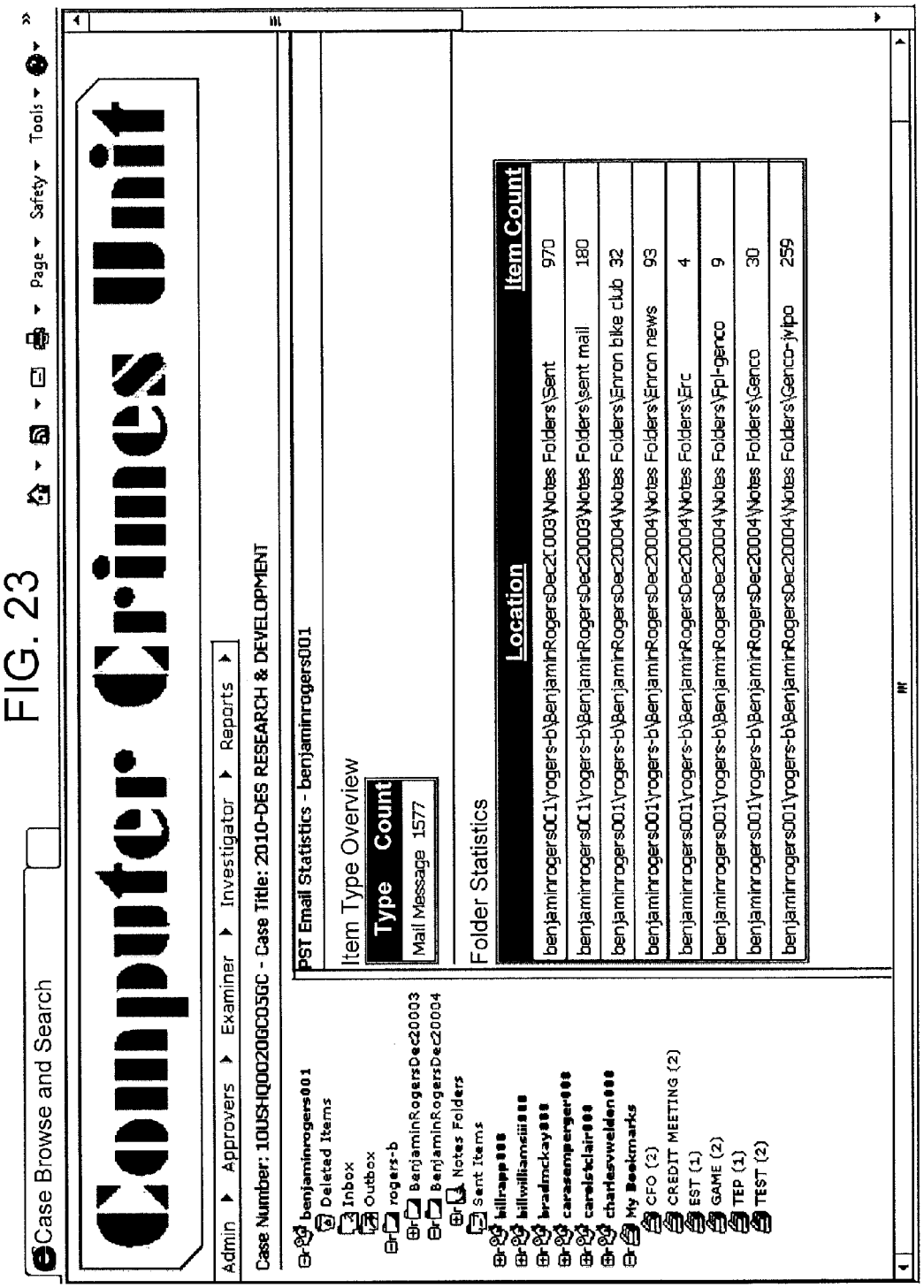
FIG. 23 shows a Browsing Email Folder panel in a Case Browse and Search window, in accordance with one embodiment of the present invention.

FIG. 23 shows a Browsing Email Folder panel in a Case Browse and Search window. The browsing window is functionally similar to the current version of Microsoft's Outlook. A tree structure of folders is shown on the left side of a user's PST hive plus user folders. When selecting an email folder (PST File), statistic information of the email folder will preferably be displayed in the right pane window when the "root" of the tree structure for an employee is selected. In one embedment, a count of the number of items in each of the sub-folders is displayed, as well as a count of all of the items in all of the sub-folders.

Figure 24:
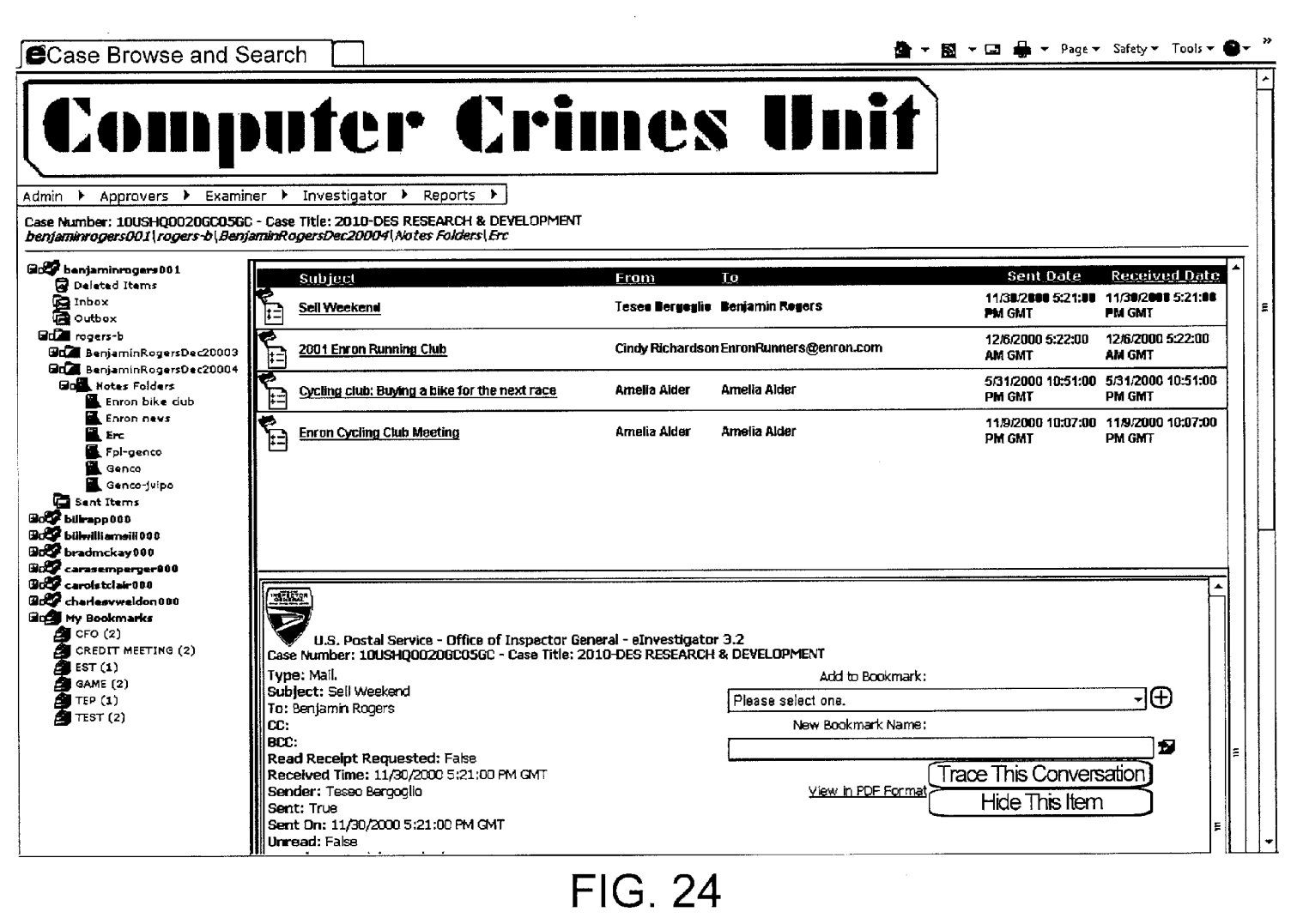
Figure 25:
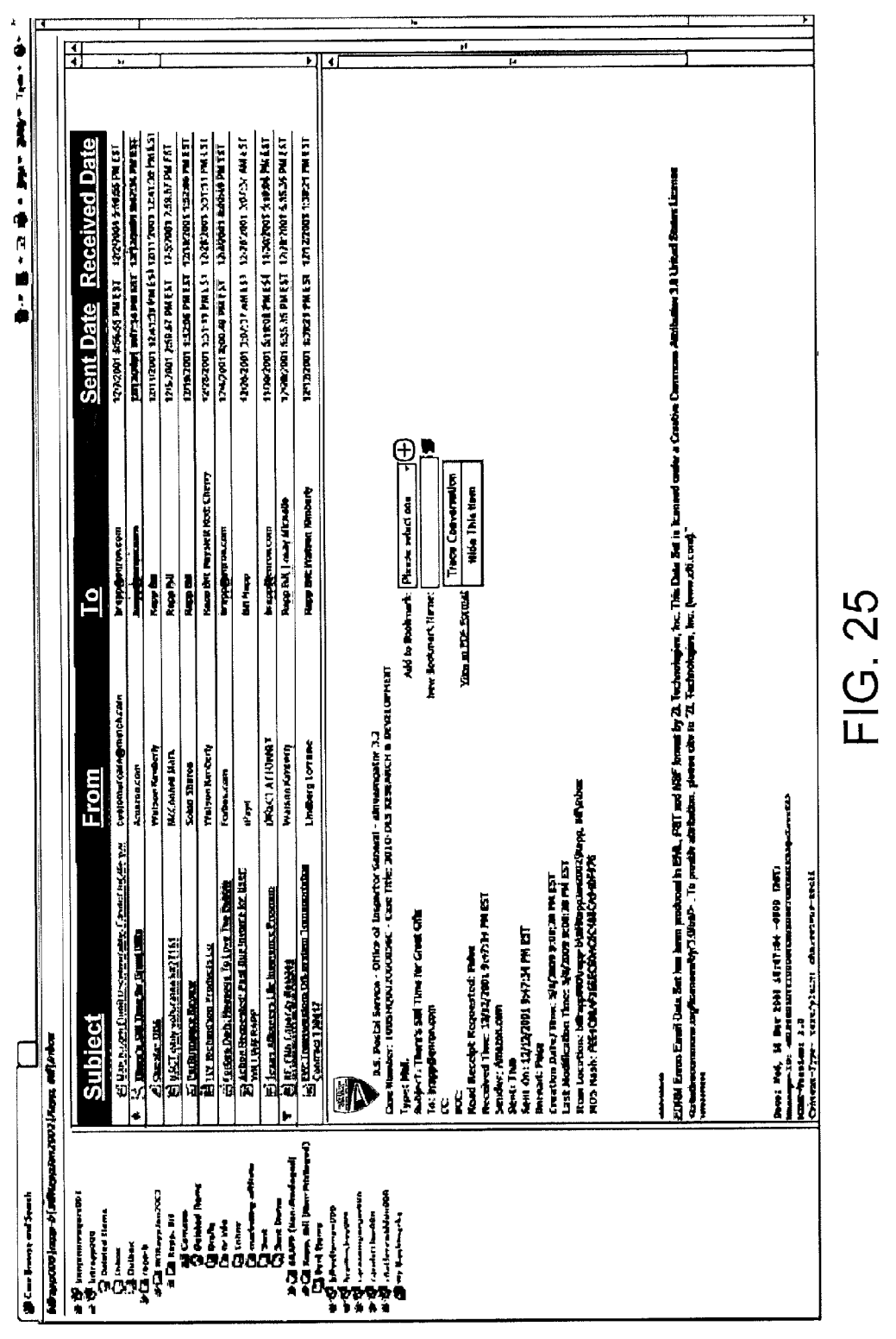

FIGS. 24 and 25 show Case Browse and Search windows showing other Browsing Email Folders, in accordance with the embodiment shown in FIG. 23. In these FIGS., a lower level folder than the "root" folder is selected, and all a list of the email in that directory is displayed. When one of those emails is selected, the contents of that email are displayed, in this case, below the list of emails in the selected folder. When reviewing email, an examiner can easily identity items that have been bookmarked—denoted with red icon. And when the attachments are not the focal points of an investigation, an examiner can quickly review the message content by using "Quick View" link. The default view, on the other hand, will try to convert all content of the messages, including attachments, into HTML for display. If there are a lot of attachments or large attachment, the conversion process may take a long time, which is one reason that the Quick View option is provided. When an item is bookmarked, it has the red icon next to it. Otherwise, the icon will be white.

FIG. 26 shows a Quick Message View window that displays a Quick View of a selected email message, in accordance with the embodiments shown in FIG. 25. Quick view option will display the email message content and the listing of the attachments if any. It will not display any meta-data information or the attachment links. Note the time in quick view is GMT. In quick view, user will have option to bookmark the message, trace the message thread, or bookmark all messages in the same message thread. A message thread comprises of all messages that have been replied or forwarded from an original message. To bookmark all messages in the same message thread, make sure to place the check mark on "Include all messages related to this conversation thread".

Figure 27:
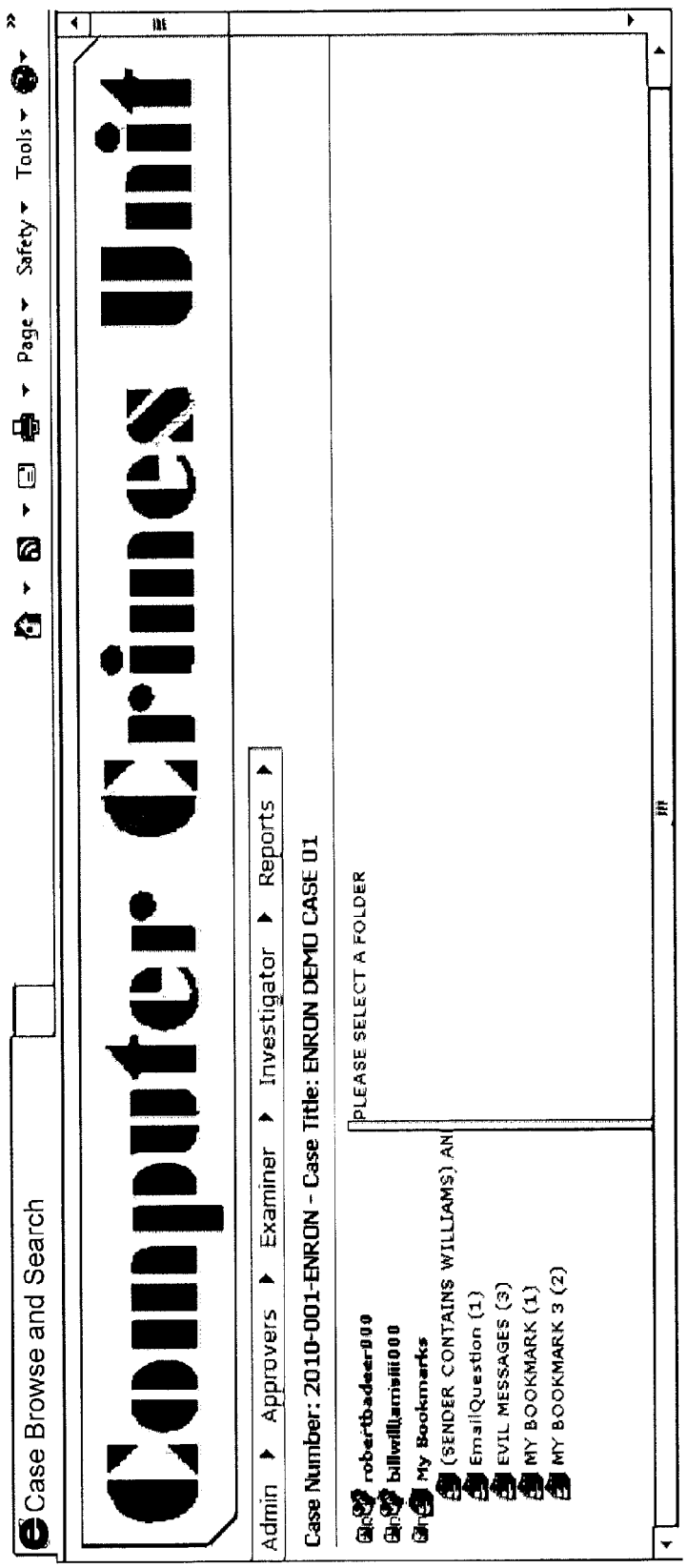
FIG. 27 shows a Case Browse and Search window that displays a result of the Quick View shown in FIG. 26.

FIG. 27 shows a Case Browse and Search window that displays a result of the Quick View shown in FIG. 26. The current embodiment of the present invention has two additional folders in the left explorer pane—"My Bookmarks" and "Uploaded Reports". These two folders will preferably exist only if the case has bookmarks or examiner has uploaded reports. Selecting the bookmark name will display all items in the bookmark in the right pane. In this FIG., no folder is selected in the left explorer pane, and so a message: "Please Select a Folder" is displayed.

Figure 28:
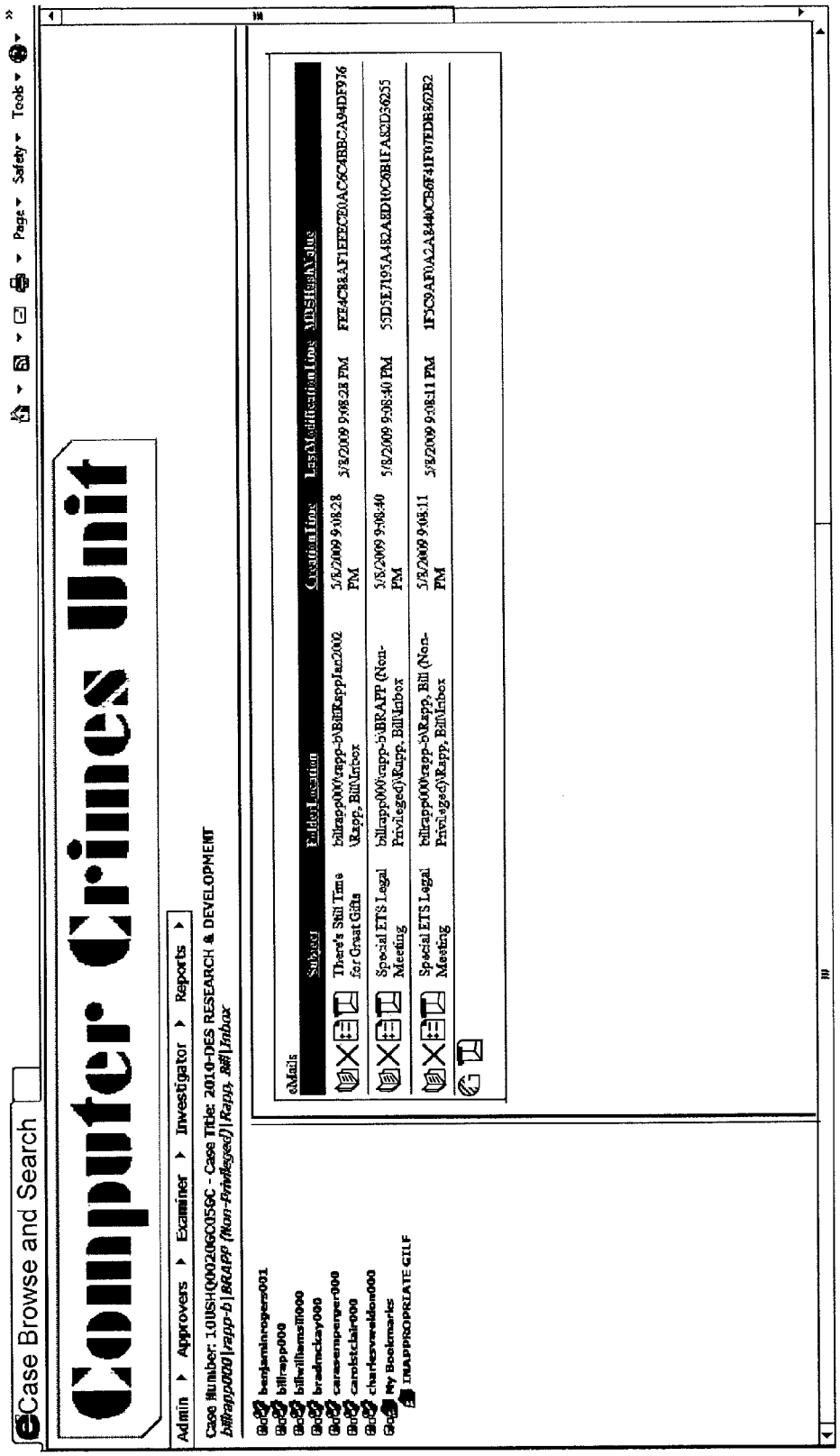
FIG. 28 shows a Case Browse and Search window that displays a result of adding email messages to a bookmark shown in FIG. 26.

FIG. 28 shows a Case Browse and Search window that displays a result of adding email messages to a bookmark "INAPPROPRIATE GILF" shown in FIG. 26. The bookmark can be accessed by clicking on the bookmark in the My Bookmarks collection in the left explorer pane of the Browse menu. Each message in the bookmark has the following icons, if appropriate:

To view the message (full view mode) in html, click on the "open book" (📖) icon.

To remove the message from the bookmark, click on the "X" (✖) icon.

To view the message in quick view mode, click on the "page" (📄) icon.

To view the message in PDF (Quick View Mode) format, click on the PDF (📕) icon.

To combine all messages into one big html document, click on the globe (🌐) icon.

To combine all messages (Quick View Mode) into one big PDF file, click on the bottom PDF (📕) icon.

The current implementation of the present invention supports three different view for browsing: default multiple windows, vertical, and horizontal views. A user can choose his own default view by selecting "My Preferences" from the Investigator menu. He can also choose which columns to display or hide. When browsing items in the case, the user can select the items to hide from view if he doesn't want to see the items again because they are not relevant. Hidden items will be hidden case wide. To unhide items, he can select "Unhide Items" from the Investigator menu option.

FIG. 29 shows a Case Browse and Search window that displays the contents of a bookmark. The book mark is selected from the bookmarks listed under My Bookmarks in the left navigation pane, and the items in the bookmark are displayed with the icons shown in FIG. 28.

Figure 30:
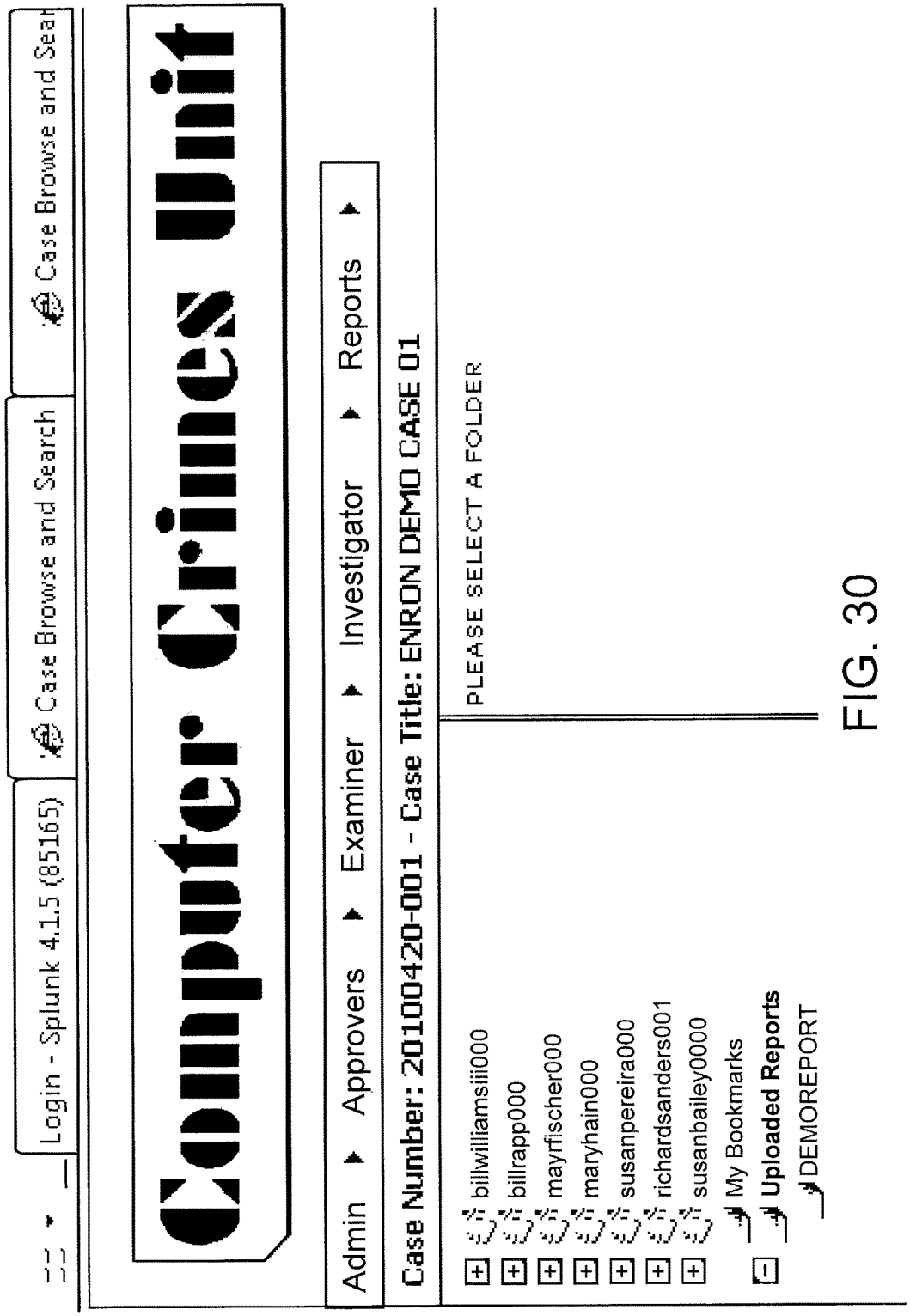
FIG. 30 shows a Case Browse and Search window that displays a result of the selecting "Uploaded Reports" shown in FIG. 27.

FIG. 30 shows a Case Browse and Search window that displays a result of the selecting "Uploaded Reports" shown in FIG. 27. Selecting the report name will preferably display all report files that examiner have uploaded for this case. Note that the file name will be displayed as they are; thus, it would be advantageous for examiners to name their report file names to something meaningful for a case. When users click on one of the file link, the content will be displayed as they are in native format designed/written by the examiner. The report files are like files on a hosted website.

Figure 31:
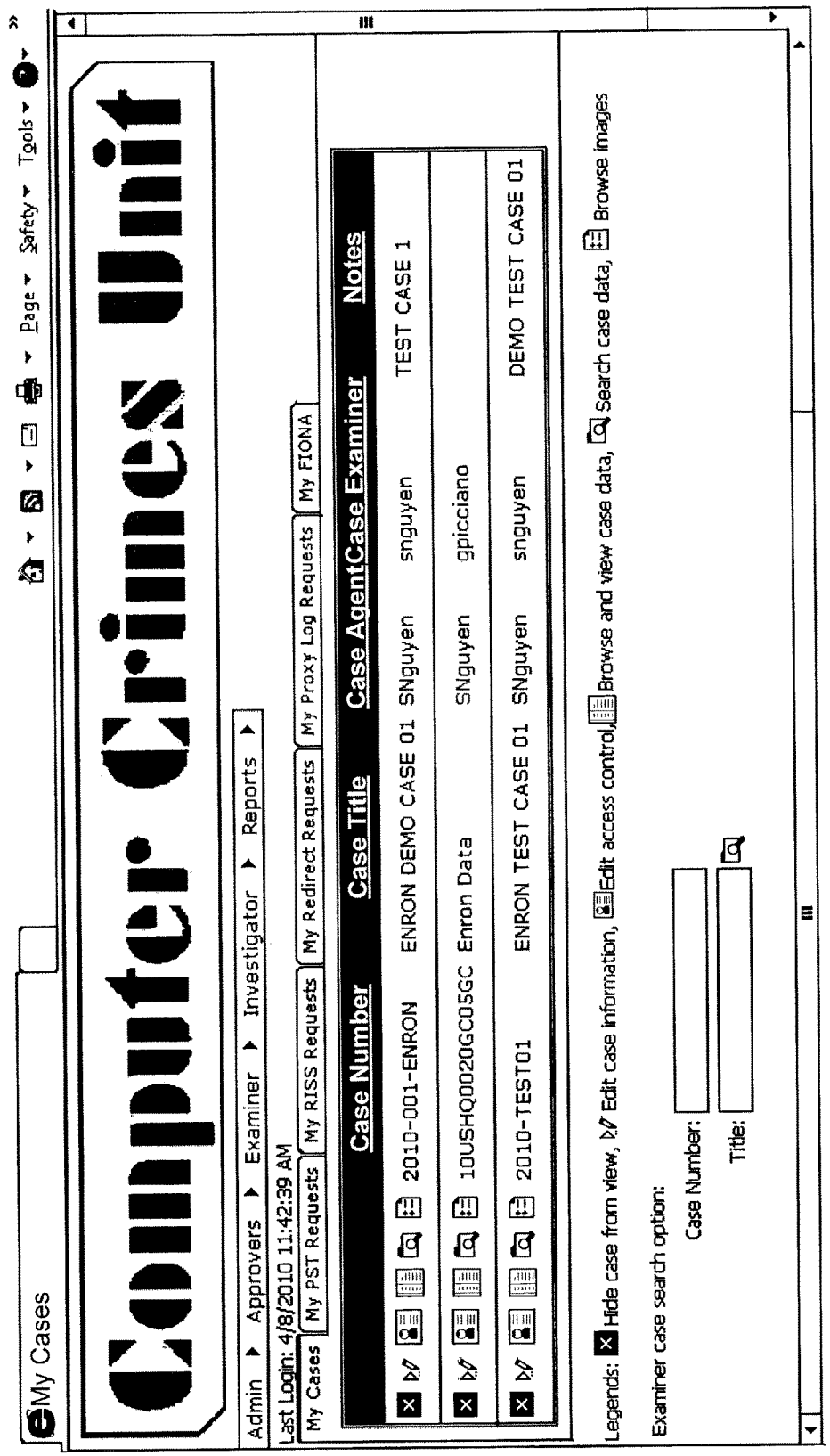
FIGS. 31 and 32 show My Cases windows that display the contents of an examiner selecting the "My Cases" tab, in accordance with one embodiment of the present invention.
Figure 32:
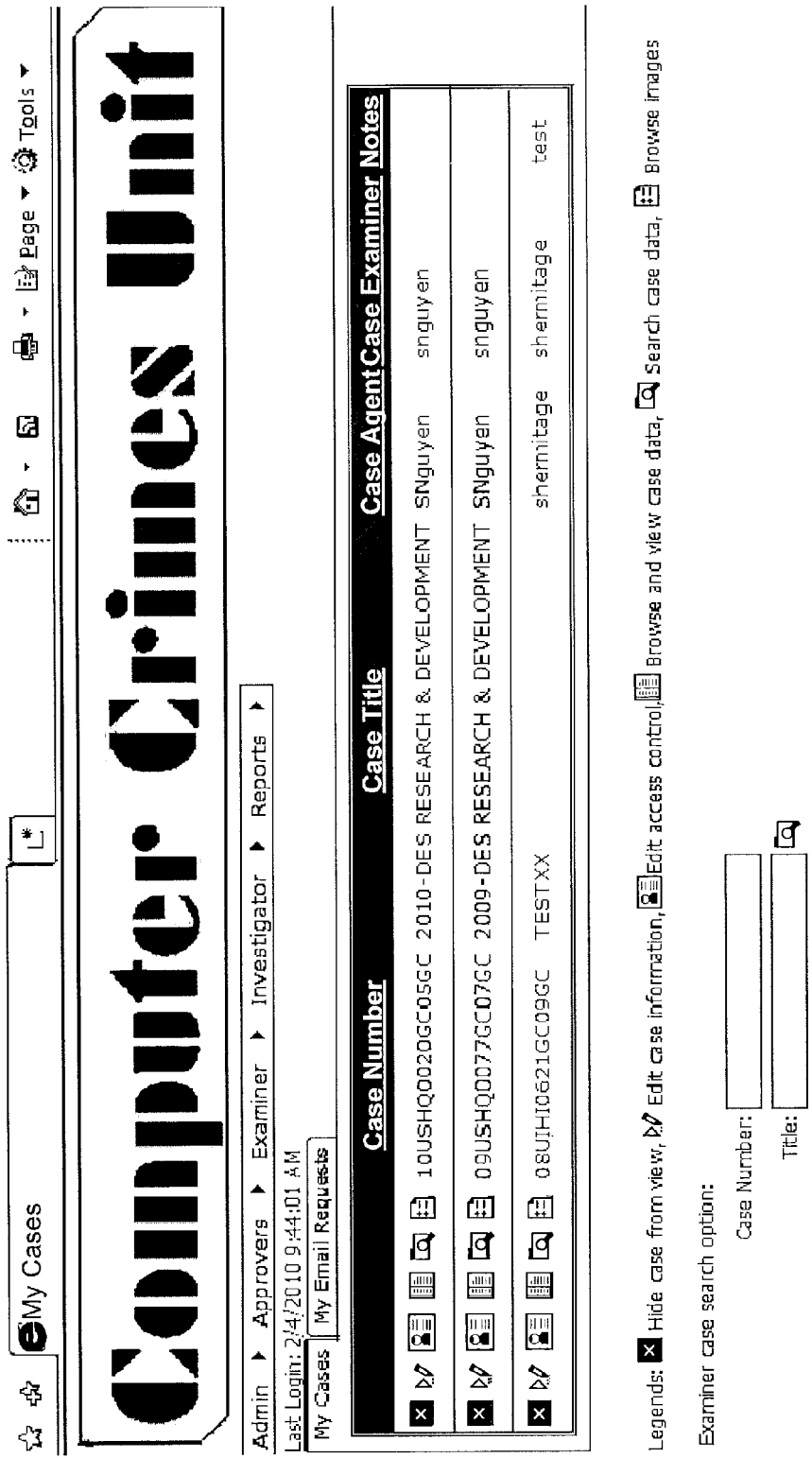

FIGS. 31 and 32 show My Cases windows that display the contents of an examiner selecting the "My Cases" tab. In order to upload reports, an examiner can select Edit case information (✏️) on the "My Cases" page.

Figure 33:
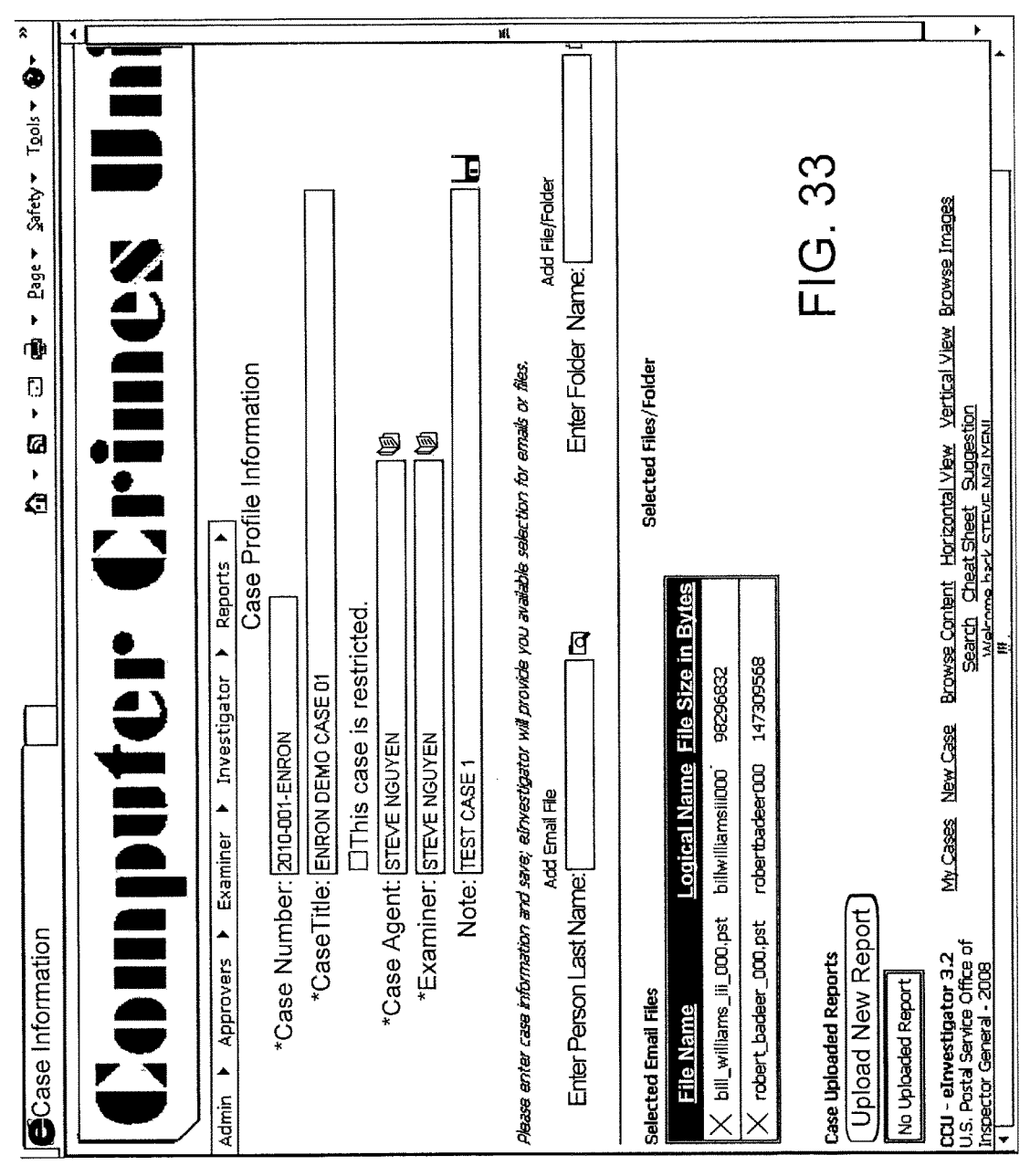

FIG. 33 shows a Case Information window that is activated when an examiner selects Edit Case Information in FIG. 31. One of the option buttons displayed on this window is to "Upload New Report". This can be utilized for uploading case reports. The current implementation of the present invention now can host examiner's reports just like a host website. These reports can be generated by FTK, EnCase, or developed manually. Other methods are also within the scope of the present invention. Note though that the Microsoft Internet Explorer (IE) browser that this feature is designed to operate with can only display limited number of file formats. It is therefore preferably to keep the file format that meet the Internet standards; such as, html, txt, pdf, and office documents. In this embodiment, these report files are NOT parsed, nor indexed, nor are they searchable in the present implementation. The "Upload New Reports" button is at the bottom of the page and will only visible for Examiners.

If a report file in an examiner's report file group has "INDEX.HTM", "INDEX.HTML", "DEFAULT.HTM", or "DEFAULT.HTML" as file name, the present implementation will automatically attached the first file to the "Launch Report" button. For example: the sample report uploaded was generated by FTK shown in this FIG. The first index.htm file will be attached to the "Launch Report" button. When a user clicks on the button, the main report page will be displayed as a website. In the current implementation, the Upload report feature is using the FIONA utility. Since the reports will not be parsed nor indexed for analysis/search, the user can ignore the hash report comparison option on the FOINA utility.

Figure 34:
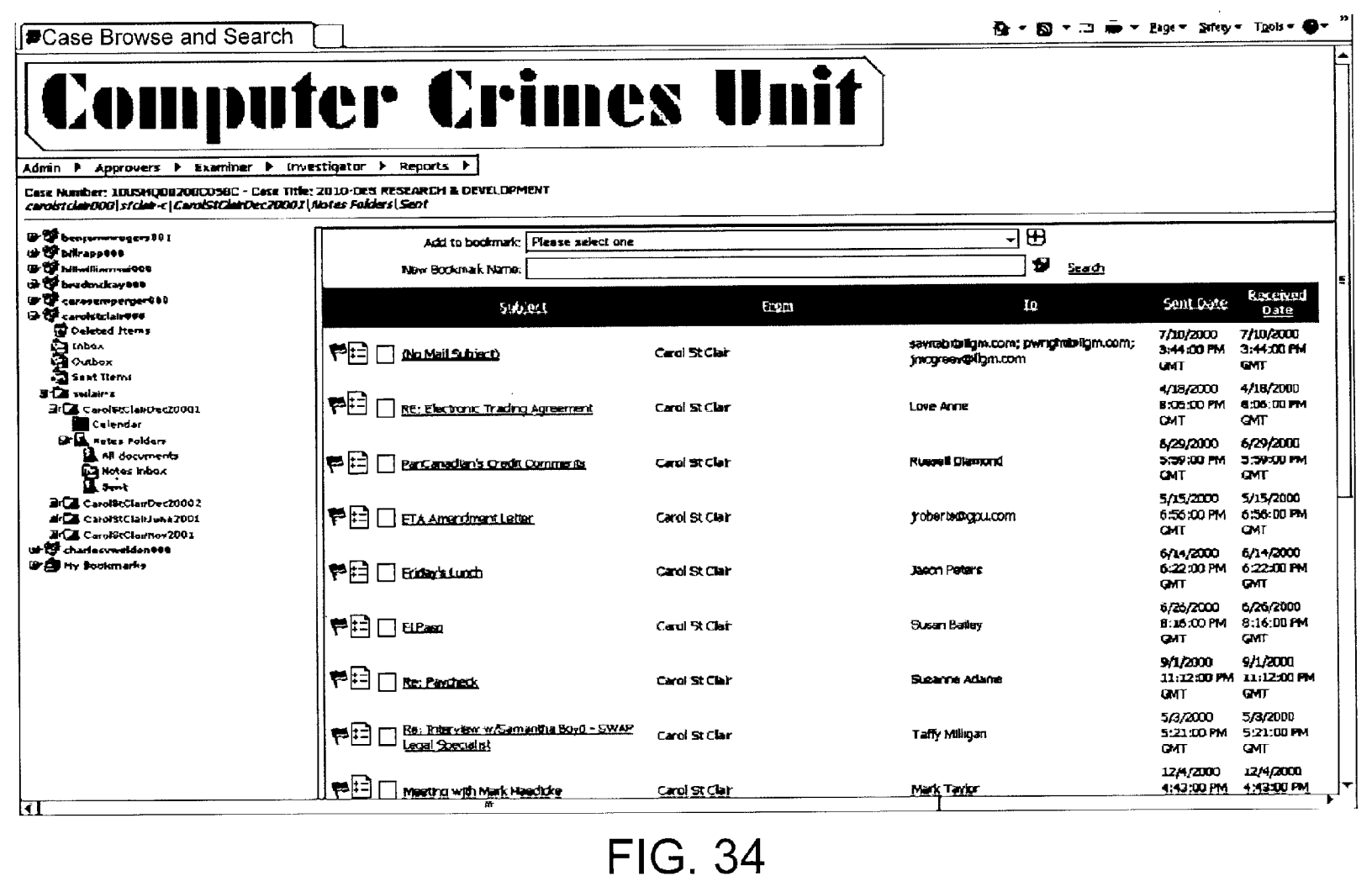

FIG. 34 shows a Case Browse and Search window that depicts how a user can bookmark item(s). This can be accomplished by selecting the item, then adding it to an existing bookmark or creating a new bookmark. While working in a case, a user can bookmark item(s) from the Browse window by selecting the item(s), then adding to existing bookmark or creating new bookmark. The user can display his Bookmarks by Selecting "View Case Bookmarks" from the "Reports" menu. The user can expand the plus sign next to the "Add to bookmark" list to see all bookmarks in the case. This list also functions as a pull-down menu to quickly allow him to select the bookmark he wants to add the item to.

Figure 35:
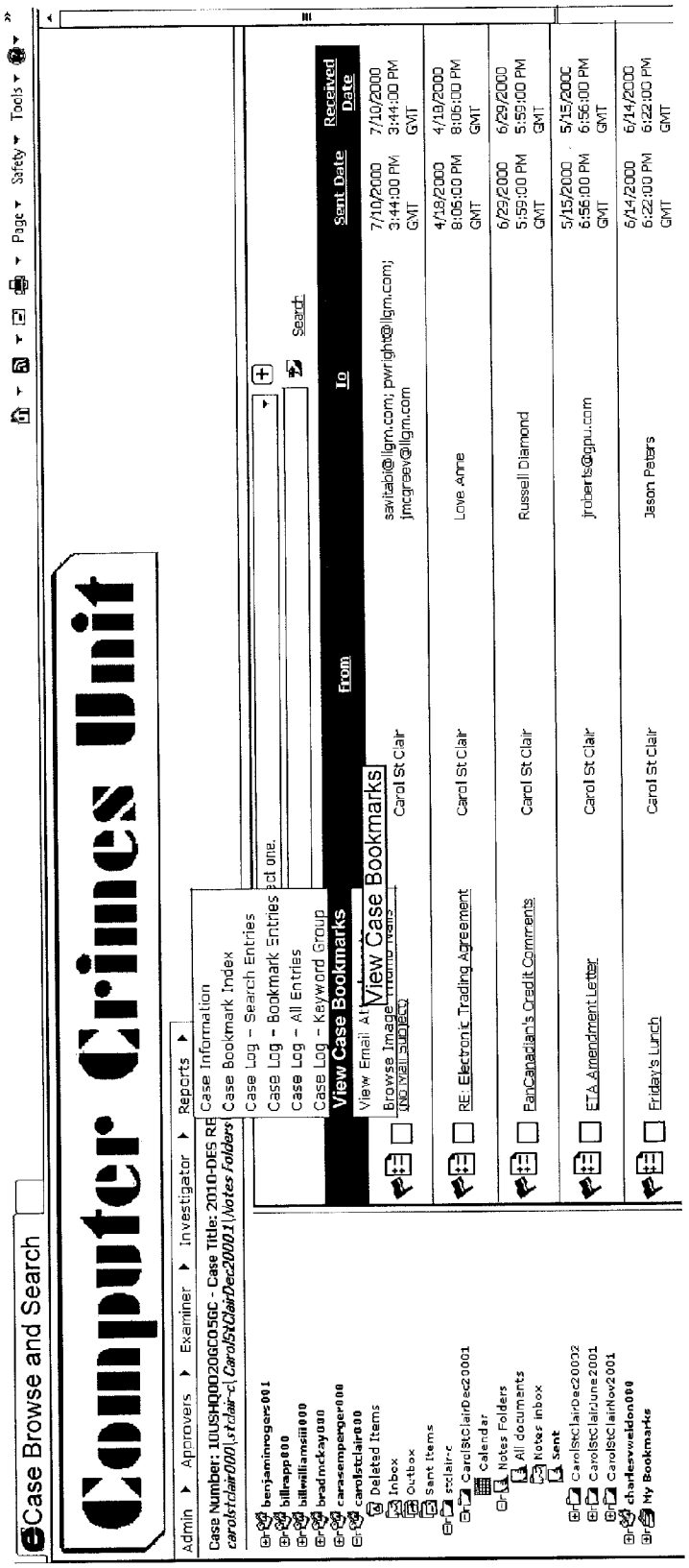
FIG. 35 shows a Case Browse and Search window with Reports→View Case Bookmarks selected in order to activate the Bookmarks window, in accordance with one embodiment of the present invention.

FIG. 35 shows a Case Browse and Search window with Reports→View Case Bookmarks selected in order to activate the Bookmarks window. To change or delete existing bookmark name, a user can click on "My Bookmarks" link. More detail information and settings will appear in the right pane window.

Figure 36:
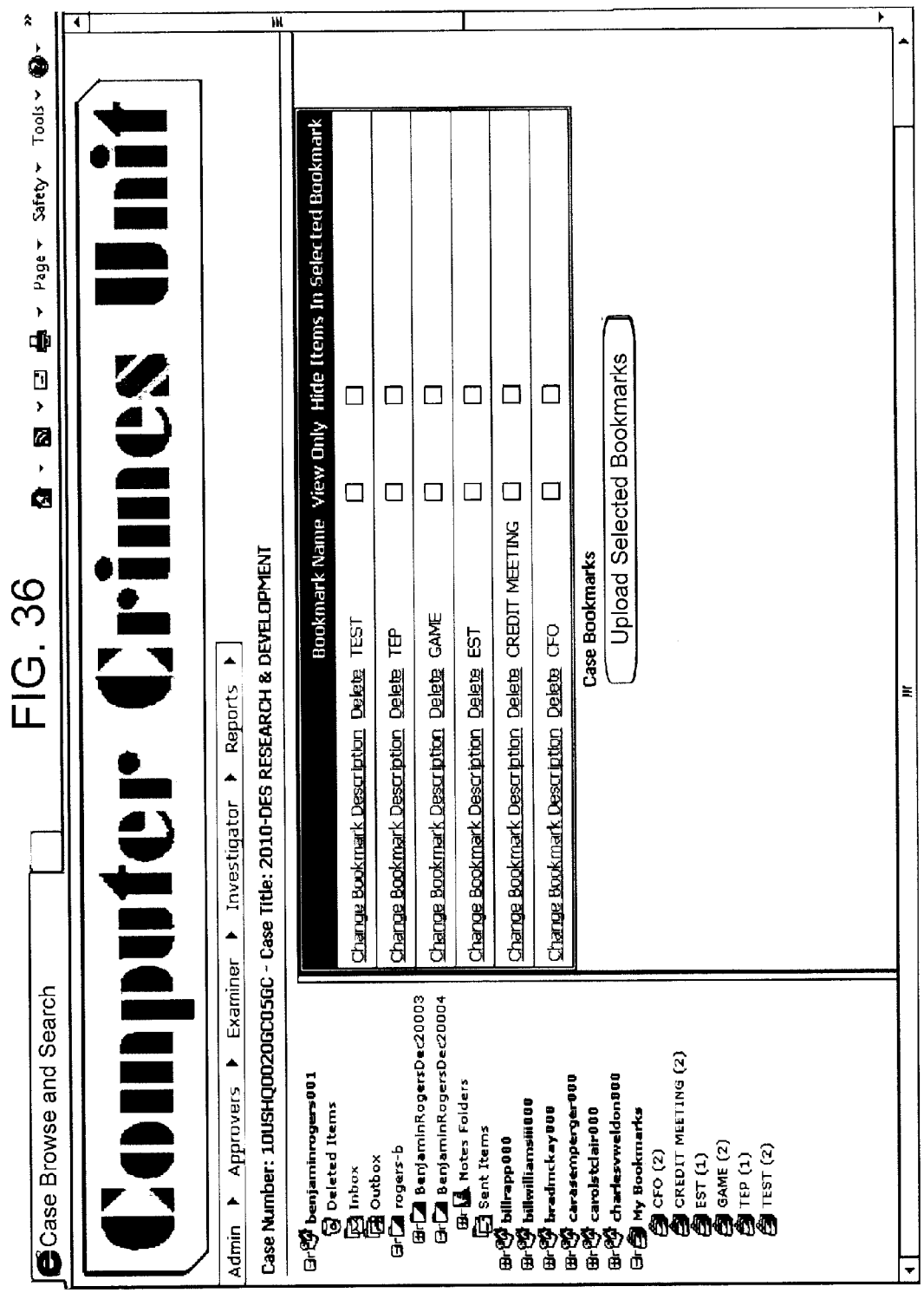
FIG. 36 shows a Bookmarks panel in a Case Browse and Search window activated as shown in FIG. 35.

FIG. 36 shows a Bookmarks panel in a Case Browse and Search window activated as shown in FIG. 35. The number of items in each bookmark will appear next to the bookmark name. When selecting "My Bookmarks" in the left pane, the user will have an option to hide the entire bookmark from view (all items in the bookmark will be hidden). Future item added into the hidden bookmarks will also be hidden. The user can also specify that a Bookmark is "View Only". The user also has the option of changing the bookmark name or its description, or deleting it. He can do this by clicking on "Change Bookmark Description" or "Delete" link, as appropriate. The user can select a Bookmark name to see items in the bookmark.

Figure 37:
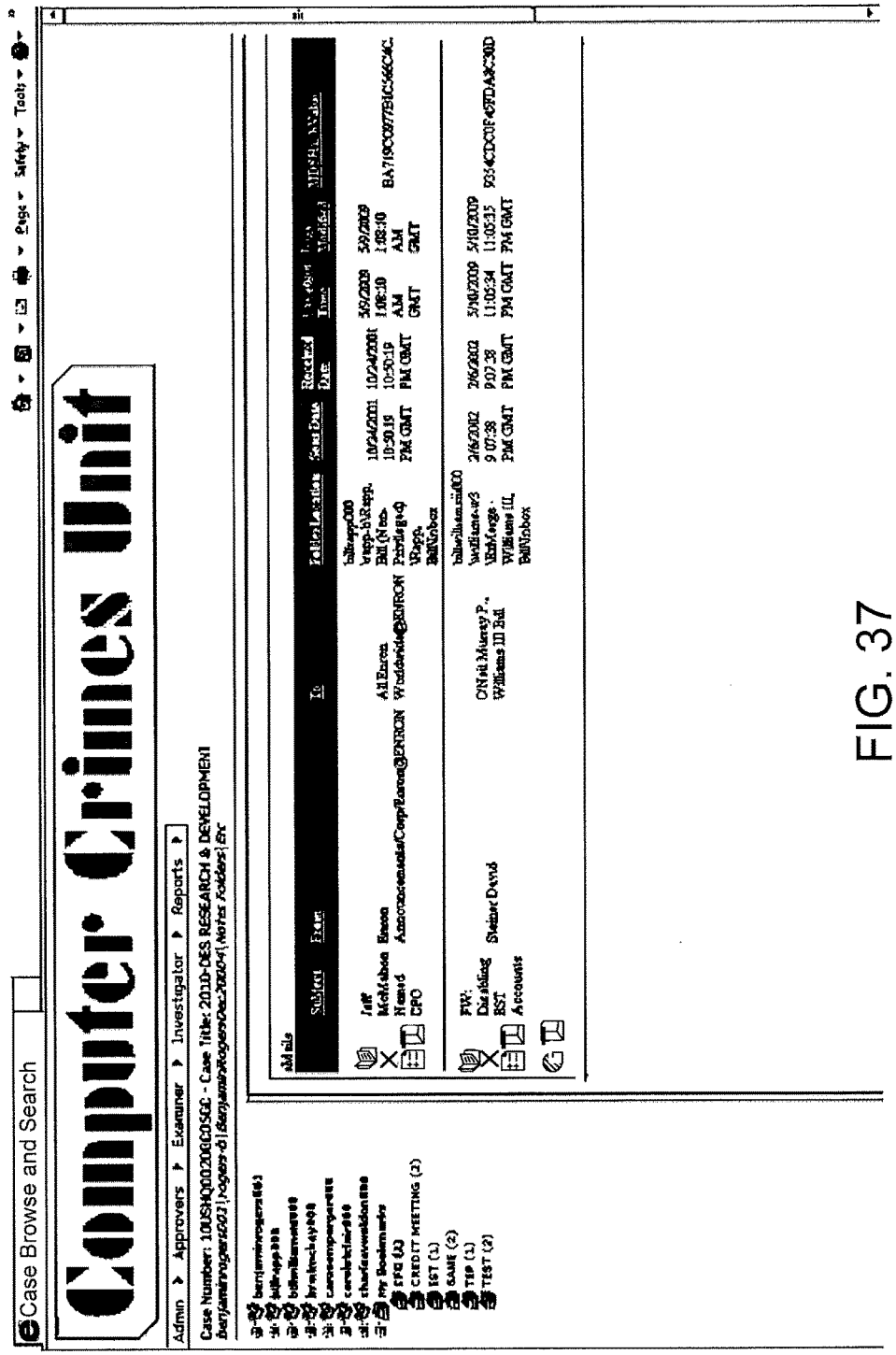
Figure 38:
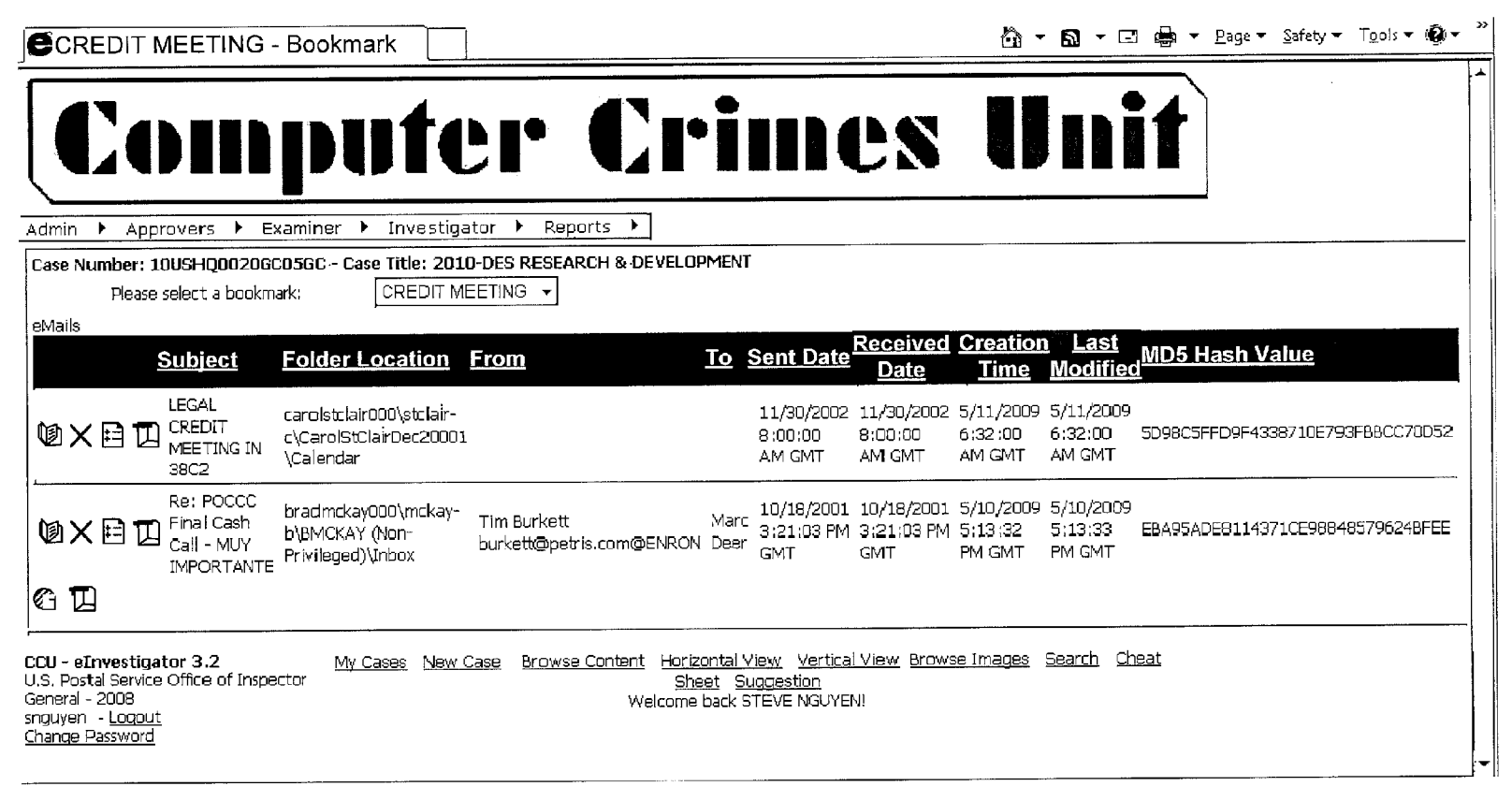

FIGS. 37 and 38 show a Bookmark panel in a Case Browse and Search window activated from the Bookmarks window shown in FIG. 36 when a specific Bookmark is selected. FIG. 37 shows the Bookmarks window with the directory tree structure to the left, and FIG. 38 shows it without. The items in a bookmark are shown as rows, with columns designating the values for that bookmark. The items in a bookmark can be sorted by selecting and clicking on the column title. In these FIGS., the following are shown for each bookmarked item: Subject; Folder Location; From; To: Sent Date; Received Date; Creation Time; Last Modified; and MD5HashValue. Other attributes are also within the scope of the present invention. Also shown for each item in a benchmark in the first column are icons for the various actions that can be taken with or upon that specific item. For example, in this FIG., icons for Bookmarking (), Deleting (✗), Browsing (), and viewing as PDF () are shown for the items shown.

Figure 39:
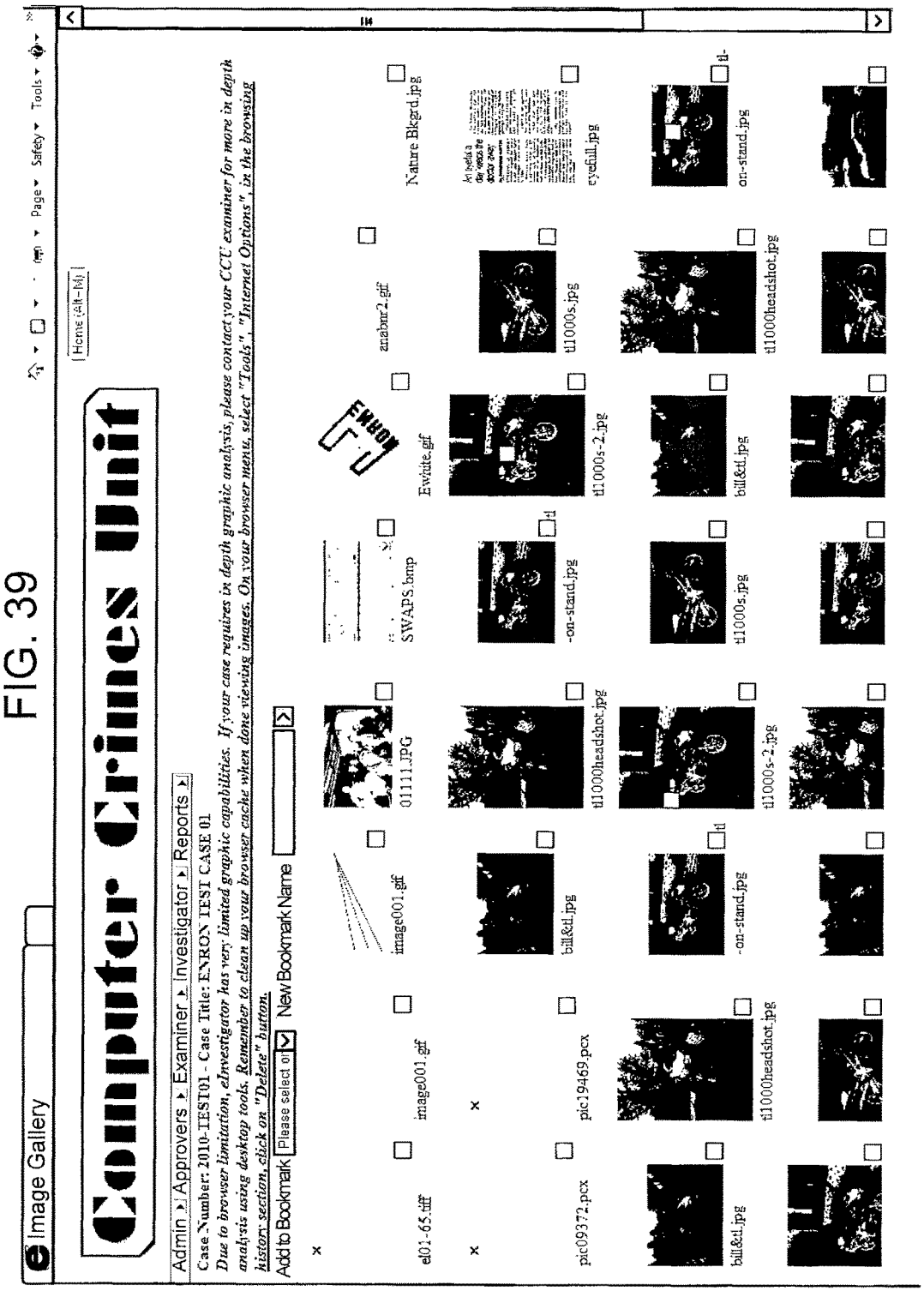
FIG. 39 shows an Image Gallery window showing thumb nail images of selected files, in accordance with one embodiment of the present invention.

FIG. 39 shows an Image Gallery window showing thumb nail images of selected files.

Figure 40:
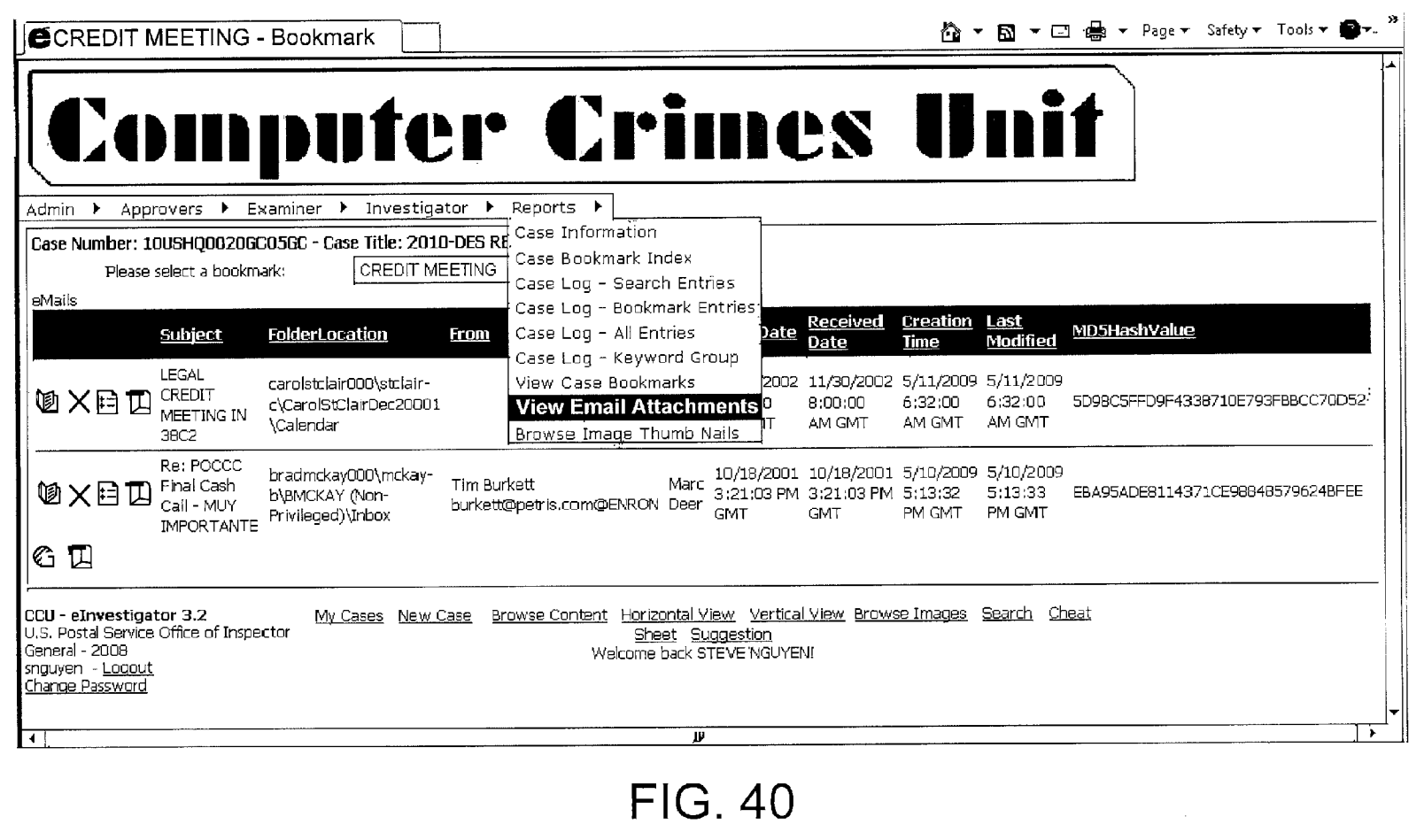

FIG. 40 shows a Bookmark window depicting the selecting of Viewing Email Attachments. While working in a case, a user can view all email attachments for the given case. This can be accomplished by: Select Reports|View Email Attachment menu option.

Figure 41:
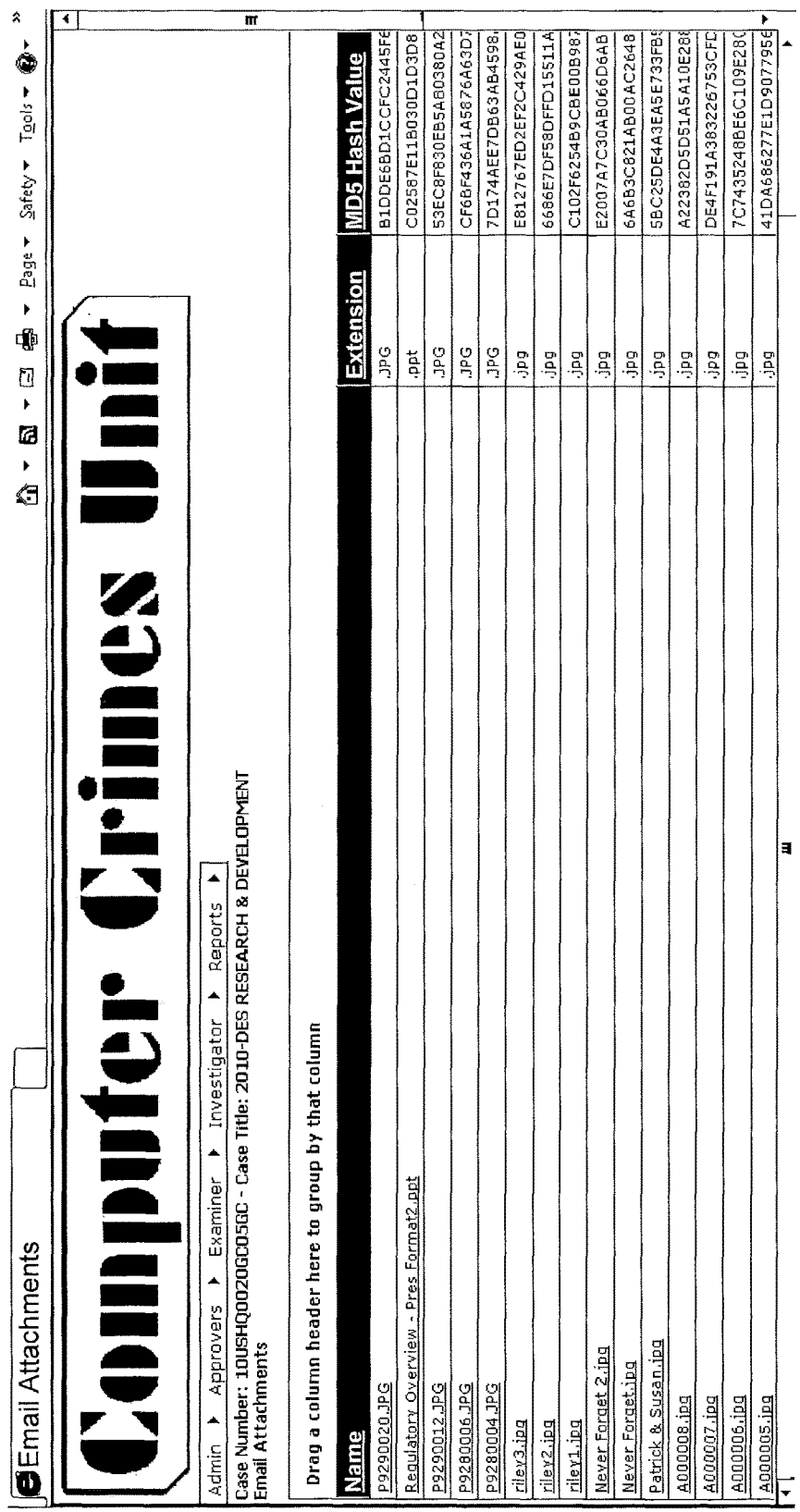
FIG. 41 shows an Email Attachment window, as activated in FIG. 40.

FIG. 41 shows an Email Attachment window, as activated in FIG. 40. The file listing displayed can be sorted, grouped, filtered, and reordered. The different attributes for each attachment are displayed in columns, and the attachments themselves displayed in rows. Clicking on the name of a column results in sorting by that attribute. If the Extension column heading is clicked, the attachments in the list are sorted by file extension. If a column header is dragged to the left side of the window, the attachments are grouped by that attribute.

Figure 42:
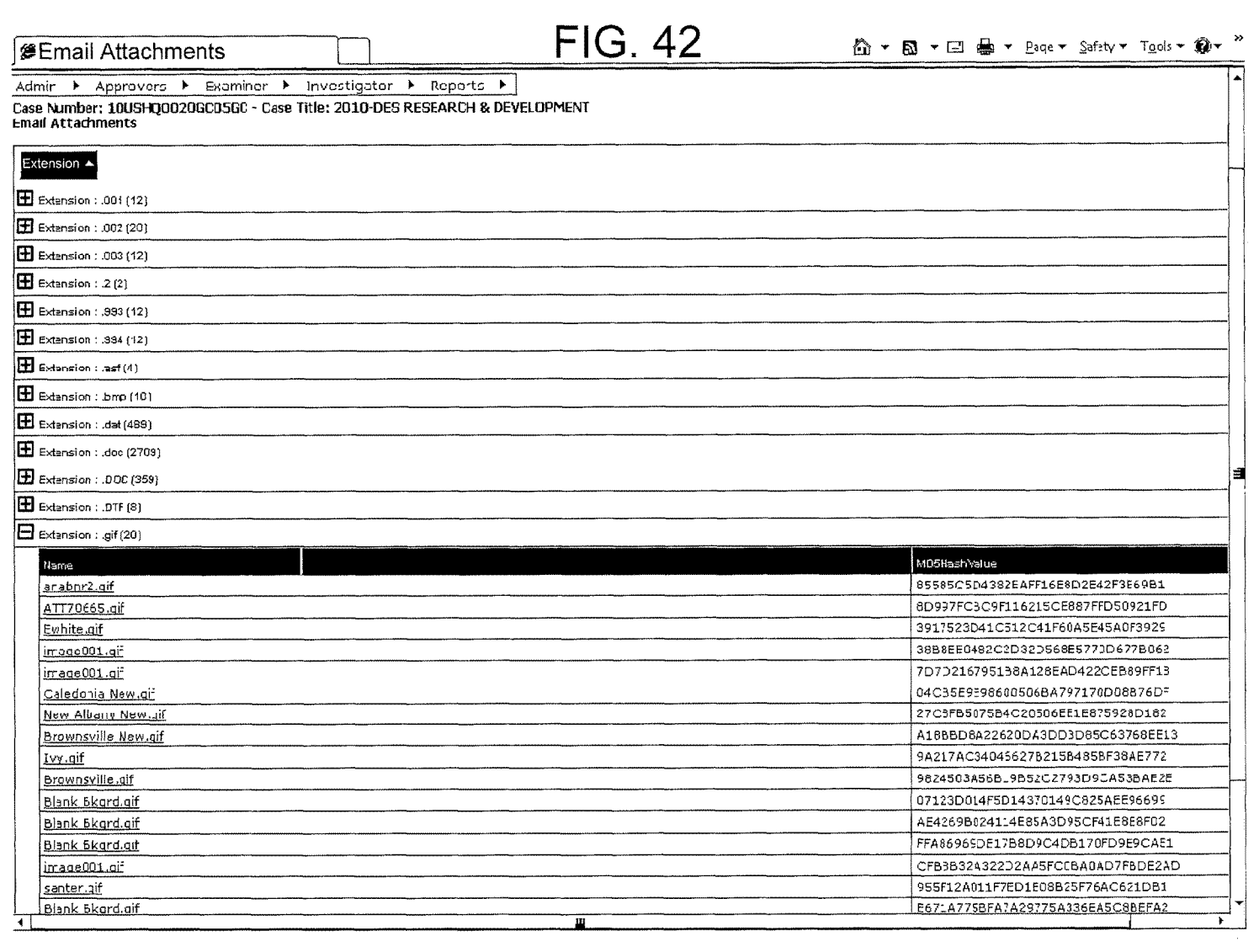

FIG. 42 shows an Email Attachment window as shown in FIG. 41, with the attachments grouped by file extension. When attachments are grouped by file extension, the group is identified by the extension, and a "+" () or "−" () sign is located on the left hand side of the group item for that file extension. When a "+" () sign is clicked, that extension is opened, and each of the attachments having that file extension type is displayed. The group can then be closed by clicking the "−" () sign that replaces the "+" () when the group is opened. In this FIG., the .gif file extension group is opened, showing some of the 20 .gif type attachments in this display.

Figure 43:
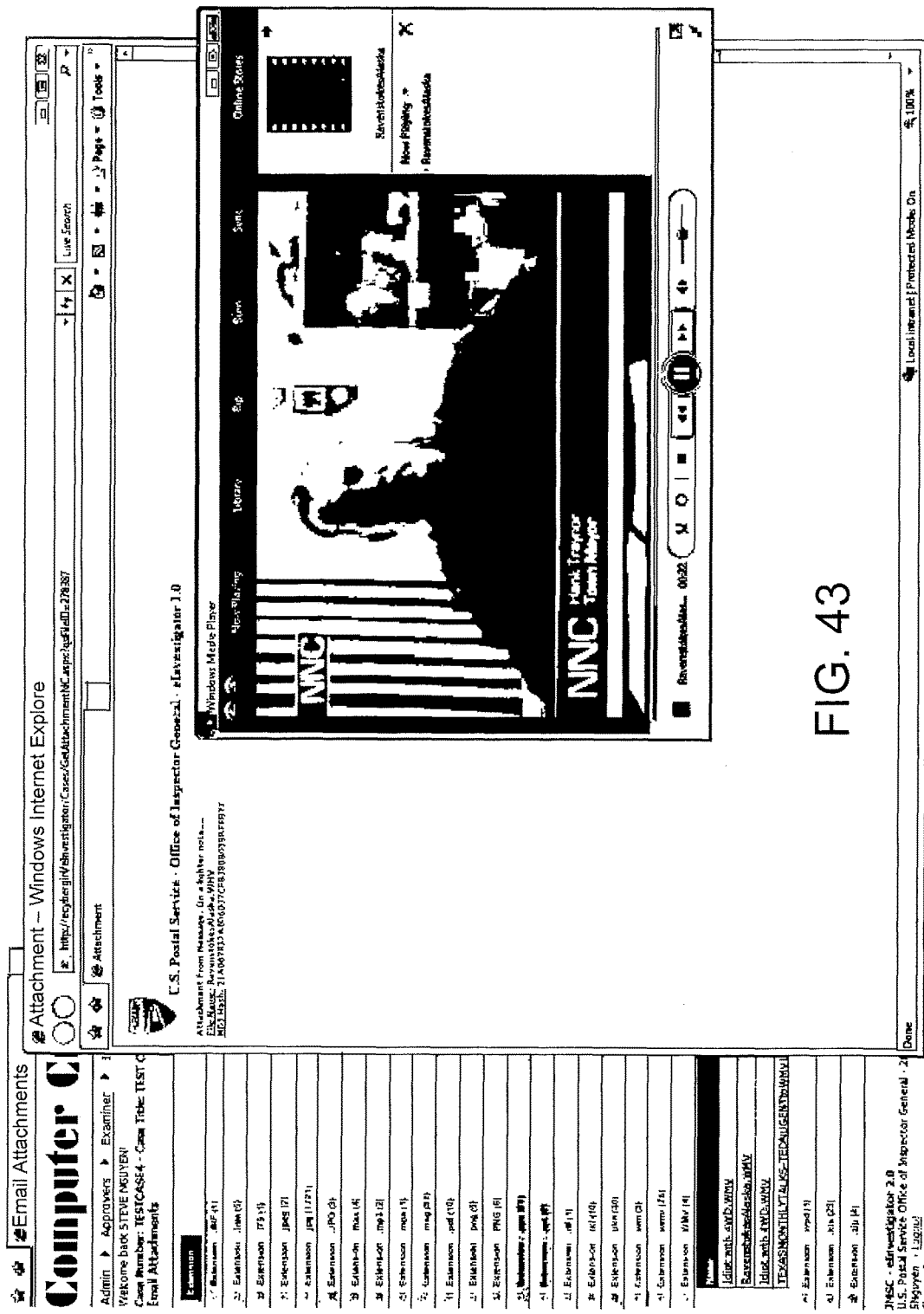
FIG. 43 shows an Email Attachment window with the attachments grouped by file extension as shown in FIG. 42, with a media player window overlaying the Email Attachment window.

FIG. 43 shows an Email Attachment window with the attachments grouped by file extension as shown in FIG. 42, with a media player window overlaying the Email Attachment window. If a user selects a multimedia file type, a separate window will preferably be launched for a media player to play that multimedia file. This FIG. shows a Windows Media Player window launched to play a .wmv type attachment.

Figure 44:
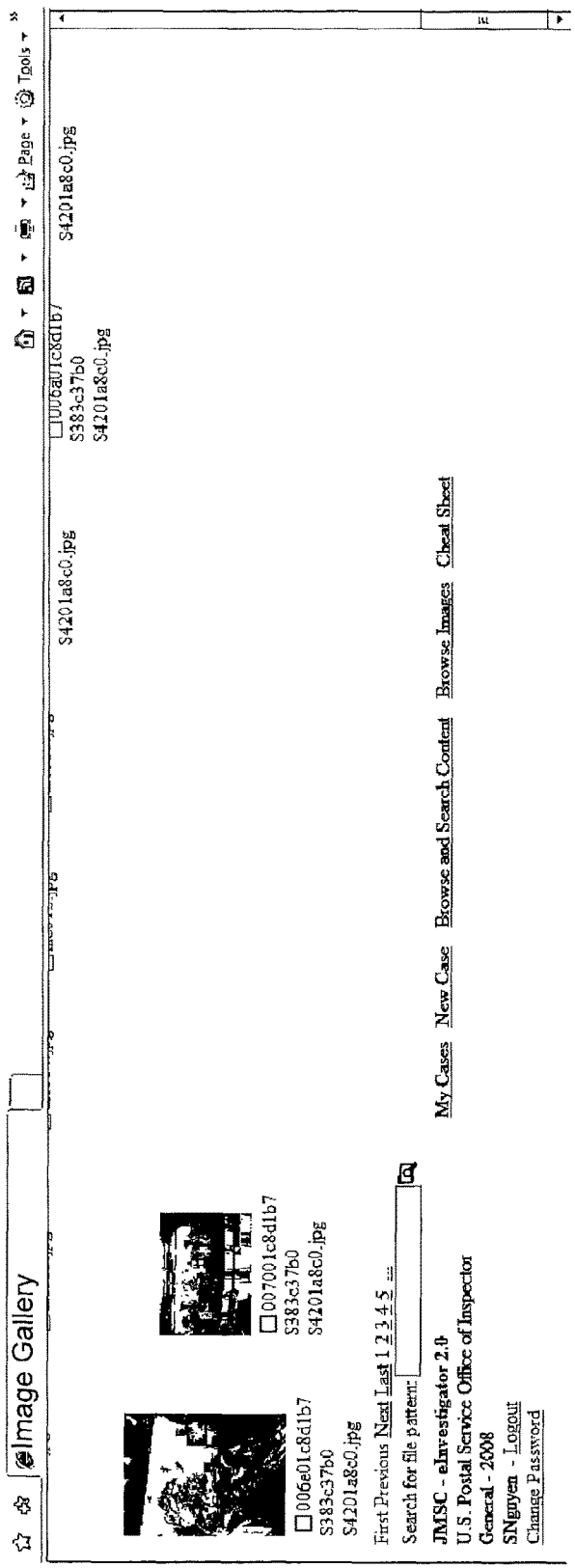
FIG. 44 shows a window for searching for images with particular attributes, in accordance with one embodiment of the present invention.

FIG. 44 shows a window for searching for images with particular attributes. If a user is searching for an image with a particular name, he can type in a few letters in the search box and click on search button. Thumb nails for the resulting images found are then displayed in this window.

The current implementation of the present invention utilizes a browsers built-in capability to display thumb nail images. Currently that means that only basic image formats such as JPG, GIF, TIF, BMP and PNG will be displayed. Displaying other types of images is also within the scope of the present invention. When applicable, the thumbnails can each have a title and a selection control that allows a user to select as many thumb nails and therefore the associated files, as he wishes. Then, the thumb nails can be added to a bookmark, as discussed above. Thumb nails can be an efficient way to optically review image type attachments.

Figure 45:
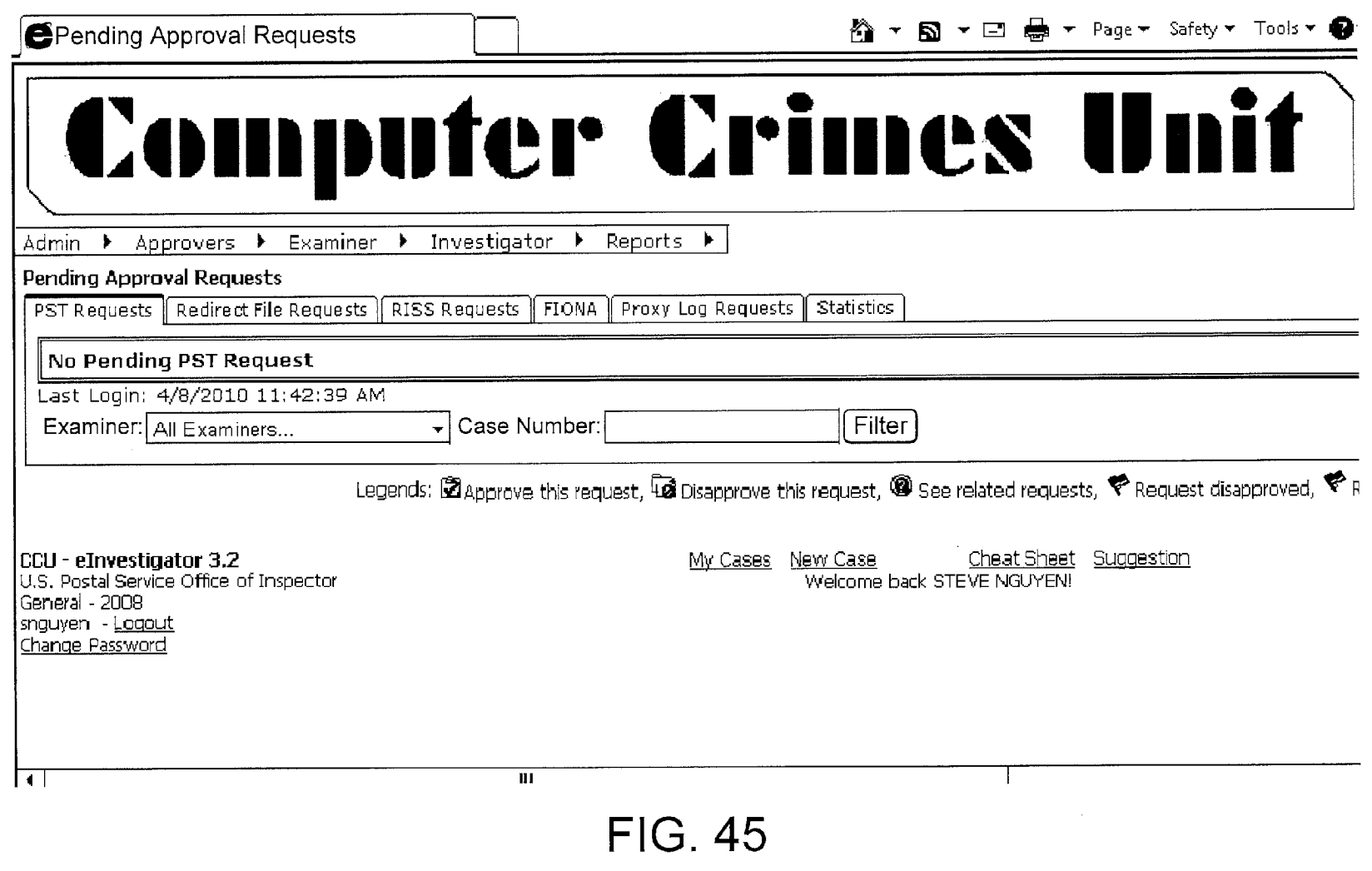

FIG. 45 shows an Approver window. If a user is in the Approver Role, he will see the approver tabs when he first logs on. They are similar to the Examiner tabs but include all—not filtered by default. The Approver can filter the listing in the tab by selecting the options at the bottom of the page.

FIG. 46 shows an Email Search page. On the search page, a user currently has three new search options:

1. Search for email message only.
2. Exclude bookmarked items so that the user will not have to review again.
3. All items (buckets) or selected items (buckets). If there are multiple PST files/Uploaded Folders/And Bookmarks, the user can select which bucket to search on. This option may be advantageous for large case with multiple examiners or agents; for workload distribution, individual members can select which bucket to work on. Or second reviewer just wants to search on the bookmarks that have created for them to review.

FIG. 47 shows a Search Window. When "Selected Items" is selected, bucket options will appear. Place check marks on the buckets that you would like to search on.

FIG. 48 shows a results window from searching performed in FIG. 47.

Search results also have a bookmark indicator and a Quick View option.

Figure 50:
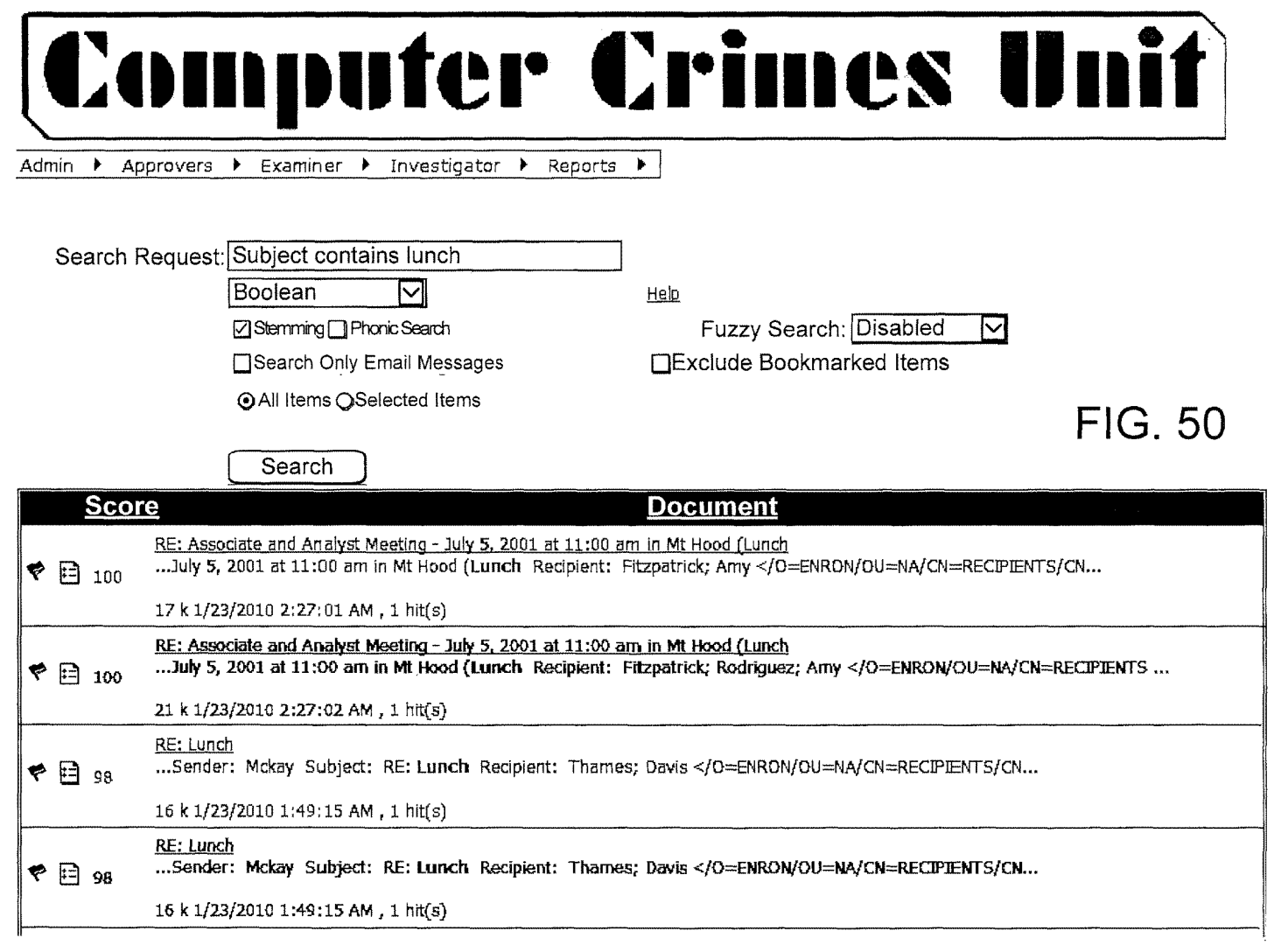

FIGS. 49 and 50 show Search Windows displaying results from a "stemming" search. FIG. 49 shows an "All of the words" search, while FIG. 50 shows a Boolean search. In both cases, "Fuzzy Search" is disabled and "All Items" is selected instead of "Selected items".

FIG. 51 shows a Search Window displaying a "stemming" search with "Selected Items" selected. "Fuzzy Search" is disabled.

FIG. 52 is an Advanced (Search) Options window, activated by the search in FIG. 48. Currently, the advance search option will only search for email messages. Users can specify individual email field value to search for. The Advanced Search Options window has a number of fields that can be joined in a search with connectors. Each potential search parameter may be provided in a corresponding text block. Currently, the provided fields are: Sender, Recipient, Start Date, End Date.

Figure 54:
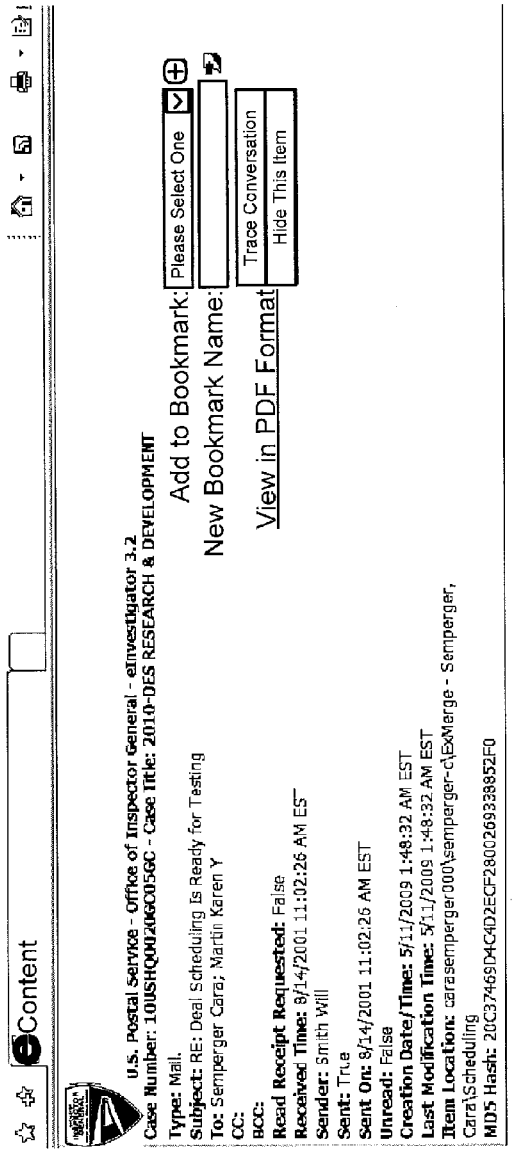

FIGS. 53 and 54 show windows displaying emails. The email messages are typically the result of an email search, as shown above. The email header, as well as other email information, is shown at the top, and the text contents are shown below. In the upper right corner of the window shown in FIG. 54 are shown various options. The email may be added to a book mark, and if so, the book mark can be selected by either expanding a bookmark list utilizing a pull-down list of bookmarks or by clicking on a "+" sign to the right of the pull-down list. The bookmark may alternatively be added to a new bookmark, that is created by specifying the name of the new bookmark, and then clicking to create the bookmark. Another option is a Trace Conversation button that traces an email conversation. There is also a button for hiding this item and a link to view the email in PDF format.

FIG. 55 shows a window displaying an email in PDF format. This is activated by clicking on the "View in PDF Format" link shown in FIG. 54. A limited header is shown at the top of the email. In one embodiment of the present invention, the fields displayed in either the regular email display or the PDF display of the image can be selected and/or deselected by the user and saved in his preferences.

Figure 56:
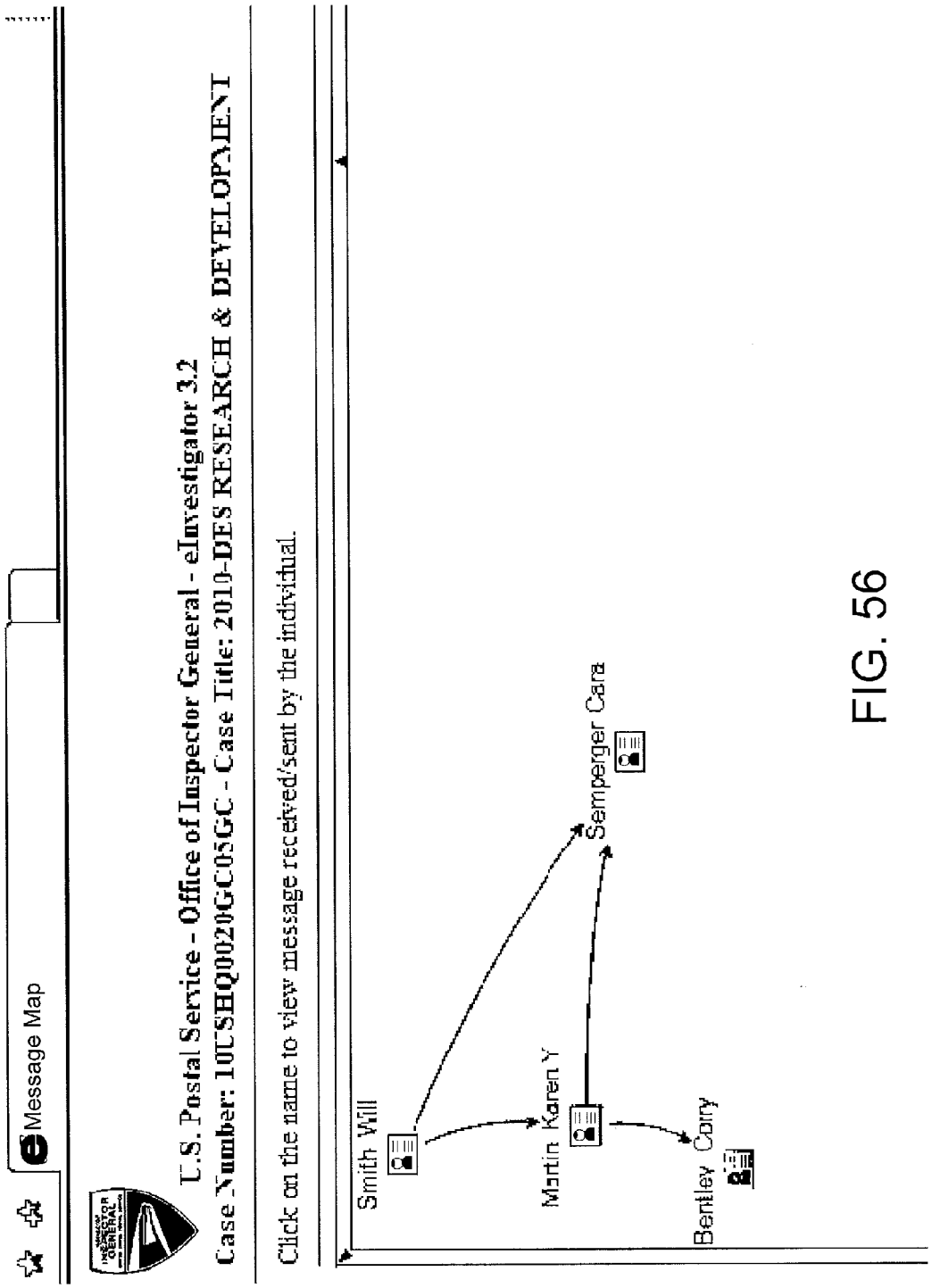
FIG. 56 shows a window displaying an Email Trace, in accordance with one embodiment of the present invention.

FIG. 56 shows a window displaying an Email Trace. An Email Trace can be launched by clicking on the Trace Conversation button shown in FIG. 54. The Email Trace traces the conversation in an email message that occurs when the email is routed using To, CC, and BCC fields. In this email, the original email message was started by Will Smith. He sent it to Karen Y. Martin and Cara Semperger. Karen then sent the message, along with her comments, to Cara and Corry Bentley. This is illustrative only, and it should be understood that email conversations are often significantly more complex than this example.

Figure 57:
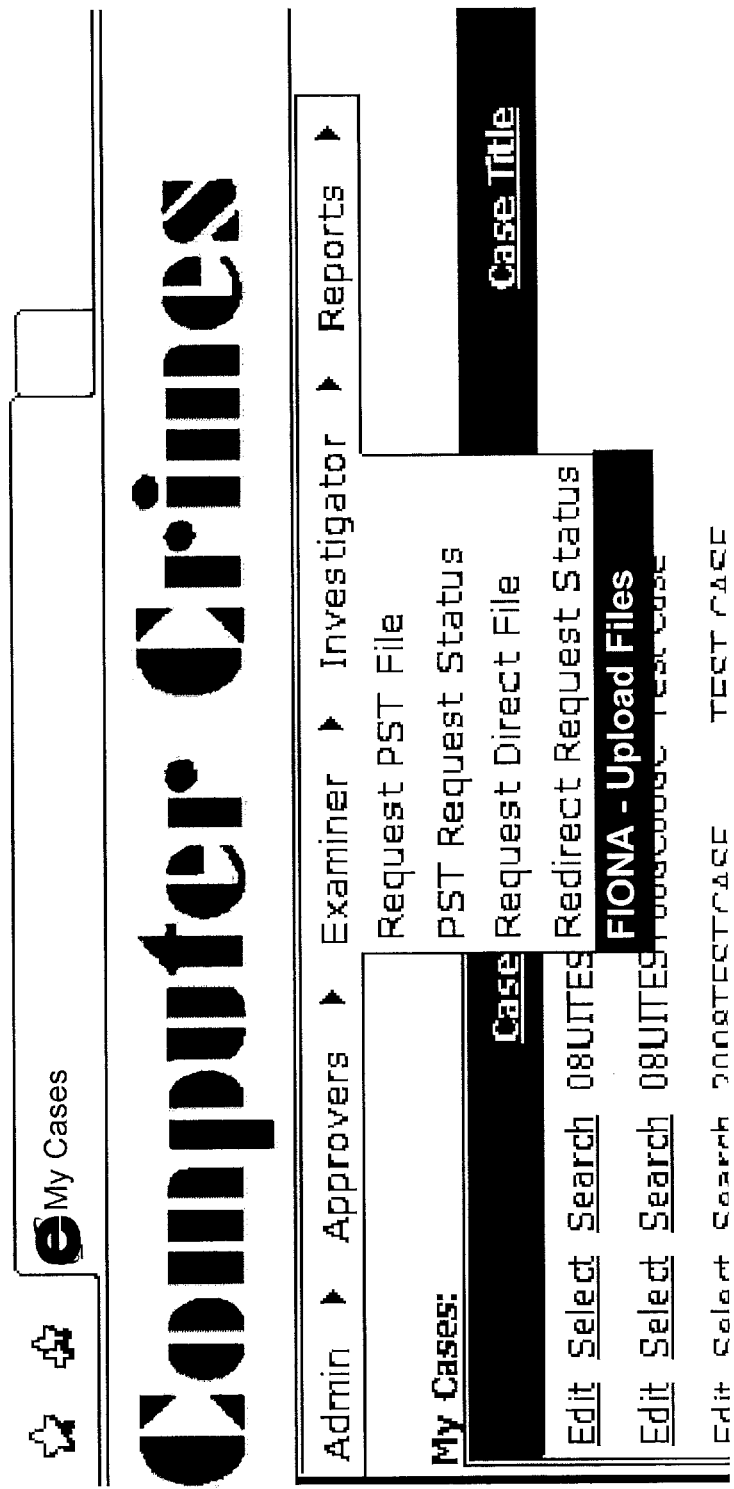
FIG. 57 shows how an Upload File window is selected, in accordance with one embodiment of the present invention.

FIG. 57 shows how an Upload File window is selected. The user selects "Upload Files" under the examiner menu.

Figure 58:
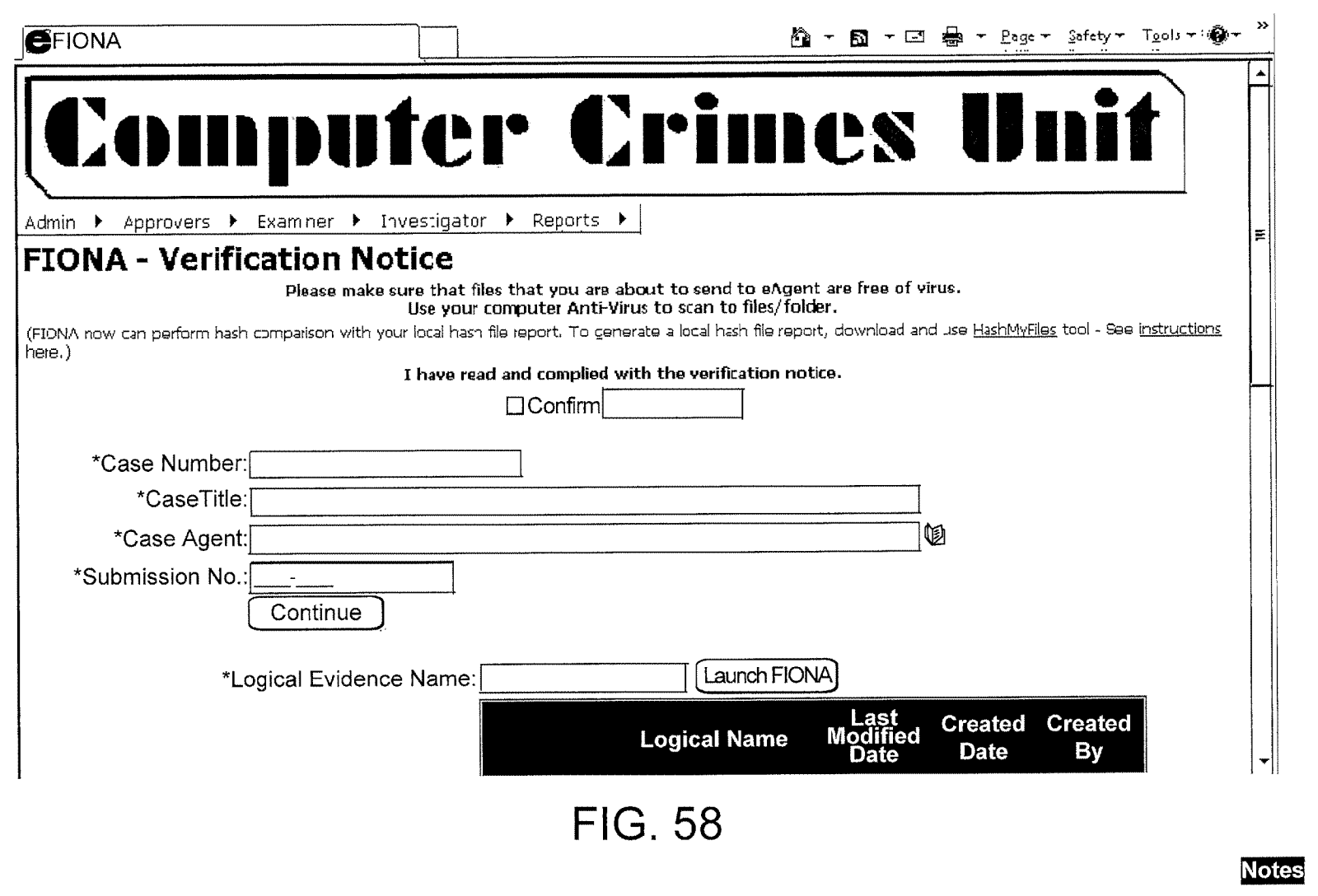

FIG. 58 shows an Upload File window as launched in FIG. 57. Any files (digital objects) that are outside of DES automated process (USPS email and online profile files) can be uploaded into the present embodiment of the current invention for analysis. Examples of file objects that are outside DES automated process would be files carved out from a hard drive seized off-line. Prior to uploading any files into the system, the examiner should scan all files for virus. The examiner is requested to Check "Confirm" that he has complied with the Verification Notice procedures displayed. He then can select scanned date to continue.

Figure 59:
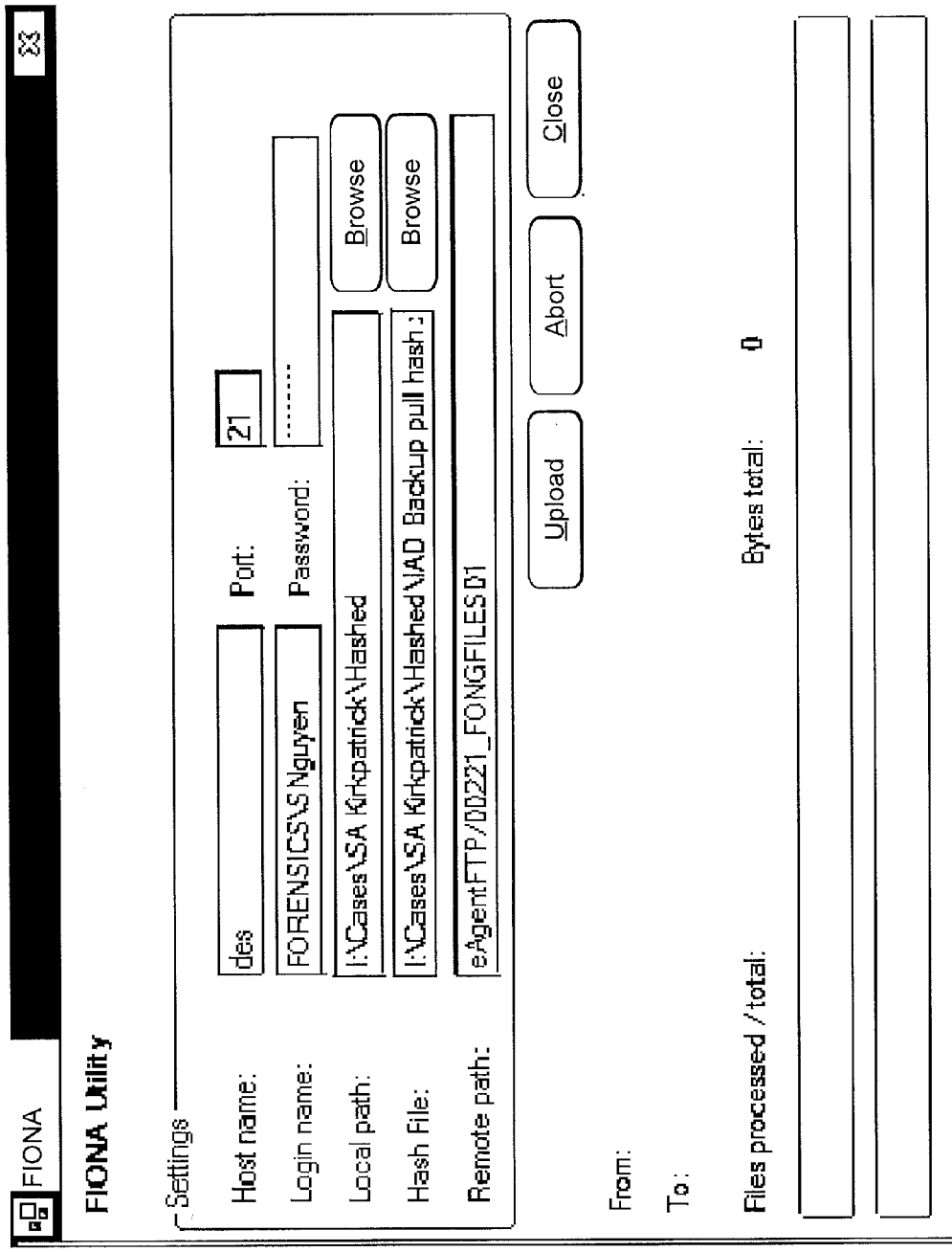
FIG. 59 shows a FIONA utility window, as is launched by the actions in FIG. 58.

FIG. 59 shows a FIONA utility window, as is launched by the actions in FIG. 58. The system for importing files into the system is known as "FIONA". FIONA supports comparing MD5 and SHA1 hash report that a user produced. To produce the hash report, follow the instructions on the FIONA page carefully.

In order FIONA to work, the user should make sure that his computer meets the technical requirements (in the blue box). He should enter a logical evidence name for his files/directories and then Launch FIONA. By default, FIONA will pick up the user's network credentials; it is his forensics network ID and password in the current embodiment. He should enter his forensic network password. This is to ensure that only forensic examiner can perform this task. He can then select the folder containing his files to upload. FIONA will upload the entire directory. If he has created a hash report xml, it should be specified here so that FIONA can compare the result hash values.

As long as a user has NOT submitted logical evidence for processing, he can add more files into an existing logical evidence, overwrite or delete the logical evidence. The design is to allow users to change/add more files at a later date. However, once a user submits the evidence for processing, the evidence will be locked.

All CCU Examiners can reset their own user passwords. When resetting a user's password, an email with a password will be sent to both to the user and the owner of the account. This activity will also be logged. Changing or resetting passwords be accomplished by the: Select Examiner|Manage Users menu option.

In order to reset a password, an Examiner should type in a few letters of the user's last name then click on Filter. The user for whom the password is to be reset is selected, and then the Reset User Password button is clicked. If a user is not an Administrator, the "Administrator" check option will be gray out.

There are currently five menu options under the Investigator menu.

1. My Cases: similar to My Case under the examiner menu. However, investigators can only see listing of their own cases and email requests.
2. Email Request: Investigators can make requests for live email data of USPS employee directly from the present system. This type of request will be currently be handled by Shreka automation. Normally, email will be available within 24 hours after the request is approved by CCU ASAC.
3. Unhide My Hidden Cases: if an investigator previously selected to hide cases from case listing, he/she can remove the hidden option using this option.
4. My preference: this option saves the investigator's settings 5. Unhide Items: if the investigator previously selected to hide certain items during the review of the data, he/she can remove the hidden attribute using this option.

Email and other documents loading into the presently described system can be searched utilizing dtSearch®. dtSearch® is a proprietary text search engine sold by dtSearch Corporation. It is designed to perform text searches on terabytes of data, and can be embedded in other systems, as was done in the present implementation of the current invention. Other search engines are also within the scope of the present invention.

dtSearch currently supports two types of search requests. A natural language search is any sequence of text, like a sentence or a question. After a natural language search, dtSearch sorts retrieved documents by their relevance to a user's search request.

A Boolean search request consists of a group of words or phrases linked by connectors such as and and or that indicate the relationship between them. Examples:
apple and pear Both words must be present
apple or pear Either word can be present
apple w/5 pear Apple must occur within 5 words of pear
apple not w/5 pear Apple must not occur within 5 words of pear
apple and not pear Only apple must be present
name contains smith The field name must contain smith If a user uses more than one connector, he should use parentheses to indicate precisely what he wants to search for. For example, apple and pear or orange juice could mean (apple and pear) or orange, or it could mean apple and (pear or orange). Noise words, such as if and the, are ignored in searches. Search terms may include the following special characters:
? Matches any single character. Example: appl? matches apply or apple.
* Matches any number of characters. Example: appl* matches application
~ Stemming. Example: apply~ matches apply, applies, applied.
% Fuzzy search. Example: ba%nana matches banana, bananna.
Phonic search. Example: #smith matches smith, smythe.
& Synonym search. Example: fast& matches quick.
~~ Numeric range. Example: 12~~24 matches 18.
: Variable term weighting. Example: apple:4 w/5 pear:1
Words and Phrases A user does not need to use any special punctuation or commands to search for a phrase. Simply enter the phrase the way it ordinarily appears. He can use a phrase anywhere in a search request. Example: "apple w/5 fruit salad". If a phrase contains a noise word, dtSearch will skip over the noise word when searching for it. For example, a search for statue of liberty would retrieve any document containing the word statue, any intervening word, and the word liberty. Punctuation inside of a search word is treated as a space. Thus, can't would be treated as a phrase consisting of two words: can and t. 1843(c)(8)(ii) would become 1843 c 8 ii (four words).
Wildcards (* and ?)

A search word can contain the wildcard characters * and ?. A ? in a word matches any single character, and a * matches any number of characters. The wildcard characters can be in any position in a word. For example: appl* would match apple, application, etc. *cipl* would match principle, participle, etc. appl? would match apply and apple but not apples. ap*ed would match applied, approved, etc. Use of the * wildcard character near the beginning of a word will slow searches somewhat.
Natural Language Searching A natural language search request is any combination of words, phrases, or sentences. After a natural language search, dtSearch sorts retrieved documents by their relevance to your search request. Weighting of retrieved documents takes into account: the number of documents each word in your search request appears in (the more documents a word appears in, the less useful it is in distinguishing relevant from irrelevant documents); the number of times each word in the request appears in the documents; and the density of hits in each document. Noise words and search connectors like NOT and OR are ignored.
Synonym Searching Synonym searching finds synonyms of a word in a search request. For example, a search for fast would also find quick. You can enable synonym searching for all words in a request or you can enable synonym searching selectively by adding the & character after certain words in a request. Example: fast& w/5 search.

The effect of a synonym search depends on the type of synonym expansion requested on the search form. dtSearch can expand synonyms using only user-defined synonym sets, using synonyms from dtSearch's built-in thesaurus, or using synonyms and related words (such as antonyms, related categories, etc.) from dtSearch's built-in thesaurus.
Fuzzy Searching Fuzzy searching will find a word even if it is misspelled. For example, a fuzzy search for apple will find appple. Fuzzy searching can be useful when you are searching text that may contain typographical errors, or for text that has been scanned using optical character recognition (OCR). There are two ways to add fuzziness to searches:

1. Enable fuzziness for all of the words in a search request. The user can adjust the level of fuzziness from 1 to 10.

2. The user can also add fuzziness selectively using the % character. The number of % characters he adds determines the number of differences dtSearch will ignore when searching for a word. The position of the % characters determines how many letters at the start of the word have to match exactly. Examples:
    ba%nana Word must begin with ba and have at most one difference between it and banana.
    b%%anana Word must begin with b and have at most two differences between it and banana.
Phonic Searching Phonic searching looks for a word that sounds like the word you are searching for and begins with the same letter. For example, a phonic search for Smith will also find Smithe and Smythe. To ask dtSearch to search for a word phonically, put a # in front of the word in your search request. Examples: #smith, #johnson A user can also check the Phonic searching box in the search form to enable phonic searching for all words in his search request. Phonic searching is somewhat slower than other types of searching and tends to make searches over-inclusive, so it is may be better to use the # symbol to do phonic searches selectively.
Stemming Stemming extends a search to cover grammatical variations on a word. For example, a search for fish would also find fishing. A search for applied would also find applying, applies, and apply. There are two ways to add stemming to your searches:

1. Check the Stemming box in the search form to enable stemming for all of the words in a search request. Stemming does not slow searches noticeably and is almost always helpful in making sure a user can find what he wants.

2. If a user wants to add stemming selectively, he can add a ~ at the end of words that he wants stemmed in a search. Example: apply~

Variable Term Weighting

When dtSearch sorts search results after a search, by default all words in a request count equally in counting hits. However, a user can change this by specifying the relative weights for each term in his search request, like this: apple:5 and pear:1 This request would retrieve the same documents as "apple and pear" but, dtSearch would weight apple five times as heavily as pear when sorting the results. In a natural language search, dtSearch automatically weights terms based on an analysis of their distribution in your documents. If a user provides specific term weights in a natural language search, these weights will override the weights dtSearch would otherwise assign.

Field Searching

When a user indexes a database or other file containing fields, dtSearch saves the field information so that he can perform searches limited to a particular field. For example, suppose that he indexed an Access database with a Name field and a Description field. He could search for apple in the Name field like this: Name contains apple The user can also define a field at the time of a search by designating words that begin and end the field, like this: (beginning to end) contains (something) The beginning TO end part defines the boundaries of the field. The CONTAINS part indicates the words or phrases that he is searching for in the field. The only connector allowed in the beginning and end expressions in a field definition is OR. Examples: (name to address) contains john smith (name to (address or xlastword)) contains (oak w/10 lane). The field boundaries are not considered hits in a search. Only the words being searched for (john smith, oak, lane) are marked as hits.

AND Connector

Use the AND connector in a search request to connect two expressions, both of which must be found in any document retrieved. For example:

apple pie and poached pear would retrieve any document that contained both phrases.

(apple or banana) and (pear w/5 grape) would retrieve any document that (1) contained either apple OR banana, AND (2) contained pear within 5 words of grape.

OR Connector

Use the OR connector in a search request to connect two expressions, at least one of which must be found in any document retrieved. For example, apple pie or poached pear would retrieve any document that contained apple pie, poached pear, or both.

W/N Connector

Use the W/N connector in a search request to specify that one word or phrase must occur within N words of the other. For example, apple w/5 pear would retrieve any document that contained apple within 5 words of pear. The following are examples of search requests using W/N: (apple or pear) w/5 banana (apple w/5 banana) w/10 pear (apple and banana) w/10 pear. Some types of complex expressions using the W/N connector will produce ambiguous results and should not be used. The following are examples of ambiguous search requests: (apple and banana) w/10 (pear and grape) (apple w/10 banana) w/10 (pear and grape) In general, at least one of the two expressions connected by W/N must be a single word or phrase or a group of words and phrases connected by OR. Example: (apple and banana) w/10 (pear or grape) (apple and banana) w/10 orange tree. dtSearch uses two built in search words to mark the beginning and end of a file: xfirstword and xlastword. The terms are useful if a user wants to limit a search to the beginning or end of a file. For example, apple w/10 xlastword would search for apple within 10 words of the end of a document.

NOT and NOT W/N

Use NOT in front of any search expression to reverse its meaning. This allows you to exclude documents from a search. Example:

apple sauce and not pear

NOT standing alone can be the start of a search request. For example, not pear would retrieve all documents that did not contain pear. If NOT is not the first connector in a request, you need to use either AND or OR with NOT: apple or not pear not (apple w/5 pear) The NOT W/ ("not within") operator allows you to search for a word or phrase not in association with another word or phrase. Example: apple not w/20 pear Unlike the W/ operator, NOT W/ is not symmetrical. That is, apple not w/20 pear is not the same as pear not w/20 apple. In the apple not w/20 pear request, dtSearch searches for apple and excludes cases where apple is too close to pear. In the pear not w/20 apple request, dtSearch searches for pear and excludes cases where pear is too close to apple.

Numeric Range Searching

A numeric range search is a search for any numbers that fall within a range. To add a numeric range component to a search request, enter the upper and lower bounds of the search separated by ~~ like this: apple w/5 12~~17. This request would find any document containing apple within 5 words of a number between 12 and 17. Numeric range searches only work with positive integers. A numeric range search includes the upper and lower bounds (so 12 and 17 would be retrieved in the above example). For purposes of numeric range searching, decimal points and commas are treated as spaces and minus signs are ignored. For example, −123,456.78 would be interpreted as: 123 456 78 (three numbers). Using alphabet customization, the interpretation of punctuation characters can be changed. For example, if you change the comma and period from space to ignore, then 123,456.78 would be interpreted as 12345678

Those skilled in the art will recognize that modifications and variations can be made without departing from the spirit of the invention. Therefore, it is intended that this invention encompass all such variations and modifications as fall within the scope of the appended claims

What is claimed is:

1. A method for investigating data, the method comprising:

receiving a plurality of data files at a server from a first remote computing device associated with a first user, the data files including data concerning a plurality of email messages, the email messages each associated with a plurality of email users;

granting, by the server, to a second remote computing device associated with a second user access to the data files received from the first remote computing device;

receiving, by the server, from the second remote computing device, a selection of data concerning an email message from among the data concerning the plurality of email messages;

generating, by the server, a graphical representation of a plurality of email transmission relationships among the plurality of email users associated with the selected email message data, wherein the graphical representation is a picture depicting the plurality of email users, and further depicting travel of the selected email message to and from the plurality of email users; and transmitting, by the server, the graphical representation of the email transmission relationships to the second remote computing device for display on a display screen of the second remote computing device.

2. The method of claim 1, wherein the second user is an authorized examiner.

3. The method of claim 1, further comprising receiving from the second remote computing device a request to create a bookmark associated with at least one email transmission relationship from among the plurality of email transmission relationships represented in the graphical representation.

4. The method of claim 3, further comprising adding the requested bookmark associated with the email transmission relationship to the graphical representation.

5. The method of claim 4, further comprising transmitting the bookmarked graphical representation to the first remote computing device for subsequent review by the first user.

6. The method of claim 1, wherein the second user is an investigator, wherein the granting of access to the data files to the second remote computing device includes:
transmitting an authorization request to an authorizer;
in response to the authorization request being granted, placing the data concerning the plurality of email messages in a folder accessible to the second user.

7. The method of claim 6, wherein the first user is an examiner different from the investigator, wherein the examiner and investigator have access to the folder via respectively the first and second remote computing devices.

8. The method of claim 7 further comprising:
invoking a hash function on the plurality of data files for outputting a first hash value; and
comparing the first hash value to a second hash value, wherein the receiving of the plurality of data files is conditioned upon the first hash value matching the second hash value.

9. A non-transitory computer-readable storage medium having a computer program embodied thereon, the program executable to perform a method for investigating data, the method comprising:
receiving a plurality of data files at a server from a first remote computing device associated with a first user, the data files including data concerning a plurality of email messages, the email messages each associated with a plurality of email users;
granting to a second remote computing device associated with a second user access to the data files received from the first remote computing device;
receiving from the second remote computing device a selection of data concerning an email message from among the data concerning the plurality of email messages;
generating a graphical representation of a plurality of email transmission relationships among the plurality of email users associated with the selected email message data, wherein the graphical representation is a picture depicting the plurality of email users, and further depicting travel of the selected email message to and from the plurality of email users; and
transmitting the graphical representation of the email transmission relationships to the second remote computing device for display on a display screen of the second remote computing device.

10. The non-transitory computer-readable storage medium of claim 9, wherein the second user is an authorized examiner.

11. The non-transitory computer-readable storage medium of claim 9, wherein the method further includes receiving from the second remote computing device a request to create a bookmark associated with at least one email transmission relationship from among the plurality of email transmission relationships represented in the graphical representation.

12. The non-transitory computer-readable storage medium of claim 11, wherein the method further includes adding the requested bookmark associated with the email transmission relationship to the graphical representation.

13. The non-transitory computer-readable storage medium of claim 12, further comprising transmitting the bookmarked graphical representation to the first remote computing device for subsequent review by the first user.

14. A data investigation system, the system comprising:
a first remote computing device associated with a first user;
a second remote computing device associated with a second user, the second remote computing device communicatively coupled to the first remote computing device by a network; and
a server that receives a plurality of data files from the first remote computing device and executions instructions stored in memory, the server communicatively coupled to the first and second remote computing devices by the network, the data files including data concerning a plurality of email messages, and the email messages each associated with a plurality of email users, wherein execution of the instructions:
grants to the second remote computing device access to the data files received from the first remote computing device;
generates a graphical representation of a plurality of email transmission relationships among the plurality of email users associated with a portion of selected email message data identified in a selection of data received from the second remote computing device, wherein the graphical representation is a picture depicting the plurality of email users, and further depicting travel of the selected email message to and from the plurality of email users; and
transmits the graphical representation of the email transmission relationships to the second remote computing device for display on a display screen of the second remote computing device.

15. The system of claim 14, wherein the second user is an authorized examiner.

16. The system of claim 14, wherein the server further receives from the second remote computing device a request to create a bookmark associated with at least one email transmission relationship from among the plurality of email transmission relationships represented in the graphical representation.

17. The system of claim 16, wherein the server further adds the requested bookmark associated with the email transmission relationship to the graphical representation.

18. The system of claim 17, wherein the server further transmits the bookmarked graphical representation to the first remote computing device for subsequent review by the first user.

* * * * *